(12) United States Patent
Aspichueta Celaá et al.

(10) Patent No.: US 12,534,727 B2
(45) Date of Patent: Jan. 27, 2026

(54) TARGET TO TREAT A METABOLIC DISEASE IN AN INDIVIDUAL

(71) Applicant: UNIVERSIDAD DEL PAÍS VASCO/EUSKAL HERRIKO UNIBERTSITATEA, Vizcaya (ES)

(72) Inventors: Patricia Aspichueta Celaá, Leioa-Vizcaya (ES); Xabier Buqué García, Leioa-Vizcaya (ES); Diego Sáenz de Urturi, Leioa-Vizcaya (ES)

(73) Assignee: UNIVERSIDAD DEL PAÍS VASCO/EUSKAL HERRIKO UNIBERTSITATEA, Vizcaya (ES)

( * ) Notice: Subject to any disclaimer, the term of this patent is extended or adjusted under 35 U.S.C. 154(b) by 198 days.

(21) Appl. No.: 17/274,907

(22) PCT Filed: Sep. 9, 2019

(86) PCT No.: PCT/EP2019/073981
§ 371 (c)(1),
(2) Date: Mar. 10, 2021

(87) PCT Pub. No.: WO2020/053142
PCT Pub. Date: Mar. 19, 2020

(65) Prior Publication Data
US 2022/0119816 A1   Apr. 21, 2022

(30) Foreign Application Priority Data

Sep. 10, 2018 (EP) .................... 18382648

(51) Int. Cl.
*C12N 15/113* (2010.01)
*A61K 31/7125* (2006.01)

(52) U.S. Cl.
CPC ...... *C12N 15/1137* (2013.01); *A61K 31/7125* (2013.01); *C12N 2310/11* (2013.01); *C12N 2310/315* (2013.01); *C12N 2310/3231* (2013.01); *C12N 2310/341* (2013.01); *C12Y 205/01006* (2013.01)

(58) Field of Classification Search
CPC .......... C12N 15/1137; C12N 2310/315; C12N 2310/3231; C12N 2310/341; A61K 31/7125; C12Y 205/01006
See application file for complete search history.

(56) References Cited

U.S. PATENT DOCUMENTS

| | | |
|---|---|---|
| 3,687,808 A | 8/1972 | Merigan, Jr. et al. |
| 4,845,205 A | 7/1989 | Dinh et al. |
| 5,034,506 A | 7/1991 | Summerton et al. |
| 5,130,302 A | 7/1992 | Spielvogel et al. |
| 5,134,066 A | 7/1992 | Rogers et al. |
| 5,166,315 A | 11/1992 | Summerton et al. |
| 5,175,273 A | 12/1992 | Bischofberger et al. |
| 5,185,444 A | 2/1993 | Summerton et al. |
| 5,367,066 A | 11/1994 | Urdea et al. |
| 5,432,272 A | 7/1995 | Benner |
| 5,434,257 A | 7/1995 | Matteucci et al. |
| 5,457,187 A | 10/1995 | Gmeiner et al. |
| 5,457,191 A | 10/1995 | Cook et al. |
| 5,459,255 A | 10/1995 | Cook et al. |
| 5,484,908 A | 1/1996 | Froehler et al. |
| 5,502,177 A | 3/1996 | Matteucci et al. |
| 5,525,711 A | 6/1996 | Hawkins et al. |
| 5,552,540 A | 9/1996 | Haralambidis |
| 5,587,469 A | 12/1996 | Cook et al. |
| 5,587,470 A | 12/1996 | Cook et al. |
| 5,594,121 A | 1/1997 | Froehler et al. |
| 5,596,091 A | 1/1997 | Switzer |
| 5,614,617 A | 3/1997 | Cook et al. |
| 5,645,985 A | 7/1997 | Froehler et al. |
| 5,681,941 A | 10/1997 | Cook et al. |
| 5,698,685 A | 12/1997 | Summerton et al. |
| 5,750,692 A | 5/1998 | Cook et al. |
| 5,763,588 A | 6/1998 | Matteucci et al. |
| 5,808,027 A | 9/1998 | Cook et al. |
| 5,811,534 A | 9/1998 | Cook et al. |
| 5,830,653 A | 11/1998 | Froehler et al. |
| 5,859,221 A | 1/1999 | Cook et al. |
| 5,948,903 A | 9/1999 | Cook et al. |
| 6,005,087 A | 12/1999 | Cook et al. |
| 6,005,096 A | 12/1999 | Matteucci et al. |
| 6,166,199 A | 12/2000 | Cook et al. |

(Continued)

FOREIGN PATENT DOCUMENTS

WO    1999/014226 A2    3/1999
WO       0063364 A2   10/2000

(Continued)

OTHER PUBLICATIONS

Komal Ramani, et al, "Methionine adenosyltransferases in liver health and diseases", Liver Research 1, pp. 103-111 (Year: 2017).*
Shelly C. Lu, et al, Methionine adenosyltransferase 1A knockout mice are predisposed to liver injury and exhibit increased expression of genes involved in proliferation:, PNAS vol. 98, pp. 5560-5565 (Year: 2001).*
Standards of medical care in diabetes—2021 Abridged for primary care providers, Clinical Diabetes Journal, vol. 29, pp. 14-43, 2021, doi.org/10.2337/cd21-as01, retrieved on-line on Oct. 12, 2023) (Year: 2021).*
Devaraj, et al. "Laboratory Investigation of Dyslipidemia", Laboratory Medicine, vol. 29, pp. 432-436, 1998 (Year: 1998).*

(Continued)

*Primary Examiner* — Abigail Vanhorn
*Assistant Examiner* — Stephanie L Sullivan
(74) *Attorney, Agent, or Firm* — Casimir Jones, S.C.; Tristan A. Fuierer

(57) ABSTRACT

Provided herein are methods, compounds, and compositions for reducing expression of MAT1a in a cell or individual. Such methods, compounds, and compositions are useful to treat, prevent, delay, or ameliorate a metabolic disease or disorder in an individual.

11 Claims, 5 Drawing Sheets

Specification includes a Sequence Listing.

(56) References Cited

U.S. PATENT DOCUMENTS

| | | | |
|---|---|---|---|
| 6,268,490 | B1 | 7/2001 | Imanishi et al. |
| 6,525,191 | B1 | 2/2003 | Ramasamy |
| 6,531,584 | B1 | 3/2003 | Cook et al. |
| 6,670,461 | B1 | 12/2003 | Wengel et al. |
| 6,673,661 | B1 | 1/2004 | Liu et al. |
| 6,770,748 | B2 | 8/2004 | Imanishi et al. |
| 6,794,499 | B2 | 9/2004 | Wengel et al. |
| 7,034,133 | B2 | 4/2006 | Wengel et al. |
| 7,053,207 | B2 | 5/2006 | Wengel et al. |
| 7,399,845 | B2 | 7/2008 | Seth et al. |
| 7,427,672 | B2 | 9/2008 | Imanishi et al. |
| 7,547,684 | B2 | 6/2009 | Seth et al. |
| 7,569,686 | B1 | 8/2009 | Bhat et al. |
| 7,572,582 | B2 | 8/2009 | Wengel et al. |
| 7,666,854 | B2 | 2/2010 | Seth et al. |
| 7,696,345 | B2 | 4/2010 | Allerson et al. |
| 7,741,457 | B2 | 6/2010 | Seth et al. |
| 7,750,131 | B2 | 7/2010 | Seth et al. |
| 7,875,733 | B2 | 1/2011 | Bhat et al. |
| 7,939,677 | B2 | 5/2011 | Bhat et al. |
| 8,022,193 | B2 | 9/2011 | Seth et al. |
| 8,030,467 | B2 | 10/2011 | Seth et al. |
| 8,034,909 | B2 | 10/2011 | Wengel et al. |
| 8,080,644 | B2 | 12/2011 | Wengel et al. |
| 8,088,746 | B2 | 1/2012 | Seth et al. |
| 8,088,904 | B2 | 1/2012 | Swayze et al. |
| 8,124,745 | B2 | 2/2012 | Allerson et al. |
| 8,153,365 | B2 | 4/2012 | Wengel et al. |
| 8,268,980 | B2 | 9/2012 | Seth et al. |
| 8,278,283 | B2 | 10/2012 | Seth et al. |
| 8,278,425 | B2 | 10/2012 | Prakash et al. |
| 8,278,426 | B2 | 10/2012 | Seth et al. |
| 8,440,803 | B2 | 5/2013 | Swayze et al. |
| 8,501,805 | B2 | 8/2013 | Seth et al. |
| 8,530,640 | B2 | 9/2013 | Seth et al. |
| 8,546,556 | B2 | 10/2013 | Seth et al. |
| RE44,779 | E | 2/2014 | Imanishi et al. |
| 9,005,906 | B2 | 4/2015 | Swayze et al. |
| 9,012,421 | B2 | 4/2015 | Migawa et al. |
| 10,119,136 | B2 | 11/2018 | Manoharan et al. |
| 10,577,607 | B2 | 3/2020 | Monia et al. |
| 10,913,767 | B2 | 2/2021 | Manoharan et al. |
| 2003/0158403 | A1 | 8/2003 | Manoharan et al. |
| 2003/0175906 | A1 | 9/2003 | Manoharan et al. |
| 2008/0039618 | A1 | 2/2008 | Allerson et al. |
| 2010/0190837 | A1 | 7/2010 | Migawa et al. |
| 2013/0203836 | A1 | 8/2013 | Rajeev et al. |
| 2015/0191727 | A1 | 7/2015 | Migawa et al. |
| 2016/0208261 | A1 | 7/2016 | Satishchandran et al. |

FOREIGN PATENT DOCUMENTS

| | | |
|---|---|---|
| WO | 2004/106356 A1 | 12/2004 |
| WO | 2007/134181 A2 | 11/2007 |
| WO | 2008/101157 A1 | 8/2008 |
| WO | 2011/133876 A2 | 10/2011 |
| WO | 2015/106128 A2 | 7/2015 |
| WO | 2017/161168 A1 | 9/2017 |

OTHER PUBLICATIONS

Hagedorn et al., "Managing the sequence-specificity of antisense oligonucleotides in drug discovery", Nucleic Acids Research vol. 45, No. 5, Published Jan. 30, 2017. (Year: 2017).*

Woolf et al., "Specificity of antisense oligonucleotides in vivo," Proc. Natl. Acad. Sci., Aug. 1992, 7305-7309, 89, National Academy of Sciences, Washington, D.C. (5 pages).

Gautschi et al., "Activity of a Novel bcl-2/bcl-xL-Bispecific Antisense Oligonucleotide Against Tumors of Diverse Histologic Origins," J. Natl. Cancer Inst., Mar. 2001, 463-471, 93(6), Oxford University Press, New York. (9 pages).

Maher, L.J. et al., "Comparative hybrid arrest by tandem antisense oligodeoxyribonucleotides or oligodeoxy-ribonucleoside methylphosphonates in a cell-free system," Nuc. Acid. Res., 1988, 3341-3358, 16(8), Oxford University Press, New York. (18 pages).

Seth et al., "Short Antisense Oligonucleotides with Novel 2'-4' Conformationaly Restricted Nucleoside Analogues Show Improved Potency without Increased Toxicity in Animals," J. Med. Chem., 2009, 10-13, 52, American Chemical Society, Washington, D.C.(4 pages).

Egli et al., "Synthesis, Improved Antisense Activity and Structural Rationale for the Divergent RNA Affinities of 3'-Fluoro Hexitol Nucleic Acid (FHNA and Ara-FHNA) Modified Oligonucleotides," J. Am. Chem. Soc., 2011, 16642-16649, 133, American Chemical Society, Washington, D.C. (8 pages).

Altschul et al., "Basic Local Alignment Search Tool," J. Mol. Biol., 1990, 403-410, 215, Elsevier, Amsterdam. (8 pages).

Zhang et al., "PowerBLAST: A New Network BLAST Application for Interactive or Automated Sequence Analysis and Annotation," Genome Res., 1997, 649-656, 7, Cold Spring Harbor Laboratory Press, Cold Spring Harbor. (8 pages).

Smith, T.F. et al., "Comparison of Biosequences," Adv. Appl. Math., 1981, 482-489, 2, Elsevier, Amsterdam. (8 pages).

Zhou et al., "Fine Tuning of Electrostatics around the Internucleotidic Phosphate through Incorporation of Modified 2',4'-Carbocyclic-LNAs and -ENAs Leads to Significant Modulation of Antisense Properties," J. Org. Chem., 2009, 118-134, 74, American Chemical Society, Washington, D.C. (17 pages).

Freier et al., "The ups and downs of nucleic acid duplex stability: structure-stability studies on chemically-modified DNA:RNA duplexes", Nucleic Acids Research, 1997, 4429-4443, 25(22), Oxford University Press, New York. (15 pages).

Albaek et al., "Analogues of a Locked Nucleic Acid with Three-Carbon 2',4'-Linkages: Synthesis by Ring-Closing Metathesis and Influence on Nucleic Acid Duplex Stability and Structure", J. Org. Chem., 2006, 7731-7740, 71, American Chemical Society, Washington, D.C. (10 pages).

Singh et al., "LNA (locked nucleic acids): synthesis and high-affinity nucleic acid recognition," Chem. Commun., 1998, 455-456, 4, Royal Society of Chemistry, London, United Kingdom. (2 pages).

Koshkin, A.A. et al., "LNA (Locked Nucleic Acids): Synthesis of the Adenine, Cytosine, Guanine, 5-Methylcytosine, Thymine and Uracil Bicyclonucleoside Monomers, Oligomerisation, and Unprecedented Nucleic Acid Recognition", Tetrahedron, 1998, 3607-3630, 54, Elsevier, Amsterdam. (24 pages).

Wahlestedt, C. et al., "Potent and nontoxic antisense oligonucleotides containing locked nucleic acids", Proc. Natl. Acad. Sci., May 2000, 5633-5638, 97(10), National Academy of Sciences, Washington, D.C. (6 pages).

Kumar et al., "The First Analogues of LNA (Locked Nucleic Acids): Phosphorothioate-LNA and 2'-Thio-LNA", Bioorg. Med. Chem. Lett., 1998, 2219-2222, 8, Elsevier, Amsterdam. (4 pages).

Singh et al., "Synthesis of 2'-Amino-LNA: A Novel Conformationally Restricted High-Affinity Oligonucleotide Analogue with a Handle", J. Org. Chem., 1998, 10035-10039, 63, American Chemical Society, Washington, D.C. (5 pages).

Srivastava, P. et al., "Five- and Six-Membered Conformationally Locked 2',4'-Carbocyclic ribo-Thymidines: Synthesis, Structure, and Biochemical Studies", J. Am. Chem. Soc., 2007, 8362-8379, 129, American Chemical Society, Washington, D.C. (18 pages).

Elayadi et al., "Application of PNA and LNA oligomers to chemotherapy", Curr. Opinion Inves. Drugs, 2001, 558-561, 2, PharmaPress Ltd, London, United Kingdom. (4 pages).

Braasch et al., "Locked nucleic acid (LNA): fine-tuning the recognition of DNA and RNA", Chem. Biol., 2001, 1-7, 8, Elsevier, Amsterdam. (7 pages).

Frieden et al., "Expanding the design horizon of antisense oligonucleotides with alpha-L-LNA", Nucleic Acids Research, 2003, 6365-6372, 31(21), Oxford University Press, New York. (8 pages).

Leumann, C.J., "DNA Analogues: From Supramolecular Principles to Biological Properties", Bioorg. & Med. Chem., 2002, 841-854, 10, Elsevier, Amsterdam. (14 pages).

Braash, D.A. et al., "Novel Antisense and Peptide Nucleic Acid Strategies for Controlling Gene Expression," Biochemistry, 2002, 4503-4510, 41(14), American Chemical Society, Washington, D.C. (8 pages).

(56) References Cited

OTHER PUBLICATIONS

Kumar et al., "Design, synthesis, biophysical and primer extension studies of novel acyclic butyl nucleic acid (BuNA)", Org. Biomol. Chem., 2013, 5853-5865, 11, Royal Society of Chemistry, London, United Kingdom. (13 pages).

Englisch et al., "Chemically Modified Oligonucleotides as Probes and Inhibitors", Angewandte Chemie, International Edition, Jun. 1991, 613-722, 30(6), VCH Verlagsgesellschaft mbH, Weinheim. (17 pages).

Sanghvi, Y.S., Chapter 15, Antisense Research and Applications, Crooke, S.T. and Lebleu, B., Eds., CRC Press, 1993, 273-288. (19 pages).

Agrawal, S. et al., "Antisense Research and Application", 1998, 273-290, Springer-Verlag, New York. (21 pages).

Crooke, S.T. et al., "Second Edition Antisense Drug Technology: Principles, Strategies, and Applications," CRC Press, 2008, Chapters 6 and 15, 163-166 and 442-443, Boca Raton. (14 pages).

Sanghvi, Y.S. et al., "Carbohydrate Modifications in Antisense Research," ACS Symposium Series 580, 1994, Chapters 3 and 4, 40-65, American Chemical Society, Washington, DC. (28 pages).

Genbank, "Mus musculus methionine adenosyltransferase I, alpha (Mat1a), mRNA," Database accession No. NM_133653.3, Apr. 2021, National Library of Medicine, Betheseda. (4 pages).

Genbank, "*Homo sapiens* methionine adenosyltransferase 1A (MAT1A), RefSeqGene on chromosome 10," Database accession No. NG_008083. 1, Jul. 2020, National Library of Medicine, Betheseda. (7 pages).

Genbank, "Mus musculus strain C57BL/6J chromosome 14, GRCm38. p6 C57BL/6J," Database accession No. NC_000080.6, Jun. 2020, National Library of Medicine, Betheseda. (2 pages).

Li et al., "The ratio of phosphatidylcholine to phosphatidylethanolamine influences membrane integrity and steatohepatitis," Cell Metab, 2006; 321-31, 3, Elsevier, Amsterdam. (11 pages).

Fu et al., "Aberrant lipid metabolism disrupts calcium homeostasis causing liver endoplasmic reticulum stress in obesity", Nature, 2011, 528-31, 473, Macmillan Publishers Limited, New York City. (4 pages).

Mato, JM et al., "S-Adenosylmethionine: a control switch that regulates liver function", 2002, 15-26, 16(1), FASEB, Rockville. (12 pages).

Martinez-Chantar, et al., "Loss of the Glycine N-Methyltransferase Gene Leads to Steatosis and Hepatocellular Carcinoma in Mice," Hepatology, 2008, 1191-9, 47(4), Wiley, Hoboken, New Jersey. (9 pages).

Martinez-Una, et al., "Excess S-adenosylmethionine reroutes phosphatidylethanolamine towards phosphatidylcholine and triglyceride synthesis," Hepatology, 2013, 1296-1305, 58(4), Wiley, Hoboken, New Jersey. (19 pages).

Martinez-Una, et al., "S-Adenosylmethionine increases circulating very-low density lipoprotein clearance in non-alcoholic fatty liver disease," Journal of Hepatology, 2015, 673-81,62, Elsevier, Amsterdam. (9 pages).

Gao, X. et al., "Decreased lipogenesis in white adipose tissue contributes to the resistance to high fat diet-induced obesity in phosphatidylethanolamine N-methyltransferase-deficient mice," Biochim Biophys Acta, 2015, 152-62, 1851 (2), Elsevier, Amsterdam. (11 pages).

Kraus, D. et al., "Nicotinamide N-methyltransferase knockdown protects against diet-induced obesity," Nature, 2014, 258-62, 508(7495), Macmillan Publishers Limited, New York City. (7 pages).

Stone, K.P. et al., "Mechanisms of Increased In Vivo Insulin Sensitivity by Dietary Methionine Restriction in Mice," Diabetes, Nov. 2014, 3721-3733, 63, American Diabetes Association, Arlington. (13 pages).

Taylor, J.C. et al., "Discovery of Novel Types of Inhibitors of S-Adenosylmethionine Synthesis by Virtual Screening," J Med Chem, 2009, 5967-5973, 52(19), American Chemical Society, Washington, DC. (7 pages).

Genbank, "*Homo sapiens* methionine adenosyltransferase 1A (MAT1A), mRNA," Database accession No. NM_000429.2, Sep. 2018, National Library of Medicine, Betheseda. (4 pages).

Genbank, "*Homo sapiens* chromosome 2, GRCh38.p13 Primary Assembly," Database accession No. NC_000002.12, May 2021, National Library of Medicine, Betheseda. (2 pages).

Henkel, A.S et al., "Homocysteine Supplementation Attenuates the Unfolded Protein Response in a Murine Nutritional Model of Steatohepatitis," Journal of Biological Chemistry, 2009, 31807-31816, 284(46), ASBMB, Rockville. (11 pages).

Finamor, I. et al., "Chronic aspartame intake causes changes in the trans-sulphuration pathway, glutathione depletion and liver damage in mice," Redox Biology, 2017, 701-707, 11, Elsevier, Amsterdam. (7 pages).

Cano, A. et al., "Methionine Adenosyltransferase 1A Gene Deletion Disrupts Hepatic Very Low-Density Lipoprotein Assembly in Mice," Hepatology, Dec. 2011, 1975-1986, 54(6), American Association for the Study of Liver Diseases, Alexandria. (12 pages).

Mato, J.M. et al., "S-adenosylmethionine metabolism and liver disease," Ann Hepatol., 2013, 183-189, 12(2), Elsevier, Amsterdam. (11 pages).

Yang, H. et al., "MicroRNAs regulate methionine adenosyltransferase 1A expression in hepatocellular carcinoma," Journal of Clinical Investigation, 2012, 285-298, 123(1), American Society for Clinical Investigation, Ann Arbor. (14 pages).

Wu, S. et al., "Thyroid hormone receptor-mediated regulation of the methionine adenosyltransferase 1 gene is associated with cell invasion in hepatoma cell lines," Cellular and Molecular Life Sciences, 2010, 1831-1843, 67(11), Springer, New York. (14 pages).

Michelotti, G.A. et al., "NAFLD, NASH and liver cancer," Nat Rev Gastroenterol Hepatol, 2013, 656-65, 10(11), Macmillan Publishers Limited, New York. (10 pages).

Albhaisi, S. et al., "Non-alcoholic fatty liver disease in lean individuals," JHEP Reports, 2019, 329-341, 1, EASL, Geneva, Switzerland. (13 pages).

Denkmayr L. et al., "Lean Patients with Non-Alcoholic Fatty Liver Disease Have a Severe Histological Phenotype Similar to Obese Patients," J. Clin. Med. 2018, 562, 7, MDPI, Basel, Switzerland. (12 pages).

Kauppinen, S. et al., "Locked nucleic acid (LNA): High affinity targeting of RNA for diagnostics and therapeutics," Drug Discov Today Technol., 2005, 287-90, 2(3), Elsevier, Amsterdam. (4 pages).

Zhao, Y. et al., "Lack of Phosphatidylethanolamine N-Methyltransferase Alters Plasma VLDL Phospholipids and Attenuates Atherosclerosis in Mice," Arterioscler Thromb Vasc Biol, 2009, 1349-1355, 29, American Heart Association, Inc., Dallas. (7 pages).

Orum, et al., "Locked nucleic acids: a promising molecular familyfor gene-function analysis and antisense drugdevelopment," Curr. Opinion Mol. Ther., 2001, 239-243, 3(3), National Library of Medicine, Bethesda. (1 page); Abstract Only.

Kroschwitz, J.I., Concise Encyclopedia Of Polymer Science And Engineering, 1990, 858-859, John Wiley & Sons, Hoboken. (2 pages); Cannot Locate Reference. Book Review Only.

Zhao, Y. et al., "Role of phosphatidylethanolamine N-methyltransferase (PEMT) in hepatic VLDL production," FASEB J, 2006, A1346-A1346, 20(5), FASEB, Rockville. (2 pages).

\* cited by examiner

TARGET TO TREAT A METABOLIC DISEASE IN AN INDIVIDUAL

CROSS-REFERENCE TO RELATED APPLICATIONS

This application is filed under the provisions of 35 U.S.C. § 371 and claims the priority of International Patent Application No. PCT/EP2019/073981 filed on 9 Sep. 2019 entitled "NOVEL TARGET TO TREAT A METABOLIC DISEASE IN AN INDIVIDUAL" in the name of Patricia ASPICHUETA CELAÁ, et al., which claims priority to European Patent Application No. 18382648.6, filed on 10 Sep. 2018, both of which are hereby incorporated by reference herein in their entirety.

SEQUENCE LISTING

The present application is being filed along with a Sequence Listing in electronic format. The Sequence Listing is provided as a file entitled SEQUENCE LISTING_ST25.txt, which is 116 KB in size. The information in the electronic format of the sequence listing is incorporated herein by reference in its entirety.

FIELD

Provided herein are methods, compounds, and compositions useful for reducing expression or activity of methionine adenosyltransferase 1a (hereinafter referred to as MAT1a) in an individual. Also, provided herein are methods, compounds, and compositions comprising MAT1a specific inhibitors, which can be useful in reducing MAT1a-related diseases or conditions in an individual. Such methods, compounds, and compositions can be useful, for example, to treat, prevent, delay or ameliorate metabolic disease in an individual.

BACKGROUND

Summary

Provided herein are compositions, compounds and methods for modulating expression of MAT1a-associated with metabolic diseases or disorders. In certain embodiments, these compositions, compounds and methods are for modulating the expression of MAT1a. In certain embodiments, the MAT1a modulator is a MAT1a-specific inhibitor. In certain embodiments, the MAT1a-specific inhibitor decreases expression or activity of MAT1a. In certain embodiments, MAT1a-specific inhibitors include nucleic acids, proteins and small molecules. In certain embodiments, the MAT1a-specific inhibitor is a nucleic acid. In certain embodiments, the MAT1a-specific inhibitor comprises a modified oligonucleotide. In certain embodiments, the modified oligonucleotide can be single stranded or double stranded.

Certain embodiments are directed to MAT1a specific inhibitors useful for inhibiting MAT1a, which can be useful for treating, ameliorating, or slowing progression of a metabolic disease or disorder. In certain embodiments, the metabolic disease or disorder is obesity, diabetes, insulin resistance, dyslipidemia, or liver disease. Certain embodiments relate to the novel findings of antisense inhibition of MAT1a resulting in several endpoint lowering. Certain embodiments are directed to MAT1a specific inhibitors useful in improving lowering of adiposity, increase in adiponectin levels, increased insulin sensitivity, reduction of body weight, reduction of serum triglyceride levels, and improvement in fatty liver.

Figure 1:
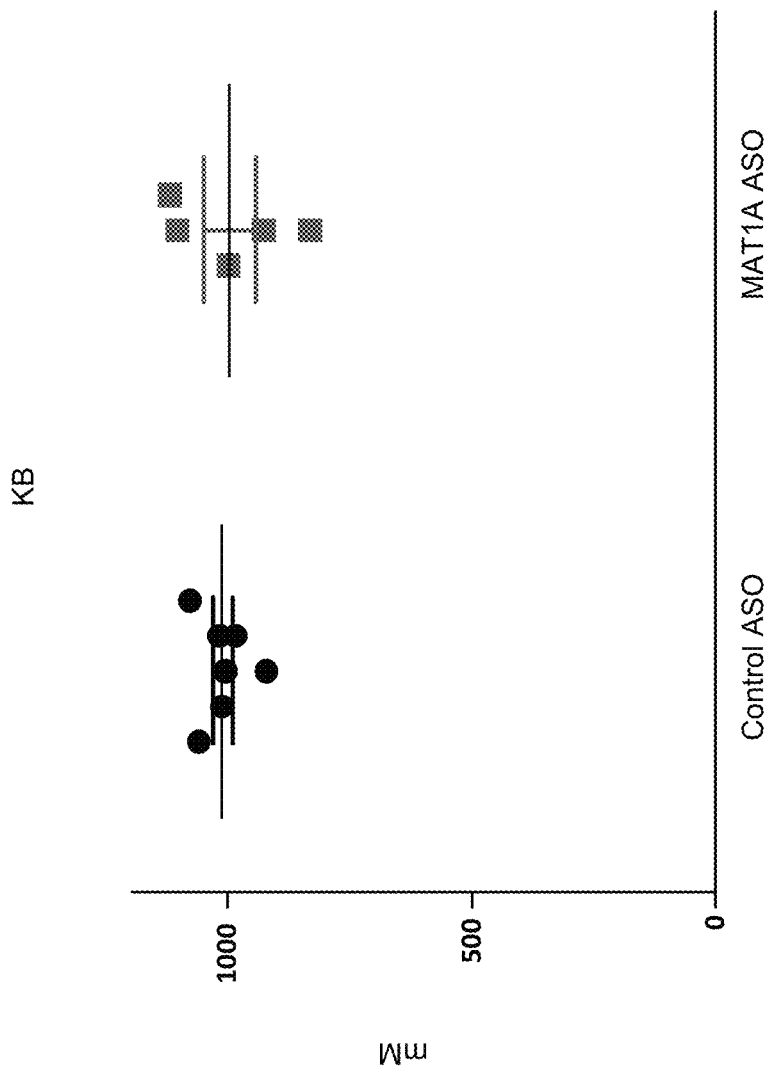
FIG. 1: MAT1A knockdown does not change serum ketone bodies levels. 2-month-old C57BL/6j mice were fed a high fat diet (HFD) during 10 weeks. Last 4 weeks mice were treated with a gene silencing antisenseoligonucleotide (ASO) for MAT1A (25 mg/kg) (n=5-7), ION Compound No. 1018060, or control ASO (25 mg/kg) (n=5-7), ION Compound No. 141923, once a week until sacrificed. Serum KB levels are represented as the media±standard deviation.

Statistically significant differences between Control ASO and MAT1a ASO are indicated by *p<0.05, p<0.01 and *p<0.001; and between control and treatment by #p<0.05, ##p<0.01 and ###p<0.001 (Student's test).

DETAILED DESCRIPTION

It is to be understood that both the foregoing general description and the following detailed description are exemplary and explanatory only and are not restrictive of the embodiments, as claimed. Herein, the use of the singular includes the plural unless specifically stated otherwise. As used herein, the use of "or" means "and/or" unless stated otherwise. Furthermore, the use of the term "including" as well as other forms, such as "includes" and "included", is not limiting.

The section headings used herein are for organizational purposes only and are not to be construed as limiting the subject matter described. All documents, or portions of documents, cited in this application, including, but not limited to, patents, patent applications, articles, books, treatises, and GenBank and NCBI reference sequence records are hereby expressly incorporated by reference for the portions of the document discussed herein, as well as in their entirety.

It is understood that the sequence set forth in each SEQ ID NO in the examples contained herein is independent of any modification to a sugar moiety, an internucleoside linkage, or a nucleobase. As such, compounds defined by a SEQ ID NO may comprise, independently, one or more modifications to a sugar moiety, an internucleoside linkage, or a nucleobase. Compounds described by IONIS number (ION #) indicate a combination of nucleobase sequence, chemical modification, and motif.

Unless otherwise indicated, the following terms have the following meanings:

"2'-deoxynucleoside" means a nucleoside comprising 2'-H(H) furanosyl sugar moiety, as found in naturally occurring deoxyribonucleic acids (DNA). In certain embodiments, a 2'-deoxynucleoside may comprise a modified nucleobase or may comprise an RNA nucleobase (uracil).

"2'-O-methoxyethyl" (also 2'-MOE and 2'-O(CH$_2$)$_2$—OCH$_3$) refers to an O-methoxy-ethyl modification at the 2' position of a furanosyl ring. A 2'-O-methoxyethyl modified sugar is a modified sugar.

"2'-MOE nucleoside" (also 2'-O-methoxyethyl nucleoside) means a nucleoside comprising a 2'-MOE modified sugar moiety.

"2'-substituted nucleoside" or "2-modified nucleoside" means a nucleoside comprising a 2'-substituted or 2'-modified sugar moiety. As used herein, "2'-substituted" or "2-modified" in reference to a sugar moiety means a sugar moiety comprising at least one 2-substituent group other than H or OH.

"3' target site" refers to the nucleotide of a target nucleic acid which is complementary to the 3'-most nucleotide of a particular compound.

"5' target site" refers to the nucleotide of a target nucleic acid which is complementary to the 5'-most nucleotide of a particular compound.

"5-methylcytosine" means a cytosine with a methyl group attached to the 5 position.

"About" means within +10% of a value. For example, if it is stated, "the compounds affected about 70% inhibition of MAT1a", it is implied that MAT1a levels are inhibited within a range of 60% and 80%.

"Administration" or "administering" refers to routes of introducing a compound or composition provided herein to an individual to perform its intended function. An example of a route of administration that can be used includes, but is not limited to parenteral administration, such as subcutaneous, intravenous, or intramuscular injection or infusion.

"Administered concomitantly" or "co-administration" means administration of two or more compounds in any manner in which the pharmacological effects of both are manifest in the patient. Concomitant administration does not require that both compounds be administered in a single pharmaceutical composition, in the same dosage form, by the same route of administration, or at the same time. The effects of both compounds need not manifest themselves at the same time. The effects need only be overlapping for a period of time and need not be coextensive. Concomitant administration or co-administration encompasses administration in parallel or sequentially.

"Amelioration" refers to an improvement or lessening of at least one indicator, sign, or symptom of an associated disease, disorder, or condition. In certain embodiments, amelioration includes a delay or slowing in the progression or severity of one or more indicators of a condition or disease. The progression or severity of indicators may be determined by subjective or objective measures, which are known to those skilled in the art.

"Animal" refers to a human or non-human animal, including, but not limited to, mice, rats, rabbits, dogs, cats, pigs, and non-human primates, including, but not limited to, monkeys and chimpanzees.

"Antisense activity" means any detectable and/or measurable activity attributable to the hybridization of an antisense compound to its target nucleic acid. In certain embodiments, antisense activity is a decrease in the amount or expression of a target nucleic acid or protein encoded by such target nucleic acid compared to target nucleic acid levels or target protein levels in the absence of the antisense compound to the target.

"Antisense compound" means a compound comprising an oligonucleotide and optionally one or more additional features, such as a conjugate group or terminal group. Examples of antisense compounds include single-stranded and double-stranded compounds, such as, oligonucleotides, ribozymes, siRNAs, shRNAs, ssRNAs, and occupancy-based compounds.

"Antisense inhibition" means reduction of target nucleic acid levels in the presence of an antisense compound complementary to a target nucleic acid compared to target nucleic acid levels in the absence of the antisense compound.

"Antisense mechanisms" are all those mechanisms involving hybridization of a compound with target nucleic acid, wherein the outcome or effect of the hybridization is either target degradation or target occupancy with concomitant stalling of the cellular machinery involving, for example, transcription or splicing.

"Antisense oligonucleotide" means an oligonucleotide having a nucleobase sequence that is complementary to a target nucleic acid or region or segment thereof. In certain embodiments, an antisense oligonucleotide is specifically hybridizable to a target nucleic acid or region or segment thereof.

"Bicyclic nucleoside" or "BNA" means a nucleoside comprising a bicyclic sugar moiety. "Bicyclic sugar" or "bicyclic sugar moiety" means a modified sugar moiety comprising two rings, wherein the second ring is formed via a bridge connecting two of the atoms in the first ring thereby forming a bicyclic structure. In certain embodiments, the first ring of the bicyclic sugar moiety is a furanosyl moiety. In certain embodiments, the bicyclic sugar moiety does not comprise a furanosyl moiety.

"cEt" or "constrained ethyl" means a bicyclic furanosyl sugar moiety comprising a bridge connecting the 4'-carbon and the 2'-carbon, wherein the bridge has the formula: 4'-CH(CH$_3$)—O-2'.

"Chemical modification" in a compound describes the substitutions or changes through chemical reaction, of any of the units in the compound. "Modified nucleoside" means a nucleoside having, independently, a modified sugar moiety and/or modified nucleobase. "Modified oligonucleotide" means an oligonucleotide comprising at least one modified internucleoside linkage, a modified sugar, and/or a modified nucleobase.

"Chemically distinct region" refers to a region of a compound that is in some way chemically different than another region of the same compound. For example, a region having 2'-O-methoxyethyl nucleotides is chemically distinct from a region having nucleotides without 2'-O-methoxyethyl modifications.

"Chimeric antisense compounds" means antisense compounds that have at least 2 chemically distinct regions, each position having a plurality of subunits.

"Cleavable bond" means any chemical bond capable of being split. In certain embodiments, a cleavable bond is selected from among: an amide, a polyamide, an ester, an ether, one or both esters of a phosphodiester, a phosphate ester, a carbamate, a di-sulfide, or a peptide.

"Cleavable moiety" means a bond or group of atoms that is cleaved under physiological conditions, for example, inside a cell, an animal, or a human.

"Complementary" in reference to an oligonucleotide means the nucleobase sequence of such oligonucleotide or one or more regions thereof matches the nucleobase sequence of another oligonucleotide or nucleic acid or one or more regions thereof when the two nucleobase sequences are aligned in opposing directions. Nucleobase matches or complementary nucleobases, as described herein, are limited to the following pairs: adenine (A) and thymine (T), adenine (A) and uracil (U), cytosine (C) and guanine (G), and 5-methyl cytosine ($^m$C) and guanine (G) unless otherwise specified. Complementary oligonucleotides and/or nucleic acids need not have nucleobase complementarity at each nucleoside and may include one or more nucleobase mismatches. By contrast, "fully complementary" or "100% complementary" in reference to oligonucleotides means that such oligonucleotides have nucleobase matches at each nucleoside without any nucleobase mismatches.

"Contiguous" in the context of an oligonucleotide refers to nucleosides, nucleobases, sugar moieties, or internucleoside linkages that are immediately adjacent to each other. For example, "contiguous nucleobases" means nucleobases that are immediately adjacent to each other in a sequence.

"Designing" or "Designed to" refer to the process of designing a compound that specifically hybridizes with a selected nucleic acid molecule.

"Diluent" means an ingredient in a composition that lacks pharmacological activity, but is pharmaceutically necessary or desirable. For example, the diluent in an injected composition can be a liquid, e.g. saline solution.

"Differently modified" mean chemical modifications or chemical substituents that are different from one another, including absence of modifications. Thus, for example, a MOE nucleoside and an unmodified DNA nucleoside are "differently modified," even though the DNA nucleoside is unmodified. Likewise, DNA and RNA are "differently modified," even though both are naturally-occurring unmodified nucleosides. Nucleosides that are the same but for comprising different nucleobases are not differently modified. For example, a nucleoside comprising a 2'-OMe modified sugar and an unmodified adenine nucleobase and a nucleoside comprising a 2'-OMe modified sugar and an unmodified thymine nucleobase are not differently modified.

"Dose" means a specified quantity of a compound or pharmaceutical agent provided in a single administration, or in a specified time period. In certain embodiments, a dose may be administered in two or more boluses, tablets, or injections. For example, in certain embodiments, where subcutaneous administration is desired, the desired dose may require a volume not easily accommodated by a single injection. In such embodiments, two or more injections may be used to achieve the desired dose. In certain embodiments, a dose may be administered in two or more injections to minimize injection site reaction in an individual. In other embodiments, the compound or pharmaceutical agent is administered by infusion over an extended period of time or continuously. Doses may be stated as the amount of pharmaceutical agent per hour, day, week or month.

"Dosing regimen" is a combination of doses designed to achieve one or more desired effects.

"Double-stranded compound" means a compound comprising two oligomeric compounds that are complementary to each other and form a duplex, and wherein one of the two said oligomeric compounds comprises an oligonucleotide.

"MAT1a" means methionine adenosyltransferase 1a and refers to any nucleic acid of MAT1a. For example, in certain embodiments, MAT1a includes a DNA sequence encoding MAT1a, an RNA sequence transcribed from DNA encoding MAT1a (including genomic DNA comprising introns and exons). The target may be referred to in either upper or lower case.

"MAT1a-specific inhibitor" refers to any agent capable of specifically inhibiting MAT1a expression or activity at the molecular level. For example, MAT1a-specific inhibitors include nucleic acids (including antisense compounds), peptides, antibodies, small molecules, and other agents capable of inhibiting the expression or activity of MAT1a.

"Effective amount" means the amount of compound sufficient to effectuate a desired physiological outcome in an individual in need of the compound. The effective amount may vary among individuals depending on the health and physical condition of the individual to be treated, the taxonomic group of the individuals to be treated, the formulation of the composition, assessment of the individual's medical condition, and other relevant factors.

"Efficacy" means the ability to produce a desired effect.

"Expression" includes all the functions by which a gene's coded information is converted into structures present and operating in a cell. Such structures include, but are not limited to the products of transcription and translation.

"Gapmer" means an oligonucleotide comprising an internal region having a plurality of nucleosides that support RNase H cleavage positioned between external regions having one or more nucleosides, wherein the nucleosides comprising the internal region are chemically distinct from the nucleoside or nucleosides comprising the external regions. The internal region may be referred to as the "gap" and the external regions may be referred to as the "wings."

"Hybridization" means annealing of oligonucleotides and/or nucleic acids. While not limited to a particular mechanism, the most common mechanism of hybridization involves hydrogen bonding, which may be Watson-Crick, Hoogsteen or reversed Hoogsteen hydrogen bonding, between complementary nucleobases. In certain embodiments, complementary nucleic acid molecules include, but are not limited to, an antisense compound and a nucleic acid target. In certain embodiments, complementary nucleic acid molecules include, but are not limited to, an oligonucleotide and a nucleic acid target.

"Immediately adjacent" means there are no intervening elements between the immediately adjacent elements of the same kind (e.g. no intervening nucleobases between the immediately adjacent nucleobases).

"Individual" means a human or non-human animal selected for treatment or therapy.

"Inhibiting the expression or activity" refers to a reduction or blockade of the expression or activity relative to the expression of activity in an untreated or control sample and does not necessarily indicate a total elimination of expression or activity.

"Internucleoside linkage" means a group or bond that forms a covalent linkage between adjacent nucleosides in an oligonucleotide. "Modified internucleoside linkage" means any internucleoside linkage other than a naturally occurring, phosphate internucleoside linkage. Non-phosphate linkages are referred to herein as modified internucleoside linkages.

"Lengthened oligonucleotides" are those that have one or more additional nucleosides relative to an oligonucleotide disclosed herein, e.g. a parent oligonucleotide.

"Linked nucleosides" means adjacent nucleosides linked together by an internucleoside linkage.

"Mismatch" or "non-complementary" means a nucleobase of a first oligonucleotide that is not complementary to the corresponding nucleobase of a second oligonucleotide or target nucleic acid when the first and second oligonucleotides are aligned. For example, nucleobases including but not limited to a universal nucleobase, inosine, and hypoxanthine, are capable of hybridizing with at least one nucleobase but are still mismatched or non-complementary with respect to nucleobase to which it hybridized. As another example, a nucleobase of a first oligonucleotide that is not capable of hybridizing to the corresponding nucleobase of a second oligonucleotide or target nucleic acid when the first and second oligonucleotides are aligned is a mismatch or non-complementary nucleobase.

"Modulating" refers to changing or adjusting a feature in a cell, tissue, organ or organism. For example, modulating MAT1a can mean to increase or decrease the level of MAT1a in a cell, tissue, organ or organism. A "modulator" effects the change in the cell, tissue, organ or organism. For example, a compound can be a modulator of MAT1a that decreases the amount of MAT1a in a cell, tissue, organ or organism.

"MOE" means methoxyethyl.

"Monomer" refers to a single unit of an oligomer. Monomers include, but are not limited to, nucleosides and nucleotides.

"Motif" means the pattern of unmodified and/or modified sugar moieties, nucleobases, and/or internucleoside linkages, in an oligonucleotide.

"Natural" or "naturally occurring" means found in nature.

"Non-bicyclic modified sugar" or "non-bicyclic modified sugar moiety" means a modified sugar moiety that comprises a modification, such as a substituent, that does not form a bridge between two atoms of the sugar to form a second ring.

"Nucleic acid" refers to molecules composed of monomeric nucleotides. A nucleic acid includes, but is not limited to, ribonucleic acids (RNA), deoxyribonucleic acids (DNA), single-stranded nucleic acids, and double-stranded nucleic acids.

"Nucleobase" means a heterocyclic moiety capable of pairing with a base of another nucleic acid. As used herein a "naturally occurring nucleobase" is adenine (A), thymine (T), cytosine (C), uracil (U), and guanine (G). A "modified nucleobase" is a naturally occurring nucleobase that is chemically modified. A "universal base" or "universal nucleobase" is a nucleobase other than a naturally occurring nucleobase and modified nucleobase, and is capable of pairing with any nucleobase.

"Nucleobase sequence" means the order of contiguous nucleobases in a nucleic acid or oligonucleotide independent of any sugar or internucleoside linkage.

"Nucleoside" means a compound comprising a nucleobase and a sugar moiety. The nucleobase and sugar moiety are each, independently, unmodified or modified. "Modified nucleoside" means a nucleoside comprising a modified nucleobase and/or a modified sugar moiety. Modified nucleosides include abasic nucleosides, which lack a nucleobase.

"Oligomeric compound" means a compound comprising a single oligonucleotide and optionally one or more additional features, such as a conjugate group or terminal group.

"Oligonucleotide" means a polymer of linked nucleosides each of which can be modified or unmodified, independent one from another. Unless otherwise indicated, oligonucleotides consist of 8-80 linked nucleosides. "Modified oligonucleotide" means an oligonucleotide, wherein at least one sugar, nucleobase, or internucleoside linkage is modified. "Unmodified oligonucleotide" means an oligonucleotide that does not comprise any sugar, nucleobase, or internucleoside modification.

"Parent oligonucleotide" means an oligonucleotide whose sequence is used as the basis of design for more oligonucleotides of similar sequence but with different lengths, motifs, and/or chemistries. The newly designed oligonucleotides may have the same or overlapping sequence as the parent oligonucleotide.

"Parenteral administration" means administration through injection or infusion. Parenteral administration includes subcutaneous administration, intravenous administration, intramuscular administration, intraarterial administration, intraperitoneal administration, or intracranial administration, e.g. intrathecal or intracerebroventricular administration.

"Pharmaceutically acceptable carrier or diluent" means any substance suitable for use in administering to an individual. For example, a pharmaceutically acceptable carrier can be a sterile aqueous solution, such as PBS or water-for-injection.

"Pharmaceutically acceptable salts" means physiologically and pharmaceutically acceptable salts of compounds, such as oligomeric compounds or oligonucleotides, i.e., salts that retain the desired biological activity of the parent compound and do not impart undesired toxicological effects thereto.

"Pharmaceutical agent" means a compound that provides a therapeutic benefit when administered to an individual.

"Pharmaceutical composition" means a mixture of substances suitable for administering to an individual. For example, a pharmaceutical composition may comprise one or more compounds or salt thereof and a sterile aqueous solution.

"Phosphorothioate linkage" means a modified phosphate linkage in which one of the non-bridging oxygen atoms is replaced with a sulfur atom. A phosphorothioate internucleoside linkage is a modified internucleoside linkage.

"Phosphorus moiety" means a group of atoms comprising a phosphorus atom. In certain embodiments, a phosphorus moiety comprises a mono-, di-, or tri-phosphate, or phosphorothioate.

"Portion" means a defined number of contiguous (i.e., linked) nucleobases of a nucleic acid. In certain embodiments, a portion is a defined number of contiguous nucleobases of a target nucleic acid. In certain embodiments, a portion is a defined number of contiguous nucleobases of an oligomeric compound.

"Prevent" refers to delaying or forestalling the onset, development or progression of a disease, disorder, or condition for a period of time from minutes to indefinitely.

"Prodrug" means a compound in a form outside the body which, when administered to an individual, is metabolized to another form within the body or cells thereof. In certain embodiments, the metabolized form is the active, or more active, form of the compound (e.g., drug). Typically conversion of a prodrug within the body is facilitated by the action of an enzyme(s) (e.g., endogenous or viral enzyme) or chemical(s) present in cells or tissues, and/or by physiologic conditions.

"Reduce" means to bring down to a smaller extent, size, amount, or number.

"RefSeq No." is a unique combination of letters and numbers assigned to a sequence to indicate the sequence is for a particular target transcript (e.g., target gene). Such sequence and information about the target gene (collectively, the gene record) can be found in a genetic sequence database. Genetic sequence databases include the NCBI Reference Sequence database, GenBank, the European Nucleotide Archive, and the DNA Data Bank of Japan (the latter three forming the International Nucleotide Sequence Database Collaboration or INSDC).

"Region" is defined as a portion of the target nucleic acid having at least one identifiable structure, function, or characteristic.

"RNAi compound" means an antisense compound that acts, at least in part, through RISC or Ago2, but not through RNase H, to modulate a target nucleic acid and/or protein encoded by a target nucleic acid. RNAi compounds include, but are not limited to double-stranded siRNA, single-stranded RNA (ssRNA), and microRNA, including microRNA mimics.

"Segments" are defined as smaller or sub-portions of regions within a nucleic acid.

"Side effects" means physiological disease and/or conditions attributable to a treatment other than the desired effects. In certain embodiments, side effects include injection site reactions, liver function test abnormalities, renal function abnormalities, liver toxicity, renal toxicity, central nervous system abnormalities, myopathies, and malaise. For example, increased aminotransferase levels in serum may indicate liver toxicity or liver function abnormality. For example, increased bilirubin may indicate liver toxicity or liver function abnormality.

"Single-stranded" in reference to a compound means the compound has only one oligonucleotide. "Self-complementary" means an oligonucleotide that at least partially hybridizes to itself. A compound consisting of one oligonucleotide, wherein the oligonucleotide of the compound is self-complementary, is a single-stranded compound. A single-stranded compound may be capable of binding to a complementary compound to form a duplex.

"Sites," are defined as unique nucleobase positions within a target nucleic acid.

"Small molecule" is a low molecular weight (<900 daltons) organic compound that may regulate a biological process.

"Specifically hybridizable" refers to an oligonucleotide having a sufficient degree of complementarity between the oligonucleotide and a target nucleic acid to induce a desired effect, while exhibiting minimal or no effects on non-target nucleic acids. In certain embodiments, specific hybridization occurs under physiological conditions.

"Specifically inhibit" a target nucleic acid means to reduce or block expression of the target nucleic acid while exhibiting fewer, minimal, or no effects on non-target nucleic acids reduction and does not necessarily indicate a total elimination of the target nucleic acid's expression.

"Standard cell assay" means assay(s) described in the Examples and reasonable variations thereof.

"Standard in vivo experiment" means the procedure(s) described in the Example(s) and reasonable variations thereof.

"Sugar moiety" means an unmodified sugar moiety or a modified sugar moiety. "Unmodified sugar moiety" or "unmodified sugar" means a 2'-OH(H) furanosyl moiety, as found in RNA (an "unmodified RNA sugar moiety"), or a 2'-H(H) moiety, as found in DNA (an "unmodified DNA sugar moiety"). Unmodified sugar moieties have one hydrogen at each of the 1', 3', and 4' positions, an oxygen at the 3' position, and two hydrogens at the 5' position. "Modified sugar moiety" or "modified sugar" means a modified furanosyl sugar moiety or a sugar surrogate. "Modified furanosyl sugar moiety" means a furanosyl sugar comprising a non-hydrogen substituent in place of at least one hydrogen of an unmodified sugar moiety. In certain embodiments, a modified furanosyl sugar moiety is a 2'-substituted sugar moiety. Such modified furanosyl sugar moieties include bicyclic sugars and non-bicyclic sugars.

"Sugar surrogate" means a modified sugar moiety having other than a furanosyl moiety that can link a nucleobase to another group, such as an internucleoside linkage, conjugate group, or terminal group in an oligonucleotide. Modified nucleosides comprising sugar surrogates can be incorporated into one or more positions within an oligonucleotide and such oligonucleotides are capable of hybridizing to complementary oligomeric compounds or nucleic acids.

"Synergy" or "synergize" refers to an effect of a combination that is greater than additive of the effects of each component alone at the same doses.

"Target gene" refers to a gene encoding a target.

"Targeting" means specific hybridization of a compound that to a target nucleic acid in order to induce a desired effect.

"Target nucleic acid," "target RNA," "target RNA transcript" and "nucleic acid target" all mean a nucleic acid capable of being targeted by compounds described herein.

"Target region" means a portion of a target nucleic acid to which one or more compounds is targeted.

"Target segment" means the sequence of nucleotides of a target nucleic acid to which a compound described herein is targeted. "5' target site" refers to the 5'-most nucleotide of a target segment. "3' target site" refers to the 3'-most nucleotide of a target segment.

"Terminal group" means a chemical group or group of atoms that is covalently linked to a terminus of an oligonucleotide.

"Therapeutically effective amount" means an amount of a compound, pharmaceutical agent, or composition that provides a therapeutic benefit to an individual.

"Treat" refers to administering a compound or pharmaceutical composition to an individual in order to effect an alteration or improvement of a disease, disorder, or condition in the individual.

Methods and Uses of the Invention

Certain embodiments provide methods, compounds, and compositions for modulating a metabolic condition, or a symptom thereof, in an individual by administering the compound or composition to the individual, wherein the compound or composition comprises a MAT1a modulator. Modulation of MAT1a can lead to a decrease of MAT1a level or expression in order to treat, prevent, ameliorate or delay a metabolic disease or disorder, or a symptom thereof. In certain embodiments, the metabolic disease or disorder is obesity. In certain embodiments, the MAT1a modulator is a MAT1a-specific inhibitor. In certain embodiments, MAT1a-specific inhibitors are nucleic acids (including antisense compounds), peptides, antibodies, small molecules, and other agents capable of inhibiting the expression or activity of MAT1a. In certain embodiments, the individual is human.

Certain embodiments disclosed herein provide compounds or compositions comprising a MAT1a modulator. Such compounds or compositions are useful to treat, prevent, ameliorate or delay a metabolic disease or disorder, or a symptom thereof. In certain embodiments, the metabolic disease or disorder is obesity. In certain embodiments, the MAT1a modulator is a MAT1a-specific inhibitor. In certain embodiments, the MAT1a-specific inhibitor is a nucleic acid, polypeptide, antibody, small molecules, or other agent capable of inhibiting the expression or activity of MAT1a.

The expression of a protein or nucleic acid is considered reduced when its levels decrease by at least 5%, by at least 10%, by at least 15%, by at least 20%, by at least 25%, by at least 30%, by at least 35%, by at least 40%, by at least 45%, by at least 50%, by at least 55%, by at least 60%, by at least 65%, by at least 70%, by at least 75%, by at least 80%, by at least 85%, by at least 90%, by at least 95%, by at least 100% (i.e., absent). Suitable methods for determining whether an inhibitor specific for MAT1a is capable of decreasing MAT1a mRNA levels include, without limitation, standard assays for determining mRNA expression levels such as qPCR, RT-PCR, RNA protection analysis, Northern blot, RNA dot blot, in situ hybridization, microarray technology, tag based methods such as serial analysis of gene expression (SAGE), including variants such as LongSAGE and SuperSAGE, microarrays, fluorescence in situ hybridization (FISH), including variants such as FlowFISH, qFiSH and double fusion FISH (DFISH), and the like. Suitable methods for determining whether an inhibitor acts by decreasing the MAT1a protein levels include the quantification by means of conventional methods, for example, using antibodies with a capacity to specifically bind to the proteins encoded by the Mat1a gene (or to fragments thereof containing antigenic determinants) and subsequent quantification of the resulting antibody-antigen complexes. There are a wide variety of well-known assays that can be used in the present invention, which use nonlabelled antibodies (primary antibody) and labelled antibodies (secondary antibodies); among these techniques are included Western blot or Western transfer, ELISA (enzyme linked immunosorbent assay), RIA (radioimmunoassay), competitive EIA (enzymatic immunoassay), DAS-ELISA (double antibody sandwich ELISA), immunocytochemical and immunohistochemical techniques, techniques based on the use of biochips or protein microarrays including specific antibodies or assays based on colloidal precipitation in formats such as dipsticks. Other ways of detecting and quantifying the levels of the protein of interest include techniques of affinity chromatography, binding ligand assays, etc. A specific MAT1a inhibitor for use in the present invention may specifically inhibit MAT1a activity by at least 5%, at least 10%, at least 25%, at least 50%, at least 75%, or at least 90%, and all ranges between 5% and 100%.

In certain embodiments, the MAT1a-specific inhibitor is an antibody. In certain embodiments, the MAT1a-specific inhibitor is an inhibitory antibody. The term "inhibitory antibody", as used herein, relates to an antibody which specifically binds to MAT1a and is capable of inhibiting, at least partially, the biological activity of MAT1a. Methods for obtaining antibodies are known by the skilled in the art. The antibodies to be employed in these methods can be, for example, polyclonal sera, hybridoma supernatants or monoclonal antibodies, antibody fragments, Fv, Fab, Fab' and F(ab')2, ScFv, diabodies, triabodies, tetrabodies and humanized antibodies.

In certain embodiments, the MAT1a-specific inhibitor is a small molecule. Small molecules capable of inhibiting methionine adenosyltransferase (MAT) proteins have been described elsewhere (John C. Taylor et al., *J Med Chem.* 2009 Oct. 8; 52(19): 5967-5973). In certain embodiments, the small molecule is S903566, (1-(3-(2-ethoxyphenyl)ureidoacetyl)-4-(2-methyl-5-nitrophenyl)semicarbazide, CAS Registry Number 198704-90-4). In certain embodiments, the small molecule is S867349, (1-(4-chloro-2-nitrophenyl)-3-(4-sulfamoylphenyl)urea), CAS Registry Number 197160-37-5. In certain embodiments, the small molecule is S702633, 1,1'-((2-chlorobenzyl)-2-methylphenylene)bis(3-antipyrinylurea), CAS Registry Number 883838-93-5. In certain embodiments, the small molecule is S720844, 1-(4-methyl-2-nitrophenyl)-3-(4-sulfamoylphenyl)urea, CAS Registry Number 200347-89-3. In certain embodiments, the small molecule is S890901, 1,1'-(4-Methyl-1,3-Phenylene) Bis-(3-(3-(Trifluoromethyl)phenyl)urea), CAS Registry Number 200416-79-1.

In certain embodiments, the MAT1a-specific inhibitor is a nucleic acid targeting MAT1a. In certain embodiments, the nucleic acid is single stranded. In certain embodiments, the nucleic acid is double stranded. In certain embodiments, the compound or composition comprises an antisense compound. In any of the foregoing embodiments, the compound or composition comprises an oligomeric compound. In certain embodiments, the compound or composition comprises an oligonucleotide targeting MAT1a. In certain embodiments, the oligonucleotide is single stranded. In certain embodiments, the compound comprises deoxyribonucleotides. In certain embodiments, the compound comprises ribonucleotides and is double-stranded. In certain embodiments, the oligonucleotide is a modified oligonucleotide. In certain embodiments, the modified oligonucleotide is single stranded.

In any of the embodiments described herein, the compound can comprise a modified oligonucleotide consisting of 8 to 80, 10 to 30, 12 to 50, 13 to 30, 13 to 50, 14 to 30, 14 to 50, 15 to 30, 15 to 50, 16 to 30, 16 to 50, 17 to 30, 17 to 50, 18 to 22, 18 to 24, 18 to 30, 18 to 50, 19 to 22, 19 to 30, 19 to 50, or 20 to 30 linked nucleosides.

In certain embodiments, at least one internucleoside linkage of said modified oligonucleotide is a modified internucleoside linkage. In certain embodiments, at least one internucleoside linkage is a phosphorothioate internucleoside linkage. In certain embodiments, the internucleoside linkages are phosphorothioate linkages and phosphate ester linkages.

In certain embodiments, any of the foregoing oligonucleotides comprises at least one modified sugar. In certain embodiments, at least one modified sugar comprises a 2'-O-methoxyethyl group. In certain embodiments, at least one modified sugar is a bicyclic sugar, such as a 4'-CH(CH$_3$)—O-2' group, a 4'-CH$_2$—O-2' group, or a 4'-(CH$_2$)$_2$—O-2' group.

In certain embodiments, at least one nucleoside of said modified oligonucleotide comprises a modified nucleobase. In certain embodiments, the modified nucleobase is a 5-methylcytosine.

Certain embodiments disclosed herein provide a compound or composition comprising a modified oligonucleotide comprising: a) a gap segment consisting of linked deoxynucleosides; b) a 5' wing segment consisting of linked nucleosides; and c) a 3' wing segment consisting of linked nucleosides. The gap segment is positioned between the 5' wing segment and the 3' wing segment and each nucleoside of each wing segment comprises a modified sugar. In certain embodiments, at least one internucleoside linkage is a phosphorothioate linkage. In certain embodiments, and at least one cytosine is a 5-methylcytosine.

In certain embodiments, the compounds or compositions disclosed herein further comprise a pharmaceutically acceptable carrier or diluent.

In certain embodiments, the compound or composition is co-administered with a second agent. In certain embodiments, the compound or composition and the second agent are administered concomitantly.

Certain embodiments disclosed herein provide a method of treating, preventing, delaying or ameliorating a metabolic disease or disorder in an individual comprising administering to the individual a compound or composition described herein comprising a MAT1a-specific inhibitor. In certain embodiments, the metabolic disease or disorder is obesity. In certain embodiments, the MAT1a-specific inhibitor is a nucleic acid, peptide, antibody, small molecule or other agent capable of inhibiting the expression or activity of MAT1a. In certain embodiments, the MAT1a-specific inhibitor comprises a small molecule. In certain embodiments, the MAT1a-specific inhibitor comprises an antisense compound or an oligomeric compound. In certain embodiments, the compound or composition comprises a modified oligonucleotide. In certain embodiments, the modified oligonucleotide is 10 to 30 linked nucleosides in length. In certain embodiments, the individual is human. In certain embodiments, the metabolic disease or disorder is obesity, and other symptoms involving the metabolic pathway. In certain embodiments, the individual is human.

In certain embodiments, a method of inhibiting expression or activity of MAT1a in a cell comprises contacting the cell with a MAT1a-specific inhibitor, thereby inhibiting expression or activity of MAT1a in the cell. In certain embodiments, the cell is a hepatocyte. In certain embodiments, the cell is in the liver. In certain embodiments, the cell is in the liver of an individual who has, or is at risk of having obesity, diabetes, insulin resistance, dyslipidemia, or liver disease. In certain embodiments, the MAT1a-specific inhibitor is targeted to MAT1a, such as an oligonucleotide targeted to MAT1a.

Certain embodiments disclosed herein provide a method of treating an individual at risk for a metabolic disease or disorder comprising administering to the individual a compound or composition comprising a MAT1a-specific inhibitor. In certain embodiments, the MAT1a-specific inhibitor is a nucleic acid, peptide, antibody, small molecule or other agent capable of inhibiting the expression or activity of MAT1a. In certain embodiments, the MAT1a-specific inhibitor comprises a small molecule. In certain embodiments, the compound or composition comprises an antisense compound or an oligomeric compound. In certain embodiments, the compound or composition comprises a modified oligonucleotide. In certain embodiments, the metabolic disease or disorder is obesity, diabetes, insulin resistance, dyslipidemia, or liver disease, and other symptoms involving the metabolic pathway. In certain embodiments, the individual is human.

In certain embodiments, the administering is parenteral administration. In certain embodiments, the parenteral administration is subcutaneous or intravenous administration.

Certain embodiments provide compounds and compositions described herein for use in therapy. Certain embodiments provide compounds and compositions described herein for use in treating, preventing, delaying the onset or slowing progression of a disease related to elevated expression or activity of MAT1a. In certain embodiments, the disease is a metabolic disease or disorder. In certain embodiments, the metabolic disease or disorder is obesity. In certain embodiments, the metabolic disease or disorder is diabetes. In certain embodiments, the metabolic disease or disorder is insulin resistance. In certain embodiments, the metabolic disease or disorder is dyslipidemia. In certain embodiments, the metabolic disease or disorder is liver disease. In certain embodiments, the therapy is used to lowering of adiposity, increase in adiponectin levels, increased insulin sensitivity, reduction of body weight, reduction of serum triglyceride levels, or improvement in fatty liver or a combination thereof. In certain embodiments, the MAT1a-specific inhibitor comprises a small molecule. In certain embodiments, the compound or composition comprises an antisense compound or an oligomeric compound. In certain embodiments, the compound or composition comprises a modified oligonucleotide. In certain embodiments, the compound or composition comprises a modified oligonucleotide 8 to 80 linked nucleosides in length. In certain embodiments, the modified oligonucleotide is 10 to 30 linked nucleosides in length. In certain embodiments, the individual is human. In certain embodiments, the compound or composition is administered to the individual parenterally.

Certain embodiments disclosed herein provide compounds or compositions described herein comprising a MAT1a modulator for the manufacture or preparation of a medicament for therapy. Certain embodiments disclosed herein provide compounds or compositions described herein comprising a MAT1a modulator for the manufacture or preparation of a medicament for treating, preventing, delaying the onset or slowing progression of a disease related to elevated expression or activity of MAT1a. In certain embodiments, the disease is a metabolic disease or disorder. In certain embodiments, the metabolic disease or disorder is obesity. In certain embodiments, the metabolic disease or disorder is diabetes. In certain embodiments, the metabolic disease or disorder is insulin resistance. In certain embodiments, the metabolic disease or disorder is dyslipidemia. In certain embodiments, the metabolic disease or disorder is liver disease. In certain embodiments, the therapy is used to lowering of adiposity, increase in adiponectin levels, increased insulin sensitivity, reduction of body weight, reduction of serum triglyceride levels, or improvement in fatty liver or a combination thereof. In certain embodiments, the compound or composition comprises a modified oligonucleotide 8 to 80 linked nucleosides in length. In certain embodiments, the modified oligonucleotide is 10 to 30 linked nucleosides in length. In certain embodiments, the compound or composition is administered to the individual parenterally.

Certain embodiments disclosed herein provide uses of a compound or composition comprising a modified oligonucleotide with: a) a gap segment consisting of linked deoxynucleosides; b) a 5' wing segment consisting of linked nucleosides; and c) a 3' wing segment consisting of linked nucleosides. The gap segment is positioned between the 5' wing segment and the 3' wing segment and each nucleoside of each wing segment comprises a modified sugar. In certain embodiments, at least one internucleoside linkage is a phosphorothioate linkage. In certain embodiments, and at least one cytosine is a 5-methylcytosine.

In certain embodiments, the compounds or compositions disclosed herein further comprise a pharmaceutically acceptable carrier or diluent.

In certain embodiments, the individual is a human.

In certain embodiments, administration comprises parenteral administration. In certain embodiments, parenteral administration comprises subcutaneous or intravenous administration.

In certain embodiments, the compounds or compositions disclosed herein are designated as a first agent and the methods or uses disclosed herein further comprise administering a second agent. In certain embodiments, the first agent and the second agent are co-administered. In certain embodiments the first agent and the second agent are co-administered sequentially or concomitantly.

Certain embodiments provided herein relate to methods of inhibiting MAT1a expression or activity, which can be useful for treating, preventing, or ameliorating a disease associated with MAT1a in an individual, by administration of a compound or composition that targets MAT1a. In certain embodiments, such a compound or composition comprises a MAT1a-specific inhibitor. In certain embodiments, the compound comprises an antisense compound or an oligomeric compound targeted to MAT1a. In certain embodiments, the compound comprises a modified oligonucleotide targeted to MAT1a.

Examples of diseases associated with a MAT1a treatable, preventable, and/or ameliorable with the methods provided herein include obesity, diabetes, insulin resistance, dyslipidemia, or liver disease, and other symptoms involving the metabolic system.

In certain embodiments, a method of treating, preventing, or ameliorating a disease associated with a metabolic disease or disorder in an individual comprises administering to the individual a compound or composition comprising a MAT1a-specific inhibitor, thereby treating, preventing, or ameliorating the disease. In certain embodiments, the individual is human. In certain embodiments, the MAT1a-specific inhibitor is a nucleic acid, peptide, antibody, small molecule or other agent capable of inhibiting the expression or activity of the MAT1a. In certain embodiments, the MAT1a-specific inhibitor is an antisense compound or an oligomeric compound targeted to MAT1a. In certain embodiments, the MAT1a-specific inhibitor is oligonucleotide targeted to MAT1a. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the MAT1a-specific inhibitor is administered to the individual parenterally.

Certain embodiments disclosed herein provide a method of reducing adiposity in an individual comprising administering to the individual a compound or composition comprising a MAT1a-specific inhibitor. Certain embodiments disclosed herein provide a method of increase in adiponectin levels in an individual comprising administering to the individual a compound or composition comprising a MAT1a-specific inhibitor. Certain embodiments disclosed herein provide a method of increased insulin sensitivity in an individual comprising administering to the individual a compound or composition comprising a MAT1a-specific inhibitor. Certain embodiments disclosed herein provide a method of reduction of body weight in an individual comprising administering to the individual a compound or composition comprising a MAT1a-specific inhibitor. Certain embodiments disclosed herein provide a method of reduction of serum triglyceride levels in an individual comprising administering to the individual a compound or composition comprising a MAT1a-specific inhibitor. Certain embodiments disclosed herein provide a method of improvement in fatty liver levels in an individual comprising administering to the individual a compound or composition comprising a MAT1a-specific inhibitor. In certain embodiments, the individual is human. In certain embodiments, the MAT1a-specific inhibitor is a nucleic acid, peptide, antibody, small molecule or other agent capable of inhibiting the expression or activity of MAT1a. In certain embodiments, the MAT1a-specific inhibitor is an antisense compound or an oligomeric compound targeted to MAT1a. In certain embodiments, the MAT1a-specific inhibitor is oligonucleotide targeted to MAT1a. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the MAT1a-specific inhibitor is administered to the individual parenterally.

Certain embodiments disclosed herein provide a method of improving or regulating of adiposity, adiponectin levels, insulin sensitivity, body weight, serum triglyceride levels, or fatty liver in an individual comprising administering to the individual a compound or composition described herein, comprising a MAT1a-specific inhibitor. In certain embodiments, the individual is human. In certain embodiments, the MAT1a-specific inhibitor is a nucleic acid, peptide, antibody, small molecule or other agent capable of inhibiting the expression or activity of MAT1a. In certain embodiments, the MAT1a-specific inhibitor is an antisense compound or an oligomeric compound targeted to MAT1a. In certain embodiments, the MAT1a-specific inhibitor is oligonucleotide targeted to MAT1a. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the MAT1a specific inhibitor is administered to the individual parenterally.

In certain embodiments, administering a compound or composition disclosed herein improves, regulates, or reduces one or more of adiposity, adiponectin levels, insulin sensitivity, body weight, serum triglyceride levels, or fatty liver, or a combination thereof. In certain embodiments, each endpoint is independently reduced by at least 5%, at least 10%, at least 20%, at least 30%, at least 35%, at least 40%, at least 45% or at least 50%.

Certain embodiments are drawn to a compound or composition comprising a MAT1a-specific inhibitor for use in treating a metabolic disease or disorder. In certain embodiments, the metabolic disease or disorder may be one or more of obesity, diabetes, insulin resistance, dyslipidemia, or liver disease, and other symptoms involving the metabolic pathway. In certain embodiments, the MAT1a-specific inhibitor is a nucleic acid, peptide, antibody, small molecule or other agent capable of inhibiting the expression or activity of MAT1a. In certain embodiments, the MAT1a-specific inhibitor is a small molecule. In certain embodiments, the MAT1a-specific inhibitor is an antisense compound or an oligomeric compound targeted to MAT1a. In certain embodiments, the MAT1a-specific inhibitor is oligonucleotide targeted to MAT1a. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound comprising a modified oligonucleotide can be single-stranded. In certain embodiments, the compound comprising a modified oligonucleotide can be double-stranded. In certain embodiments, the MAT1a-specific inhibitor is administered to the individual parenterally.

In certain embodiments, a compound or composition for the use disclosed herein results in adiposity, adiponectin levels, insulin sensitivity, body weight, serum triglyceride levels, or fatty liver independently reduced by at least 5%, at least 10%, at least 20%, at least 30%, at least 35%, at least 40%, at least 45% or at least 50%.

Certain embodiments provide the use of a compound or composition as described herein in the manufacture or preparation of a medicament for treating, ameliorating, delaying or preventing one or more diseases, disorders, conditions, symptoms or physiological markers associated with MAT1a. In certain embodiments, the compound or composition as described herein is used in the manufacture or preparation of a medicament for treating, ameliorating, delaying or preventing a metabolic disease or disorder, or a symptom or physiological marker thereof. In certain embodiments, the metabolic disease or disorder is obesity, diabetes, insulin resistance, dyslipidemia, or liver disease. In certain embodiments, the compound or composition comprises a nucleic acid, peptide, antibody, small molecule or other agent capable of inhibiting the expression or activity of MAT1a. In certain embodiments, the MAT1a-specific inhibitor is a small molecule. In certain embodiments, the compound or composition comprises an antisense compound or an oligomeric compound targeted to MAT1a. In certain embodiments, the compound or composition comprises an oligonucleotide targeted to MAT1a. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound or composition comprising a modified oligonucleotide can be single-stranded. In certain embodiments, the compound or composition comprising a modified oligonucleotide can be double-stranded.

Certain embodiments are drawn to use of a compound or composition for the manufacture or preparation of a medicament for treating a metabolic disease or disorder. Examples of such metabolic diseases or disorders are obesity, diabetes, insulin resistance, dyslipidemia, or liver disease, and other symptoms involving the metabolic pathway. In certain embodiments, the compound or composition comprises a nucleic acid, peptide, antibody, small molecule or other agent capable of inhibiting the expression or activity of MAT1a. In certain embodiments, the MAT1a-specific inhibitor is a small molecule. In certain embodiments, the compound or composition comprises an antisense compound or an oligomeric compound targeted to MAT1a. In certain embodiments, the compound or composition comprises an oligonucleotide targeted to MAT1a. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound or composition comprising a modified oligonucleotide can be single-stranded. In certain embodiments, the compound or composition comprising a modified oligonucleotide can be double-stranded.

Certain embodiments are drawn to use of a compound or composition for the manufacture or preparation of a medicament for decreasing/increasing adiposity, adiponectin levels, insulin sensitivity, body weight, serum triglyceride levels, or fatty liver, or a combination thereof in an individual having or at risk of having a metabolic disease or disorder. In certain embodiments, the compound or composition comprises a nucleic acid, peptide, antibody, small molecule or other agent capable of inhibiting the expression or activity of Mat1a. In certain embodiments, the MAT1a-specific inhibitor is a small molecule. In certain embodiments, the compound or composition comprises an antisense compound or an oligomeric compound targeted to Mat1a. In certain embodiments, the compound or composition comprises an oligonucleotide targeted to Mat1a. In certain embodiments, the compound or composition comprises a modified oligonucleotide 8 to 80 linked nucleosides in length. In certain embodiments, the compound or composition comprises a modified oligonucleotide 10 to 30 linked nucleosides in length. In certain embodiments, the compound or composition comprising a modified oligonucleotide can be single-stranded. In certain embodiments, the compound or composition comprising a modified oligonucleotide can be double-stranded.

In any of the foregoing methods or uses, the compound or composition comprises an antisense compound targeted to Mat1a. In certain embodiments, the compound comprises an oligonucleotide, for example an oligonucleotide consisting of 8 to 80 linked nucleosides, 10 to 30 linked nucleosides, 12 to 30 linked nucleosides, or 20 linked nucleosides. In certain embodiments, the oligonucleotide comprises at least one modified internucleoside linkage, at least one modified sugar and/or at least one modified nucleobase. In certain embodiments, the modified internucleoside linkage is a phosphorothioate internucleoside linkage, the modified sugar is a bicyclic sugar or a 2'-O-methoxyethyl, and the modified nucleobase is a 5-methylcytosine. In certain embodiments, the modified oligonucleotide comprises a gap segment consisting of linked deoxynucleosides; a 5' wing segment consisting of linked nucleosides; and a 3' wing segment consisting of linked nucleosides, wherein the gap segment is positioned immediately adjacent to and between the 5' wing segment and the 3' wing segment and wherein each nucleoside of each wing segment comprises a modified sugar.

In any of the foregoing methods or uses, the compound or composition comprises or consists of a modified oligonucleotide 12 to 30 linked nucleosides in length, wherein the modified oligonucleotide comprises:
a gap segment consisting of linked 2'-deoxynucleosides;
a 5' wing segment consisting of linked nucleosides; and
a 3' wing segment consisting of linked nucleosides;
wherein the gap segment is positioned between the 5' wing segment and the 3' wing segment and wherein each nucleoside of each wing segment comprises a modified sugar.

In any of the foregoing methods or uses, the compound or composition can be administered parenterally. For example, in certain embodiments the compound or composition can be administered through injection or infusion. Parenteral administration includes subcutaneous administration, intravenous administration, intramuscular administration, intraarterial administration, intraperitoneal administration, or intracranial administration. In certain embodiments, the parenteral administration is subcutaneous or intravenous administration. In certain embodiments, the compound or composition is co-administered with a second agent. In certain embodiments, the compound or composition and the second agent are administered concomitantly.

In certain embodiments, compounds described herein are antisense compounds. In certain embodiments, the antisense compound comprises or consists of an oligomeric compound. In certain embodiments, the oligomeric compound comprises a modified oligonucleotide. In certain embodiments, the modified oligonucleotide has a nucleobase sequence complementary to that of a target nucleic acid.

In certain embodiments, a compound described herein comprises or consists of a modified oligonucleotide. In certain embodiments, the modified oligonucleotide has a nucleobase sequence complementary to that of a target nucleic acid.

In certain embodiments, a compound or antisense compound is single-stranded. Such a single-stranded compound or antisense compound comprises or consists of an oligomeric compound. In certain embodiments, such an oligomeric compound comprises or consists of an oligonucleotide. In certain embodiments, the oligonucleotide is an antisense oligonucleotide. In certain embodiments, the oligonucleotide is modified. In certain embodiments, the oligonucleotide of a single-stranded antisense compound or oligomeric compound comprises a self-complementary nucleobase sequence.

In certain embodiments, compounds are double-stranded. Such double-stranded compounds comprise a first modified oligonucleotide having a region complementary to a target nucleic acid and a second modified oligonucleotide having a region complementary to the first modified oligonucleotide. In certain embodiments, the modified oligonucleotide is an RNA oligonucleotide. In such embodiments, the thymine nucleobase in the modified oligonucleotide is replaced by a uracil nucleobase. In certain embodiments, compound comprises a conjugate group. In certain embodiments, each modified oligonucleotide is 12-30 linked nucleosides in length.

In certain embodiments, compounds are double-stranded. Such double-stranded compounds comprise a first oligomeric compound having a region complementary to a target nucleic acid and a second oligomeric compound having a region complementary to the first oligomeric compound. The first oligomeric compound of such double stranded compounds typically comprises or consists of a modified oligonucleotide. The oligonucleotide of the second oligomeric compound of such double-stranded compound may be modified or unmodified. The oligomeric compounds of double-stranded compounds may include non-complementary overhanging nucleosides.

Examples of single-stranded and double-stranded compounds include but are not limited to oligonucleotides, siRNAs, microRNA targeting oligonucleotides, and single-stranded RNAi compounds, such as small hairpin RNAs (shRNAs), single-stranded siRNAs (ssRNAs), and microRNA mimics.

In certain embodiments, a compound described herein has a nucleobase sequence that, when written in the 5' to 3' direction, comprises the reverse complement of the target segment of a target nucleic acid to which it is targeted.

In certain embodiments, a compound described herein comprises an oligonucleotide 10 to 30 linked subunits in length. In certain embodiments, compound described herein comprises an oligonucleotide is 12 to 30 linked subunits in length. In certain embodiments, compound described herein comprises an oligonucleotide is 12 to 22 linked subunits in length. In certain embodiments, compound described herein comprises an oligonucleotide is 14 to 30 linked subunits in length. In certain embodiments, compound described herein comprises an oligonucleotide is 14 to 20 linked subunits in length. In certain embodiments, compound described herein comprises an oligonucleotide is 15 to 30 linked subunits in length. In certain embodiments, compound described herein comprises an oligonucleotide is 15 to 20 linked subunits in length. In certain embodiments, compound described herein comprises an oligonucleotide is 16 to 30 linked subunits in length. In certain embodiments, compound described herein comprises an oligonucleotide is 16 to 20 linked subunits in length. In certain embodiments, compound described herein comprises an oligonucleotide is 17 to 30 linked subunits in length. In certain embodiments, compound described herein comprises an oligonucleotide is 17 to 20 linked subunits in length. In certain embodiments, compound described herein comprises an oligonucleotide is 18 to 30 linked subunits in length. In certain embodiments, compound described herein comprises an oligonucleotide is 18 to 21 linked subunits in length. In certain embodiments, compound described herein comprises an oligonucleotide is 18 to 20 linked subunits in length. In certain embodiments, compound described herein comprises an oligonucleotide is 20 to 30 linked subunits in length. In other words, such oligonucleotides are from 12 to 30 linked subunits, 14 to 30 linked subunits, 14 to 20 subunits, 15 to 30 subunits, 15 to 20 subunits, 16 to 30 subunits, 16 to 20 subunits, 17 to 30 subunits, 17 to 20 subunits, 18 to 30 subunits, 18 to 20 subunits, 18 to 21 subunits, 20 to 30 subunits, or 12 to 22 linked subunits, respectively. In certain embodiments, a compound described herein comprises an oligonucleotide 14 linked subunits in length. In certain embodiments, a compound described herein comprises an oligonucleotide 16 linked subunits in length. In certain embodiments, a compound described herein comprises an oligonucleotide 17 linked subunits in length. In certain embodiments, compound described herein comprises an oligonucleotide 18 linked subunits in length. In certain embodiments, a compound described herein comprises an oligonucleotide 19 linked subunits in length. In certain embodiments, a compound described herein comprises an oligonucleotide 20 linked subunits in length. In other embodiments, a compound described herein comprises an oligonucleotide 8 to 80, 12 to 50, 13 to 30, 13 to 50, 14 to 30, 14 to 50, 15 to 30, 15 to 50, 16 to 30, 16 to 50, 17 to 30, 17 to 50, 18 to 22, 18 to 24, 18 to 30, 18 to 50, 19 to 22, 19 to 30, 19 to 50, or 20 to 30 linked subunits. In certain such embodiments, the compound described herein comprises an oligonucleotide 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 linked subunits in length, or a range defined by any two of the above values. In some embodiments the linked subunits are nucleotides, nucleosides, or nucleobases.

In certain embodiments, compounds may be shortened or truncated. For example, a single subunit may be deleted from the 5' end (5' truncation), or alternatively from the 3' end (3' truncation). A shortened or truncated compound targeted to a MAT1a nucleic acid may have two subunits deleted from the 5' end, or alternatively may have two subunits deleted from the 3' end, of the compound. Alternatively, the deleted nucleosides may be dispersed throughout the compound.

When a single additional subunit is present in a lengthened compound, the additional subunit may be located at the 5' or 3' end of the compound. When two or more additional subunits are present, the added subunits may be adjacent to each other, for example, in a compound having two subunits added to the 5' end (5' addition), or alternatively to the 3' end (3' addition), of the compound. Alternatively, the added subunits may be dispersed throughout the compound.

It is possible to increase or decrease the length of a compound, such as an oligonucleotide, and/or introduce mismatch bases without eliminating activity (Woolf et al. (Proc. Natl. Acad. Sci. USA 89:7305-7309, 1992; Gautschi et al. *J Natl. Cancer Inst.* 93:463-471, March 2001; Maher and Dolnick *Nuc. Acid. Res.* 16:3341-3358,1988). However, seemingly small changes in oligonucleotide sequence, chemistry and motif can make large differences in one or more of the many properties required for clinical development (Seth et al. *J. Med. Chem.* 2009, 52, 10; Egli et al. *J. Am. Chem. Soc.* 2011, 133, 16642).

In certain embodiments, compounds described herein are interfering RNA compounds (RNAi), which include double-stranded RNA compounds (also referred to as short-interfering RNA or siRNA) and single-stranded RNAi compounds (or ssRNA). Such compounds work at least in part through the RISC pathway to degrade and/or sequester a target nucleic acid (thus, include microRNA/microRNA-mimic compounds). As used herein, the term siRNA is meant to be equivalent to other terms used to describe nucleic acid molecules that are capable of mediating sequence specific RNAi, for example short interfering RNA (siRNA), double-stranded RNA (dsRNA), micro-RNA (miRNA), short hairpin RNA (shRNA), short interfering oligonucleotide, short interfering nucleic acid, short interfering modified oligonucleotide, chemically modified siRNA, post-transcriptional gene silencing RNA (ptgsRNA), and others. In addition, as used herein, the term RNAi is meant to be equivalent to other terms used to describe sequence specific RNA interference, such as post transcriptional gene silencing, translational inhibition, or epigenetics.

In certain embodiments, a double-stranded compound comprises a first strand comprising the nucleobase sequence complementary to a target region of a MAT1a nucleic acid and a second strand. In certain embodiments, the double-stranded compound comprises ribonucleotides in which the first strand has uracil (U) in place of thymine (T) and is complementary to a target region. In certain embodiments, a double-stranded compound comprises (i) a first strand comprising a nucleobase sequence complementary to a target region of a MAT1a nucleic acid, and (ii) a second strand. In certain embodiments, the double-stranded compound comprises one or more modified nucleotides in which the 2' position in the sugar contains a halogen (such as fluorine group; 2'-F) or contains an alkoxy group (such as a methoxy group; 2'-OMe). In certain embodiments, the double-stranded compound comprises at least one 2'-F sugar modification and at least one 2'-OMe sugar modification. In certain embodiments, the at least one 2'-F sugar modification and at least one 2'-OMe sugar modification are arranged in an alternating pattern for at least 2, 3, 4, 5, 6, 7, 8, 9, 10, 11, 12, 13, 14, 15, 16, 17, 18, 19, or 20 contiguous nucleobases along a strand of the dsRNA compound. In certain embodiments, the double-stranded compound comprises one or more linkages between adjacent nucleotides other than a naturally-occurring phosphodiester linkage. Examples of such linkages include phosphoramide, phosphorothioate, and phosphorodithioate linkages. The double-stranded compounds may also be chemically modified nucleic acid molecules as taught in U.S. Pat. No. 6,673,661. In other embodiments, the dsRNA contains one or two capped strands, as disclosed, for example, by WO 00/63364, filed Apr. 19, 2000. In certain embodiments, the first strand of the double-stranded compound is an siRNA guide strand and the second strand of the double-stranded compound is an siRNA passenger strand. In certain embodiments, the second strand of the double-stranded compound is complementary to the first strand. In certain embodiments, each strand of the double-stranded compound consists of 16, 17, 18, 19, 20, 21, 22, or 23 linked nucleosides.

In certain embodiments, a single-stranded compound described herein can comprise any of the oligonucleotide sequences targeted to MAT1a described herein. In certain embodiments, such a single-stranded compound is a single-stranded RNAi (ssRNAi) compound. In certain embodiments, a ssRNAi compound comprises the nucleobase sequence complementary to a target region of a MAT1a nucleic acid. In certain embodiments, the ssRNAi compound comprises ribonucleotides in which uracil (U) is in place of thymine (T). In certain embodiments, ssRNAi compound comprises a nucleobase sequence complementary to a target region of a MAT1a nucleic acid. In certain embodiments, a ssRNAi compound comprises one or more modified nucleotides in which the 2' position in the sugar contains a halogen (such as fluorine group; 2'-F) or contains an alkoxy group (such as a methoxy group; 2'-OMe). In certain embodiments, a ssRNAi compound comprises at least one 2'-F sugar modification and at least one 2'-OMe sugar modification. In certain embodiments, the at least one 2'-F sugar modification and at least one 2'-OMe sugar modification are arranged in an alternating pattern for at least 2, 3, 4, 5, 6, 7, 8, 9, 10, 11, 12, 13, 14, 15, 16, 17, 18, 19, or 20 contiguous nucleobases along a strand of the ssRNAi compound. In certain embodiments, the ssRNAi compound comprises one or more linkages between adjacent nucleotides other than a naturally-occurring phosphodiester linkage. Examples of such linkages include phosphoramide, phosphorothioate, and phosphorodithioate linkages. The ssRNAi compounds may also be chemically modified nucleic acid molecules as taught in U.S. Pat. No. 6,673,661. In other embodiments, the ssRNAi contains a capped strand, as disclosed, for example, by WO 00/63364, filed Apr. 19, 2000. In certain embodiments, the ssRNAi compound consists of 16, 17, 18, 19, 20, 21, 22, or 23 linked nucleosides.

In certain embodiments, compounds described herein comprise modified oligonucleotides. Certain modified oligonucleotides have one or more asymmetric center and thus give rise to enantiomers, diastereomers, and other stereoisomeric configurations that may be defined, in terms of absolute stereochemistry, as (R) or (S), as a or R such as for sugar anomers, or as (D) or (L) such as for amino acids etc. Included in the modified oligonucleotides provided herein are all such possible isomers, including their racemic and optically pure forms, unless specified otherwise. Likewise, all cis- and trans-isomers and tautomeric forms are also included.

In certain embodiments, compounds described herein comprise or consist of modified oligonucleotides. In certain embodiments, compounds described herein are antisense compounds. In certain embodiments, such antisense compounds comprise oligomeric compounds. In certain embodiments, compounds described herein are capable of hybridizing to a target nucleic acid, resulting in at least one antisense activity. In certain embodiments, compounds described herein selectively affect one or more target nucleic acid. Such selective compounds comprise a nucleobase sequence that hybridizes to one or more target nucleic acid, resulting in one or more desired antisense activity and does not hybridize to one or more non-target nucleic acid or does not hybridize to one or more non-target nucleic acid in such a way that results in a significant undesired antisense activity.

In certain antisense activities, hybridization of a compound described herein to a target nucleic acid results in recruitment of a protein that cleaves the target nucleic acid. For example, certain compounds described herein result in RNase H mediated cleavage of the target nucleic acid. RNase H is a cellular endonuclease that cleaves the RNA strand of an RNA DNA duplex. The DNA in such an RNA DNA duplex need not be unmodified DNA. In certain embodiments, compounds described herein are sufficiently "DNA-like" to elicit RNase H activity. Further, in certain embodiments, one or more non-DNA-like nucleoside in the gap of a gapmer is tolerated.

In certain antisense activities, compounds described herein or a portion of the compound is loaded into an RNA-induced silencing complex (RISC), ultimately resulting in cleavage of the target nucleic acid. For example, certain compounds described herein result in cleavage of the target nucleic acid by Argonaute. Compounds that are loaded into RISC are RNAi compounds. RNAi compounds may be double-stranded (siRNA) or single-stranded (ssRNA).

In certain embodiments, hybridization of compounds described herein to a target nucleic acid does not result in recruitment of a protein that cleaves that target nucleic acid. In certain such embodiments, hybridization of the compound to the target nucleic acid results in alteration of splicing of the target nucleic acid. In certain embodiments, hybridization of the compound to a target nucleic acid results in inhibition of a binding interaction between the target nucleic acid and a protein or other nucleic acid. In certain such embodiments, hybridization of the compound to a target nucleic acid results in alteration of translation of the target nucleic acid.

Antisense activities may be observed directly or indirectly. In certain embodiments, observation or detection of an antisense activity involves observation or detection of a change in an amount of a target nucleic acid or protein encoded by such target nucleic acid, a change in the ratio of splice variants of a nucleic acid or protein, and/or a phenotypic change in a cell or individual.

Target Nucleic Acids, Target Regions and Nucleotide Sequences

In certain embodiments, compounds described herein comprise or consist of an oligonucleotide comprising a region that is complementary to a target nucleic acid. In certain embodiments, the target nucleic acid is an endogenous RNA molecule. In certain such embodiments, the target nucleic acid is selected from: an mRNA and a pre-mRNA, including intronic, exonic and untranslated regions. In certain embodiments, the target nucleic acid is a pre-mRNA. In certain such embodiments, the target region is entirely within an intron. In certain embodiments, the target region spans an intron/exon junction. In certain embodiments, the target region is at least 50% within an intron.

Human gene sequences that encode MAT1a include, without limitation, the following gene sequences, either the human Mat1a mRNA (GENBANK Accession No. NM_000429.2) or to the human Mat1a genomic sequence (GENBANK Accession No. NG_008083.1).

Hybridization

In some embodiments, hybridization occurs between a compound disclosed herein and a MAT1a nucleic acid. The most common mechanism of hybridization involves hydrogen bonding (e.g., Watson-Crick, Hoogsteen or reversed Hoogsteen hydrogen bonding) between complementary nucleobases of the nucleic acid molecules.

Hybridization can occur under varying conditions. Hybridization conditions are sequence-dependent and are determined by the nature and composition of the nucleic acid molecules to be hybridized.

Methods of determining whether a sequence is specifically hybridizable to a target nucleic acid are well known in the art. In certain embodiments, the compounds provided herein are specifically hybridizable with a MAT1a nucleic acid.

Complementarity

An oligonucleotide is said to be complementary to another nucleic acid when the nucleobase sequence of such oligonucleotide or one or more regions thereof matches the nucleobase sequence of another oligonucleotide or nucleic acid or one or more regions thereof when the two nucleobase sequences are aligned in opposing directions. Nucleobase matches or complementary nucleobases, as described herein, are limited to adenine (A) and thymine (T), adenine (A) and uracil (U), cytosine (C) and guanine (G), and 5-methyl cytosine (mC) and guanine (G) unless otherwise specified. Complementary oligonucleotides and/or nucleic acids need not have nucleobase complementarity at each nucleoside and may include one or more nucleobase mismatches. An oligonucleotide is fully complementary or 100% complementary when such oligonucleotides have nucleobase matches at each nucleoside without any nucleobase mismatches.

In certain embodiments, compounds described herein comprise or consist of modified oligonucleotides. In certain embodiments, compounds described herein are antisense compounds. In certain embodiments, compounds comprise oligomeric compounds. Non-complementary nucleobases between a compound and a MAT1a nucleic acid may be tolerated provided that the compound remains able to specifically hybridize to a target nucleic acid. Moreover, a compound may hybridize over one or more segments of a MAT1a nucleic acid such that intervening or adjacent segments are not involved in the hybridization event (e.g., a loop structure, mismatch or hairpin structure).

In certain embodiments, the compounds provided herein, or a specified portion thereof, are, or are at least, 70%, 80%, 85%, 86%, 87%, 88%, 89%, 90%, 91%, 92%, 93%, 94%, 95%, 96%, 97%, 98%, 99%, or 100% complementary to a MAT1a nucleic acid, a target region, target segment, or specified portion thereof. Percent complementarity of a compound with a target nucleic acid can be determined using routine methods.

For example, a compound in which 18 of 20 nucleobases of the compound are complementary to a target region, and would therefore specifically hybridize, would represent 90 percent complementarity. In this example, the remaining non-complementary nucleobases may be clustered or interspersed with complementary nucleobases and need not be contiguous to each other or to complementary nucleobases. As such, a compound which is 18 nucleobases in length having four non-complementary nucleobases which are flanked by two regions of complete complementarity with the target nucleic acid would have 77.8% overall complementarity with the target nucleic acid and would thus fall within the scope of the present invention. Percent complementarity of a compound with a region of a target nucleic acid can be determined routinely using BLAST programs (basic local alignment search tools) and PowerBLAST programs known in the art (Altschul et al., *J. Mol. Biol.*, 1990, 215, 403 410; Zhang and Madden, Genome Res., 1997, 7, 649 656). Percent homology, sequence identity or complementarity, can be determined by, for example, the Gap program (Wisconsin Sequence Analysis Package, Version 8 for Unix, Genetics Computer Group, University Research Park, Madison Wis.), using default settings, which uses the algorithm of Smith and Waterman (Adv. Appl. Math., 1981, 2, 482 489).

In certain embodiments, compounds described herein, or specified portions thereof, are fully complementary (i.e. 100% complementary) to a target nucleic acid, or specified portion thereof. For example, a compound may be fully complementary to a MAT1a nucleic acid, or a target region, or a target segment or target sequence thereof. As used herein, "fully complementary" means each nucleobase of a compound is capable of precise base pairing with the corresponding nucleobases of a target nucleic acid. For example, a 20 nucleobase compound is fully complementary to a target sequence that is 400 nucleobases long, so long as there is a corresponding 20 nucleobase portion of the target nucleic acid that is fully complementary to the compound. Fully complementary can also be used in reference to a specified portion of the first and/or the second nucleic acid. For example, a 20 nucleobase portion of a 30 nucleobase compound can be "fully complementary" to a target sequence that is 400 nucleobases long. The 20 nucleobase portion of the 30 nucleobase compound is fully complementary to the target sequence if the target sequence has a corresponding 20 nucleobase portion wherein each nucleobase is complementary to the 20 nucleobase portion of the compound. At the same time, the entire 30 nucleobase compound may or may not be fully complementary to the target sequence, depending on whether the remaining 10 nucleobases of the compound are also complementary to the target sequence.

In certain embodiments, compounds described herein comprise one or more mismatched nucleobases relative to the target nucleic acid. In certain such embodiments, antisense activity against the target is reduced by such mismatch, but activity against a non-target is reduced by a greater amount. Thus, in certain such embodiments selectivity of the compound is improved. In certain embodiments, the mismatch is specifically positioned within an oligonucleotide having a gapmer motif. In certain such embodiments, the mismatch is at position 1, 2, 3, 4, 5, 6, 7, or 8 from the 5'-end of the gap region. In certain such embodiments, the mismatch is at position 9, 8, 7, 6, 5, 4, 3, 2, 1 from the 3'-end of the gap region. In certain such embodiments, the mismatch is at position 1, 2, 3, or 4 from the 5'-end of the wing region. In certain such embodiments, the mismatch is at position 4, 3, 2, or 1 from the 3'-end of the wing region. In certain embodiments, the mismatch is specifically positioned within an oligonucleotide not having a gapmer motif. In certain such embodiments, the mismatch is at position 1, 2, 3, 4, 5, 6, 7, 8, 9, 10, 11, or 12 from the 5'-end of the oligonucleotide. In certain such embodiments, the mismatch is at position, 2, 3, 4, 5, 6, 7, 8, 9, 10, 11, or 12 from the 3'-end of the oligonucleotide.

The location of a non-complementary nucleobase may be at the 5' end or 3' end of the compound. Alternatively, the non-complementary nucleobase or nucleobases may be at an internal position of the compound. When two or more non-complementary nucleobases are present, they may be contiguous (i.e. linked) or non-contiguous. In one embodiment, a non-complementary nucleobase is located in the wing segment of a gapmer oligonucleotide.

In certain embodiments, compounds described herein that are, or are up to 11, 12, 13, 14, 15, 16, 17, 18, 19, or 20 nucleobases in length comprise no more than 4, no more than 3, no more than 2, or no more than 1 non-complementary nucleobase(s) relative to a target nucleic acid, such as a MAT1a nucleic acid, or specified portion thereof.

In certain embodiments, compounds described herein that are, or are up to 11, 12, 13, 14, 15, 16, 17, 18, 19, 20, 21, 22, 23, 24, 25, 26, 27, 28, 29, or 30 nucleobases in length comprise no more than 6, no more than 5, no more than 4, no more than 3, no more than 2, or no more than 1 non-complementary nucleobase(s) relative to a target nucleic acid, such as a MAT1a nucleic acid, or specified portion thereof.

In certain embodiments, compounds described herein also include those which are complementary to a portion of a target nucleic acid. As used herein, "portion" refers to a defined number of contiguous (i.e. linked) nucleobases within a region or segment of a target nucleic acid. A "portion" can also refer to a defined number of contiguous nucleobases of a compound. In certain embodiments, the compounds are complementary to at least an 8 nucleobase portion of a target segment. In certain embodiments, the compounds are complementary to at least a 9 nucleobase portion of a target segment. In certain embodiments, the compounds are complementary to at least a 10 nucleobase portion of a target segment. In certain embodiments, the compounds are complementary to at least an 11 nucleobase portion of a target segment. In certain embodiments, the compounds are complementary to at least a 12 nucleobase portion of a target segment. In certain embodiments, the compounds are complementary to at least a 13 nucleobase portion of a target segment. In certain embodiments, the compounds are complementary to at least a 14 nucleobase portion of a target segment. In certain embodiments, the compounds are complementary to at least a 15 nucleobase portion of a target segment. In certain embodiments, the compounds are complementary to at least a 16 nucleobase portion of a target segment. Also contemplated are compounds that are complementary to at least a 9, 10, 11, 12, 13, 14, 15, 16, 17, 18, 19, 20, or more nucleobase portion of a target segment, or a range defined by any two of these values.

Identity

The compounds provided herein may also have a defined percent identity to a particular nucleotide sequence, SEQ ID NO, or compound represented by a specific Isis number, or portion thereof. In certain embodiments, compounds described herein are antisense compounds or oligomeric compounds. In certain embodiments, compounds described herein are modified oligonucleotides. As used herein, a compound is identical to the sequence disclosed herein if it has the same nucleobase pairing ability. For example, a RNA which contains uracil in place of thymidine in a disclosed DNA sequence would be considered identical to the DNA sequence since both uracil and thymidine pair with adenine. Shortened and lengthened versions of the compounds described herein as well as compounds having non-identical bases relative to the compounds provided herein also are contemplated. The non-identical bases may be adjacent to each other or dispersed throughout the compound. Percent identity of a compound is calculated according to the number of bases that have identical base pairing relative to the sequence to which it is being compared.

In certain embodiments, compounds described herein, or portions thereof, are, or are at least, 70%, 75%, 80%, 85%, 90%, 91%, 92%, 93%, 94%, 95%, 96%, 97%, 98%, 99% or 100% identical to one or more of the compounds or SEQ ID NOs, or a portion thereof, disclosed herein. In certain embodiments, compounds described herein are about 70%, 75%, 80%, 85%, 90%, 91%, 92%, 93%, 94%, 95%, 96%, 97%, 98%, or 99% identical, or any percentage between such values, to a particular nucleotide sequence, SEQ ID NO, or compound represented by a specific Isis number, or portion thereof, in which the compounds comprise an oligonucleotide having one or more mismatched nucleobases. In certain such embodiments, the mismatch is at position 1, 2, 3, 4, 5, 6, 7, 8, 9, 10, 11, or 12 from the 5'-end of the oligonucleotide. In certain such embodiments, the mismatch is at position 2, 3, 4, 5, 6, 7, 8, 9, 10, 11, or 12 from the 3'-end of the oligonucleotide.

In certain embodiments, compounds described herein are antisense compounds. In certain embodiments, a portion of the compound is compared to an equal length portion of the target nucleic acid. In certain embodiments, an 8, 9, 10, 11, 12, 13, 14, 15, 16, 17, 18, 19, 20, 21, 22, 23, 24, or 25 nucleobase portion is compared to an equal length portion of the target nucleic acid.

In certain embodiments, compounds described herein are oligonucleotides. In certain embodiments, a portion of the oligonucleotide is compared to an equal length portion of the target nucleic acid. In certain embodiments, an 8, 9, 10, 11, 12, 13, 14, 15, 16, 17, 18, 19, 20, 21, 22, 23, 24, or 25 nucleobase portion is compared to an equal length portion of the target nucleic acid.

Certain Modified Compounds

In certain embodiments, compounds described herein comprise or consist of oligonucleotides consisting of linked nucleosides. Oligonucleotides may be unmodified oligonucleotides (RNA or DNA) or may be modified oligonucleotides. Modified oligonucleotides comprise at least one modification relative to unmodified RNA or DNA (i.e., comprise at least one modified nucleoside (comprising a modified sugar moiety and/or a modified nucleobase) and/or at least one modified internucleoside linkage).

A. Modified Nucleosides

Modified nucleosides comprise a modified sugar moiety or a modified nucleobase or both a modified sugar moiety and a modified nucleobase.

1. Modified Sugar Moieties

In certain embodiments, sugar moieties are non-bicyclic modified sugar moieties. In certain embodiments, modified sugar moieties are bicyclic or tricyclic sugar moieties. In certain embodiments, modified sugar moieties are sugar surrogates. Such sugar surrogates may comprise one or more substitutions corresponding to those of other types of modified sugar moieties.

In certain embodiments, modified sugar moieties are non-bicyclic modified sugar moieties comprising a furanosyl ring with one or more acyclic substituent, including but not limited to substituents at the 2', 4', and/or 5' positions. In certain embodiments one or more acyclic substituent of non-bicyclic modified sugar moieties is branched. Examples of 2'-substituent groups suitable for non-bicyclic modified sugar moieties include but are not limited to: 2'-F, 2'-OCH$_3$ ("OMe" or "O-methyl"), and 2'-O(CH$_2$)$_2$OCH$_3$ ("MOE"). In certain embodiments, 2'-substituent groups are selected from among: halo, allyl, amino, azido, SH, CN, OCN, CF$_3$, OCF$_3$, O—C$_1$-C$_{10}$ alkoxy, O—C$_1$-C$_{10}$ substituted alkoxy, O—C$_1$-C$_{10}$ alkyl, O—C$_1$-C$_{10}$ substituted alkyl, S-alkyl, N(R$_m$)-alkyl, O-alkenyl, S-alkenyl, N(R$_m$)-alkenyl, O-alkynyl, S-alkynyl, N(R$_m$)-alkynyl, O-alkylenyl-O-alkyl, alkynyl, alkaryl, aralkyl, O-alkaryl, O-aralkyl, O(CH$_2$)$_2$SCH$_3$, O(CH$_2$)$_2$ON(R$_m$)(R$_n$) or OCH$_2$C(=O)—N(R$_m$)(R$_n$), where each R$_m$ and R$_n$ is, independently, H, an amino protecting group, or substituted or unsubstituted C$_1$-C$_{10}$ alkyl, and the 2'-substituent groups described in Cook et al., U.S. Pat. No. 6,531,584; Cook et al., U.S. Pat. No. 5,859,221; and Cook et al., U.S. Pat. No. 6,005,087. Certain embodiments of these 2'-substituent groups can be further substituted with one or more substituent groups independently selected from among: hydroxyl, amino, alkoxy, carboxy, benzyl, phenyl, nitro (NO$_2$), thiol, thioalkoxy, thioalkyl, halogen, alkyl, aryl, alkenyl and alkynyl. Examples of 4'-substituent groups suitable for linearlynon-bicyclic modified sugar moieties include but are not limited to alkoxy (e.g., methoxy), alkyl, and those described in Manoharan et al., WO 2015/106128. Examples of 5'-substituent groups suitable for non-bicyclic modified sugar moieties include but are not limited to: 5'-methyl (R or S), 5'-vinyl, and 5'-methoxy. In certain embodiments, non-bicyclic modified sugars comprise more than one non-bridging sugar substituent, for example, 2'-F-5'-methyl sugar moieties and the modified sugar moieties and modified nucleosides described in Migawa et al., WO 2008/101157 and Rajeev et al., US2013/0203836.

In certain embodiments, a 2'-substituted nucleoside or 2'-non-bicyclic modified nucleoside comprises a sugar moiety comprising a linear 2'-substituent group selected from: F, NH$_2$, N$_3$, OCF$_3$, OCH$_3$, O(CH$_2$)$_3$NH$_2$, CH$_2$CH=CH$_2$, OCH$_2$CH=CH$_2$, OCH$_2$CH$_2$OCH$_3$, O(CH$_2$)$_2$SCH$_3$, O(CH$_2$)$_2$ON(R$_m$)(R$_n$), O(CH$_2$)$_2$O(CH$_2$)$_2$N(CH$_3$)$_2$, and N-substituted acetamide (OCH$_2$C(=O)—N(R$_m$)(R$_n$)), where each R$_m$ and R$_n$ is, independently, H, an amino protecting group, or substituted or unsubstituted C$_1$-C$_{10}$ alkyl.

In certain embodiments, a 2'-substituted nucleoside or 2'-non-bicyclic modified nucleoside comprises a sugar moiety comprising a linear 2'-substituent group selected from: F, OCF$_3$, OCH$_3$, OCH$_2$CH$_2$OCH$_3$, O(CH$_2$)$_2$SCH$_3$, O(CH$_2$)$_{20}$N(CH$_3$)$_2$, O(CH$_2$)$_2$O(CH$_2$)$_2$N(CH$_3$)$_2$, and OCH$_2$C(=O)—N(H)CH$_3$ ("NMA").

In certain embodiments, a 2'-substituted nucleoside or 2'-non-bicyclic modified nucleoside comprises a sugar moiety comprising a linear 2'-substituent group selected from: F, OCH$_3$, and OCH$_2$CH$_2$OCH$_3$.

Nucleosides comprising modified sugar moieties, such as non-bicyclic modified sugar moieties, are referred to by the position(s) of the substitution(s) on the sugar moiety of the nucleoside. For example, nucleosides comprising 2'-substituted or 2-modified sugar moieties are referred to as 2'-substituted nucleosides or 2-modified nucleosides.

Certain modified sugar moieties comprise a bridging sugar substituent that forms a second ring resulting in a bicyclic sugar moiety. In certain such embodiments, the bicyclic sugar moiety comprises a bridge between the 4' and the 2' furanose ring atoms. Examples of such 4' to 2' bridging sugar substituents include but are not limited to: 4'-CH$_2$-2', 4'-(CH$_2$)$_2$-2', 4'-(CH$_2$)$_3$-2', 4'-CH$_2$—O-2' ("LNA"), 4'-CH$_2$—S-2', 4'-(CH$_2$)$_2$—O-2' ("ENA"), 4'-CH(CH$_3$)—O-2' (referred to as "constrained ethyl" or "cEt" when in the S configuration), 4'-CH$_2$—O—CH$_2$-2', 4'-CH$_2$—N(R)-2', 4'-C—H(CH$_2$OCH$_3$)—O-2' ("constrained MOE" or "cMOE") and analogs thereof (see, e.g., Seth et al., U.S. Pat. No. 7,399,845, Bhat et al., U.S. Pat. No. 7,569,686, Swayze et al., U.S. Pat. No. 7,741,457, and Swayze et al., U.S. Pat. No. 8,022,193), 4'-C(CH$_3$)(CH$_3$)—O-2' and analogs thereof (see, e.g., Seth et al., U.S. Pat. No. 8,278,283), 4'-CH$_2$—N(OCH$_3$)-2' and analogs thereof (see, e.g., Prakash et al., U.S. Pat. No. 8,278,425), 4'-CH$_2$—O—N(CH$_3$)-2' (see, e.g., Allerson et al., U.S. Pat. No. 7,696,345 and Allerson et al., U.S. Pat. No. 8,124,745), 4'-CH$_2$—C(H)(CH$_3$)-2' (see, e.g., Zhou, et al., J. Org. Chem., 2009, 74, 118-134), 4'-CH$_2$—C(=CH$_2$)-2' and analogs thereof (see e.g., Seth et al., U.S. Pat. No. 8,278,426), 4'-C(R$_a$R$_b$)—N(R)—O-2', 4'-C(R$_a$R$_b$)—O—N(R)-2', 4'-CH$_2$—O—N(R)-2', and 4'-CH$_2$—N(R)—O-2', wherein each R, R$_a$, and R$_b$ is, independently, H, a protecting group, or C$_1$-C$_{12}$ alkyl (see, e.g. Imanishi et al., U.S. Pat. No. 7,427,672).

In certain embodiments, such 4' to 2' bridges independently comprise from 1 to 4 linked groups independently selected from: —[C(R$_a$)(R$_b$)]$_n$—, —[C(R$_a$)(R$_b$)]$_n$—O—, —C(R$_a$)=C(R$_b$)—, —C(R$_a$)=N—, —C(=NR$_a$)—, —C(=O)—, —C(=S)—, —O—, —Si(R$_a$)$_2$—, —S(=O)$_x$—, and —N(R$_a$)—;

wherein:

x is 0, 1, or 2;

n is 1, 2, 3, or 4;

each R$_a$ and R$_b$ is, independently, H, a protecting group, hydroxyl, C$_1$-C$_{12}$ alkyl, substituted C$_1$-C$_{12}$ alkyl, C$_2$-C$_{12}$ alkenyl, substituted C$_2$-C$_{12}$ alkenyl, C$_2$-C$_{12}$ alkynyl, substituted C$_2$-C$_{12}$ alkynyl, C$_5$-C$_{20}$ aryl, substituted C$_5$-C$_{20}$ aryl, heterocycle radical, substituted heterocycle radical, heteroaryl, substituted heteroaryl, C$_5$-C$_7$ alicyclic radical, substituted C$_5$-C$_7$ alicyclic radical, halogen, OJ$_1$, NJ$_1$J$_2$, SJ$_1$, N$_3$, COOJ$_1$, acyl (C(=O)—H), substituted acyl, CN, sulfonyl (S(=O)$_2$-J$_1$), or sulfoxyl (S(=O)-J$_1$); and each J$_1$ and J$_2$ is, independently, H, C$_1$-C$_{12}$ alkyl, substituted C$_1$-C$_{12}$ alkyl, C$_2$-C$_{12}$ alkenyl, substituted C$_2$-C$_{12}$ alkenyl, C$_2$-C$_{12}$ alkynyl, substituted C$_2$-C$_{12}$ alkynyl, C$_5$-C$_{20}$ aryl, substituted C$_5$-C$_{20}$ aryl, acyl (C(=O)—H), substituted acyl, a heterocycle radical, a substituted heterocycle radical, C$_1$-C$_{12}$ aminoalkyl, substituted C$_1$-C$_{12}$ aminoalkyl, or a protecting group.

Additional bicyclic sugar moieties are known in the art, see, for example: Freier et al., *Nucleic Acids Research*, 1997, 25(22), 4429-4443, Albaek et al., *J. Org. Chem.*, 2006, 71, 7731-7740, Singh et al., *Chem. Commun.*, 1998, 4, 455-456; Koshkin et al., *Tetrahedron*, 1998, 54, 3607-3630; Wahlestedt et al., *Proc. Natl. Acad. Sci. U.S.A*, 2000, 97, 5633-5638; Kumar et al., *Bioorg. Med. Chem. Lett.*, 1998, 8, 2219-2222; Singh et al., *J. Org. Chem.*, 1998, 63, 10035-10039; Srivastava et al., *J. Am. Chem. Soc.*, 20017, 129, 8362-8379; Elayadi et al., *Curr. Opinion Invens. Drugs*, 2001, 2, 558-561; Braasch et al., *Chem. Biol.*, 2001, 8, 1-7; Orum et al., *Curr. Opinion Mol. Ther.*, 2001, 3, 239-243; Wengel et al., U.S. Pat. No. 7,053,207, Imanishi et al., U.S. Pat. No. 6,268,490, Imanishi et al. U.S. Pat. No. 6,770,748, Imanishi et al., U.S. RE44,779; Wengel et al., U.S. Pat. No. 6,794,499, Wengel et al., U.S. Pat. No. 6,670,461; Wengel et al., U.S. Pat. No. 7,034,133, Wengel et al., U.S. Pat. No. 8,080,644; Wengel et al., U.S. Pat. No. 8,034,909; Wengel et al., U.S. Pat. No. 8,153,365; Wengel et al., U.S. Pat. No. 7,572,582; and Ramasamy et al., U.S. Pat. No. 6,525,191, Torsten et al., WO 2004/106356, Wengel et al., WO 91999/014226; Seth et al., WO 2007/134181; Seth et al., U.S. Pat. No. 7,547,684; Seth et al., U.S. Pat. No. 7,666,854; Seth et al., U.S. Pat. No. 8,088,746; Seth et al., U.S. Pat. No. 7,750,131; Seth et al., U.S. Pat. No. 8,030,467; Seth et al., U.S. Pat. No. 8,268,980; Seth et al., U.S. Pat. No. 8,546,556; Seth et al., U.S. Pat. No. 8,530,640; Migawa et al., U.S. Pat. No. 9,012,421; Seth et al., U.S. Pat. No. 8,501,805; and U.S. Patent Publication Nos. Allerson et al., US2008/0039618 and Migawa et al., US2015/0191727.

In certain embodiments, bicyclic sugar moieties and nucleosides incorporating such bicyclic sugar moieties are further defined by isomeric configuration. For example, an LNA nucleoside (described herein) may be in the α-L configuration or in the β-D configuration.

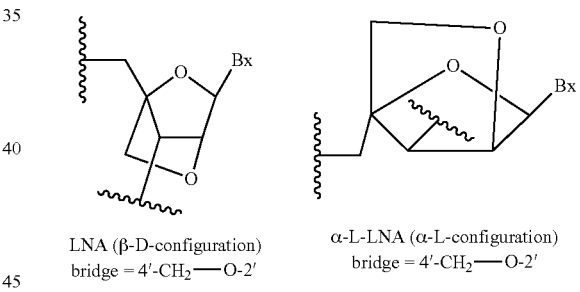

LNA (β-D-configuration)
bridge = 4'-CH$_2$——O-2'

α-L-LNA (α-L-configuration)
bridge = 4'-CH$_2$——O-2'

α-L-methyleneoxy (4'-CH$_2$—O-2') or α-L-LNA bicyclic nucleosides have been incorporated into oligonucleotides that showed antisense activity (Frieden et al., *Nucleic Acids Research*, 2003, 21, 6365-6372). Herein, general descriptions of bicyclic nucleosides include both isomeric configurations. When the positions of specific bicyclic nucleosides (e.g., LNA or cEt) are identified in exemplified embodiments herein, they are in the β-D configuration, unless otherwise specified.

In certain embodiments, modified sugar moieties comprise one or more non-bridging sugar substituent and one or more bridging sugar substituent (e.g., 5'-substituted and 4'-2' bridged sugars).

In certain embodiments, modified sugar moieties are sugar surrogates. In certain such embodiments, the oxygen atom of the sugar moiety is replaced, e.g., with a sulfur, carbon or nitrogen atom. In certain such embodiments, such modified sugar moieties also comprise bridging and/or non-bridging substituents as described herein. For example, certain sugar surrogates comprise a 4'-sulfur atom and a substitution at the 2'-position (see, e.g., Bhat et al., U.S. Pat. No. 7,875,733 and Bhat et al., U.S. Pat. No. 7,939,677) and/or the 5' position.

In certain embodiments, sugar surrogates comprise rings having other than 5 atoms. For example, in certain embodiments, a sugar surrogate comprises a six-membered tetrahydropyran ("THP"). Such tetrahydropyrans may be further modified or substituted. Nucleosides comprising such modified tetrahydropyrans include but are not limited to hexitol nucleic acid ("HNA"), anitol nucleic acid ("ANA"), manitol nucleic acid ("MNA") (see e.g., Leumann, C J. *Bioorg. & Med. Chem.* 2002, 10, 841-854), fluoro HNA:

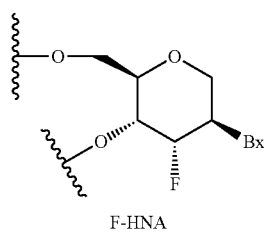

F-HNA ("F-HNA", see e.g., Swayze et al., U.S. Pat. No. 8,088,904; Swayze et al., U.S. Pat. No. 8,440,803; Swayze et al., U.S.; and Swayze et al., U.S. Pat. No. 9,005,906, F-HNA can also be referred to as a F-THP or 3-fluoro tetrahydropyran), and nucleosides comprising additional modified THP compounds having the formula:

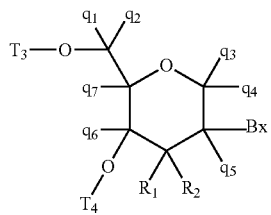

wherein, independently, for each of said modified THP nucleoside: Bx is a nucleobase moiety; $T_3$ and $T_4$ are each, independently, an internucleoside linking group linking the modified THP nucleoside to the remainder of an oligonucleotide or one of $T_3$ and $T_4$ is an internucleoside linking group linking the modified THP nucleoside to the remainder of an oligonucleotide and the other of $T_3$ and $T_4$ is H, a hydroxyl protecting group, a linked conjugate group, or a 5' or 3'-terminal group; $q_1$, $q_2$, $q_3$, $q_4$, $q_5$, $q_6$ and $q_7$ are each, independently, H, $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl; and each of $R_1$ and $R_2$ is independently selected from among: hydrogen, halogen, substituted or unsubstituted alkoxy, $NJ_1J_2$, $SJ_1$, $N_3$, $OC(=X)J_1$, $OC(=X)NJ_1J_2$, $NJ_3C(=X)NJ_1J_2$, and CN, wherein X is O, S or $NJ_1$, and each $J_1$, $J_2$, and $J_3$ is, independently, H or $C_1$-$C_6$ alkyl.

In certain embodiments, modified THP nucleosides are provided wherein $q_1$, $q_2$, $q_3$, $q_4$, $q_5$, $q_6$ and $q_7$ are each H. In certain embodiments, at least one of $q_1$, $q_2$, $q_3$, $q_4$, $q_5$, $q_6$ and $q_7$ is other than H. In certain embodiments, at least one of $q_1$, $q_2$, $q_3$, $q_4$, $q_5$, $q_6$ and $q_7$ is methyl. In certain embodiments, modified THP nucleosides are provided wherein one of $R_1$ and $R_2$ is F. In certain embodiments, $R_1$ is F and $R_2$ is H, in certain embodiments, $R_1$ is methoxy and $R_2$ is H, and in certain embodiments, $R_1$ is methoxyethoxy and $R_2$ is H.

In certain embodiments, sugar surrogates comprise rings having more than 5 atoms and more than one heteroatom. For example, nucleosides comprising morpholino sugar moieties and their use in oligonucleotides have been reported (see, e.g., Braasch et al., Biochemistry, 2002, 41, 4503-4510 and Summerton et al., U.S. Pat. No. 5,698,685; Summerton et al., U.S. Pat. No. 5,166,315; Summerton et al., U.S. Pat. No. 5,185,444; and Summerton et al., U.S. Pat. No. 5,034,506). As used here, the term "morpholino" means a sugar surrogate having the following structure:

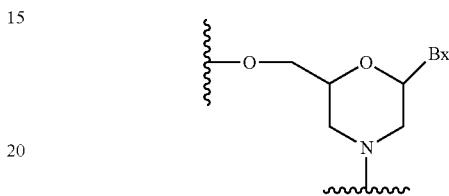

In certain embodiments, morpholinos may be modified, for example by adding or altering various substituent groups from the above morpholino structure. Such sugar surrogates are referred to herein as "modified morpholinos."

In certain embodiments, sugar surrogates comprise acyclic moieties. Examples of nucleosides and oligonucleotides comprising such acyclic sugar surrogates include but are not limited to: peptide nucleic acid ("PNA"), acyclic butyl nucleic acid (see, e.g., Kumar et al., *Org. Biomol. Chem.*, 2013, 11, 5853-5865), and nucleosides and oligonucleotides described in Manoharan et al., WO2011/133876.

Many other bicyclic and tricyclic sugar and sugar surrogate ring systems are known in the art that can be used in modified nucleosides.

2. Modified Nucleobases

Nucleobase (or base) modifications or substitutions are structurally distinguishable from, yet functionally interchangeable with, naturally occurring or synthetic unmodified nucleobases. Both natural and modified nucleobases are capable of participating in hydrogen bonding. Such nucleobase modifications can impart nuclease stability, binding affinity or some other beneficial biological property to compounds described herein.

In certain embodiments, compounds described herein comprise modified oligonucleotides. In certain embodiments, modified oligonucleotides comprise one or more nucleoside comprising an unmodified nucleobase. In certain embodiments, modified oligonucleotides comprise one or more nucleoside comprising a modified nucleobase. In certain embodiments, modified oligonucleotides comprise one or more nucleoside that does not comprise a nucleobase, referred to as an abasic nucleoside.

In certain embodiments, modified nucleobases are selected from: 5-substituted pyrimidines, 6-azapyrimi¬dines, alkyl or alkynyl substituted pyrimidines, alkyl substituted purines, and N-2, N-6 and O-6 substituted purines. In certain embodiments, modified nucleobases are selected from: 2-aminopropyladenine, 5-hydroxymethyl cytosine, 5-methylcytosine, xanthine, hypoxanthine, 2-aminoadenine, 6-N-methylguanine, 6-N-methyladenine, 2-propyladenine, 2-thiouracil, 2-thiothymine and 2-thiocytosine, 5-propynyl (C≡C—CH3) uracil, 5-propynylcytosine, 6-azouracil, 6-azocytosine, 6-azothymine, 5-ribosyluracil (pseudouracil), 4-thiouracil, 8-halo, 8-amino, 8-thiol, 8-thioalkyl, 8-hydroxyl, 8-aza and other 8-substituted purines, 5-halo, particularly 5-bromo, 5-trifluoromethyl, 5-halouracil, and 5-halocytosine, 7-methylguanine, 7-methyladenine, 2-F-adenine, 2-aminoadenine, 7-deazaguanine, 7-deazaadenine, 3-deazaguanine, 3-deazaadenine, 6-N-benzoyladenine, 2-N-isobutyrylguanine, 4-N-benzoylcytosine, 4-N-benzoyluracil, 5-methyl 4-N-benzoylcytosine, 5-methyl 4-N-benzoyluracil, universal bases, hydrophobic bases, promiscuous bases, size-expanded bases, and fluorinated bases. Further modified nucleobases include tricyclic pyrimidines, such as 1,3-diazaphenoxazine-2-one, 1,3-diazaphenothiazine-2-one and 9-(2-aminoethoxy)-1,3-diazaphenoxazine-2-one (G-clamp). Modified nucleobases may also include those in which the purine or pyrimidine base is replaced with other heterocycles, for example 7-deaza-adenine, 7-deazaguanosine, 2-aminopyridine and 2-pyridone. Further nucleobases include those disclosed in Merigan et al., U.S. Pat. No. 3,687,808, those disclosed in The Concise Encyclopedia Of Polymer Science And Engineering, Kroschwitz, J. I., Ed., John Wiley & Sons, 1990, 858-859; Englisch et al., Angewandte Chemie, International Edition, 1991, 30, 613; Sanghvi, Y. S., Chapter 15, Antisense Research and Applications, Crooke, S. T. and Lebleu, B., Eds., CRC Press, 1993, 273-288; and those disclosed in Chapters 6 and 15, Antisense Drug Technology, Crooke S. T., Ed., CRC Press, 2008, 163-166 and 442-443.

Publications that teach the preparation of certain of the above noted modified nucleobases as well as other modified nucleobases include without limitation, Manoharan et al., US2003/0158403, Manoharan et al., US2003/0175906; Dinh et al., U.S. Pat. No. 4,845,205; Spielvogel et al., U.S. Pat. No. 5,130,302; Rogers et al., U.S. Pat. No. 5,134,066; Bischofberger et al., U.S. Pat. No. 5,175,273; Urdea et al., U.S. Pat. No. 5,367,066; Benner et al., U.S. Pat. No. 5,432,272; Matteucci et al., U.S. Pat. No. 5,434,257; Gmeiner et al., U.S. Pat. No. 5,457,187; Cook et al., U.S. Pat. No. 5,459,255; Froehler et al., U.S. Pat. No. 5,484,908; Matteucci et al., U.S. Pat. No. 5,502,177; Hawkins et al., U.S. Pat. No. 5,525,711; Haralambidis et al., U.S. Pat. No. 5,552,540; Cook et al., U.S. Pat. No. 5,587,469; Froehler et al., U.S. Pat. No. 5,594,121; Switzer et al., U.S. Pat. No. 5,596,091; Cook et al., U.S. Pat. No. 5,614,617; Froehler et al., U.S. Pat. No. 5,645,985; Cook et al., U.S. Pat. No. 5,681,941; Cook et al., U.S. Pat. No. 5,811,534; Cook et al., U.S. Pat. No. 5,750,692; Cook et al., U.S. Pat. No. 5,948,903; Cook et al., U.S. Pat. No. 5,587,470; Cook et al., U.S. Pat. No. 5,457,191; Matteucci et al., U.S. Pat. No. 5,763,588; Froehler et al., U.S. Pat. No. 5,830,653; Cook et al., U.S. Pat. No. 5,808,027; Cook et al., 6,166,199; and Matteucci et al., U.S. Pat. No. 6,005,096.

In certain embodiments, compounds targeted to a MAT1a nucleic acid comprise one or more modified nucleobases. In certain embodiments, the modified nucleobase is 5-methylcytosine. In certain embodiments, each cytosine is a 5-methylcytosine.

Modified Internucleoside Linkages

The naturally occurring internucleoside linkage of RNA and DNA is a 3' to 5' phosphodiester linkage. In certain embodiments, compounds described herein having one or more modified, i.e. non-naturally occurring, internucleoside linkages are often selected over compounds having naturally occurring internucleoside linkages because of desirable properties such as, for example, enhanced cellular uptake, enhanced affinity for target nucleic acids, and increased stability in the presence of nucleases.

In certain embodiments, compounds targeted to a MAT1a nucleic acid comprise one or more modified internucleoside linkages. In certain embodiments, the modified internucleoside linkages are phosphorothioate linkages. In certain embodiments, each internucleoside linkage of the compound is a phosphorothioate internucleoside linkage.

In certain embodiments, compounds described herein comprise oligonucleotides. Oligonucleotides having modified internucleoside linkages include internucleoside linkages that retain a phosphorus atom as well as internucleoside linkages that do not have a phosphorus atom. Representative phosphorus containing internucleoside linkages include, but are not limited to, phosphodiesters, phosphotriesters, methylphosphonates, phosphoramidate, and phosphorothioates. Methods of preparation of phosphorous-containing and non-phosphorous-containing linkages are well known.

In certain embodiments, nucleosides of modified oligonucleotides may be linked together using any internucleoside linkage. The two main classes of internucleoside linking groups are defined by the presence or absence of a phosphorus atom. Representative phosphorus-containing internucleoside linkages include but are not limited to phosphates, which contain a phosphodiester bond ("P=O") (also referred to as unmodified or naturally occurring linkages), phosphotriesters, methylphosphonates, phosphoramidates, and phosphorothioates ("P=S"), and phosphorodithioates ("HS—P=S"). Representative non-phosphorus containing internucleoside linking groups include but are not limited to methylenemethylimino (—CH2-N(CH3)-O—CH2-), thiodiester, thionocarbamate (—O—C(=O)(NH)—S—); siloxane (—O—SiH2-O—); and N,N'-dimethylhydrazine (—CH2-N(CH3)-N(CH3)-). Modified internucleoside linkages, compared to naturally occurring phosphate linkages, can be used to alter, typically increase, nuclease resistance of the oligonucleotide. In certain embodiments, internucleoside linkages having a chiral atom can be prepared as a racemic mixture, or as separate enantiomers. Representative chiral internucleoside linkages include but are not limited to alkylphosphonates and phosphorothioates. Methods of preparation of phosphorous-containing and non-phosphorous-containing internucleoside linkages are well known to those skilled in the art.

Neutral internucleoside linkages include, without limitation, phosphotriesters, methylphosphonates, MMI (3'-CH2-N(CH3)-O-5'), amide-3 (3'-CH2-C(=O)—N(H)-5'), amide-4 (3'-CH2-N(H)—C(=O)-5'), formacetal (3'-O—CH2-O-5'), methoxypropyl, and thioformacetal (3'-S—CH2-O-5'). Further neutral internucleoside linkages include nonionic linkages comprising siloxane (dialkylsiloxane), carboxylate ester, carboxamide, sulfide, sulfonate ester and amides (See for example: Carbohydrate Modifications in Antisense Research; Y. S. Sanghvi and P. D. Cook, Eds., ACS Symposium Series 580; Chapters 3 and 4, 40-65). Further neutral internucleoside linkages include nonionic linkages comprising mixed N, O, S and CH2 component parts.

In certain embodiments, oligonucleotides comprise modified internucleoside linkages arranged along the oligonucleotide or region thereof in a defined pattern or modified internucleoside linkage motif. In certain embodiments, internucleoside linkages are arranged in a gapped motif. In such embodiments, the internucleoside linkages in each of two wing regions are different from the internucleoside linkages in the gap region. In certain embodiments the internucleoside linkages in the wings are phosphodiester and the internucleoside linkages in the gap are phosphorothioate. The nucleoside motif is independently selected, so such oligonucleotides having a gapped internucleoside linkage motif may or may not have a gapped nucleoside motif and if it does have a gapped nucleoside motif, the wing and gap lengths may or may not be the same.

In certain embodiments, oligonucleotides comprise a region having an alternating internucleoside linkage motif. In certain embodiments, oligonucleotides of the present invention comprise a region of uniformly modified internucleoside linkages. In certain such embodiments, the oligonucleotide comprises a region that is uniformly linked by phosphorothioate internucleoside linkages. In certain embodiments, the oligonucleotide is uniformly linked by phosphorothioate. In certain embodiments, each internucleoside linkage of the oligonucleotide is selected from phosphodiester and phosphorothioate. In certain embodiments, each internucleoside linkage of the oligonucleotide is selected from phosphodiester and phosphorothioate and at least one internucleoside linkage is phosphorothioate.

In certain embodiments, the oligonucleotide comprises at least 6 phosphorothioate internucleoside linkages. In certain embodiments, the oligonucleotide comprises at least 8 phosphorothioate internucleoside linkages. In certain embodiments, the oligonucleotide comprises at least 10 phosphorothioate internucleoside linkages. In certain embodiments, the oligonucleotide comprises at least one block of at least 6 consecutive phosphorothioate internucleoside linkages. In certain embodiments, the oligonucleotide comprises at least one block of at least 8 consecutive phosphorothioate internucleoside linkages. In certain embodiments, the oligonucleotide comprises at least one block of at least 10 consecutive phosphorothioate internucleoside linkages. In certain embodiments, the oligonucleotide comprises at least block of at least one 12 consecutive phosphorothioate internucleoside linkages. In certain such embodiments, at least one such block is located at the 3' end of the oligonucleotide. In certain such embodiments, at least one such block is located within 3 nucleosides of the 3' end of the oligonucleotide.

In certain embodiments, oligonucleotides comprise one or more methylphosponate linkages. In certain embodiments, oligonucleotides having a gapmer nucleoside motif comprise a linkage motif comprising all phosphorothioate linkages except for one or two methylphosponate linkages. In certain embodiments, one methylphosponate linkage is in the central gap of an oligonucleotide having a gapmer nucleoside motif.

In certain embodiments, it is desirable to arrange the number of phosphorothioate internucleoside linkages and phosphodiester internucleoside linkages to maintain nuclease resistance. In certain embodiments, it is desirable to arrange the number and position of phosphorothioate internucleoside linkages and the number and position of phosphodiester internucleoside linkages to maintain nuclease resistance. In certain embodiments, the number of phosphorothioate internucleoside linkages may be decreased and the number of phosphodiester internucleoside linkages may be increased. In certain embodiments, the number of phosphorothioate internucleoside linkages may be decreased and the number of phosphodiester internucleoside linkages may be increased while still maintaining nuclease resistance. In certain embodiments it is desirable to decrease the number of phosphorothioate internucleoside linkages while retaining nuclease resistance. In certain embodiments it is desirable to increase the number of phosphodiester internucleoside linkages while retaining nuclease resistance.

B. Certain Motifs

In certain embodiments, compounds described herein comprise oligonucleotides. Oligonucleotides can have a motif, e.g. a pattern of unmodified and/or modified sugar moieties, nucleobases, and/or internucleoside linkages. In certain embodiments, modified oligonucleotides comprise one or more modified nucleoside comprising a modified sugar. In certain embodiments, modified oligonucleotides comprise one or more modified nucleosides comprising a modified nucleobase. In certain embodiments, modified oligonucleotides comprise one or more modified internucleoside linkage. In such embodiments, the modified, unmodified, and differently modified sugar moieties, nucleobases, and/or internucleoside linkages of a modified oligonucleotide define a pattern or motif. In certain embodiments, the patterns of sugar moieties, nucleobases, and internucleoside linkages are each independent of one another. Thus, a modified oligonucleotide may be described by its sugar motif, nucleobase motif and/or internucleoside linkage motif (as used herein, nucleobase motif describes the modifications to the nucleobases independent of the sequence of nucleobases).

1. Certain Sugar Motifs

In certain embodiments, compounds described herein comprise oligonucleotides. In certain embodiments, oligonucleotides comprise one or more type of modified sugar and/or unmodified sugar moiety arranged along the oligonucleotide or region thereof in a defined pattern or sugar motif. In certain instances, such sugar motifs include but are not limited to any of the sugar modifications discussed herein.

In certain embodiments, modified oligonucleotides comprise or consist of a region having a gapmer motif, which comprises two external regions or "wings" and a central or internal region or "gap." The three regions of a gapmer motif (the 5'-wing, the gap, and the 3'-wing) form a contiguous sequence of nucleosides wherein at least some of the sugar moieties of the nucleosides of each of the wings differ from at least some of the sugar moieties of the nucleosides of the gap. Specifically, at least the sugar moieties of the nucleosides of each wing that are closest to the gap (the 3'-most nucleoside of the 5'-wing and the 5'-most nucleoside of the 3'-wing) differ from the sugar moiety of the neighboring gap nucleosides, thus defining the boundary between the wings and the gap (i.e., the wing/gap junction). In certain embodiments, the sugar moieties within the gap are the same as one another. In certain embodiments, the gap includes one or more nucleoside having a sugar moiety that differs from the sugar moiety of one or more other nucleosides of the gap. In certain embodiments, the sugar motifs of the two wings are the same as one another (symmetric gapmer). In certain embodiments, the sugar motif of the 5'-wing differs from the sugar motif of the 3'-wing (asymmetric gapmer).

In certain embodiments, the wings of a gapmer comprise 1-5 nucleosides. In certain embodiments, the wings of a gapmer comprise 2-5 nucleosides. In certain embodiments, the wings of a gapmer comprise 3-5 nucleosides. In certain embodiments, the nucleosides of a gapmer are all modified nucleosides.

In certain embodiments, the gap of a gapmer comprises 7-12 nucleosides. In certain embodiments, the gap of a gapmer comprises 7-10 nucleosides. In certain embodiments, the gap of a gapmer comprises 8-10 nucleosides. In certain embodiments, the gap of a gapmer comprises 10 nucleosides. In certain embodiment, each nucleoside of the gap of a gapmer is an unmodified 2'-deoxy nucleoside.

In certain embodiments, the gapmer is a deoxy gapmer. In such embodiments, the nucleosides on the gap side of each wing/gap junction are unmodified 2'-deoxy nucleosides and the nucleosides on the wing sides of each wing/gap junction are modified nucleosides. In certain such embodiments, each nucleoside of the gap is an unmodified 2'-deoxy nucleoside. In certain such embodiments, each nucleoside of each wing is a modified nucleoside.

In certain embodiments, a modified oligonucleotide has a fully modified sugar motif wherein each nucleoside of the modified oligonucleotide comprises a modified sugar moiety. In certain embodiments, modified oligonucleotides comprise or consist of a region having a fully modified sugar motif wherein each nucleoside of the region comprises a modified sugar moiety. In certain embodiments, modified oligonucleotides comprise or consist of a region having a fully modified sugar motif, wherein each nucleoside within the fully modified region comprises the same modified sugar moiety, referred to herein as a uniformly modified sugar motif. In certain embodiments, a fully modified oligonucleotide is a uniformly modified oligonucleotide. In certain embodiments, each nucleoside of a uniformly modified comprises the same 2'-modification.

2. Certain Nucleobase Motifs

In certain embodiments, compounds described herein comprise oligonucleotides. In certain embodiments, oligonucleotides comprise modified and/or unmodified nucleobases arranged along the oligonucleotide or region thereof in a defined pattern or motif. In certain embodiments, each nucleobase is modified. In certain embodiments, none of the nucleobases are modified. In certain embodiments, each purine or each pyrimidine is modified. In certain embodiments, each adenine is modified. In certain embodiments, each guanine is modified. In certain embodiments, each thymine is modified. In certain embodiments, each uracil is modified. In certain embodiments, each cytosine is modified. In certain embodiments, some or all of the cytosine nucleobases in a modified oligonucleotide are 5-methylcytosines.

In certain embodiments, modified oligonucleotides comprise a block of modified nucleobases. In certain such embodiments, the block is at the 3'-end of the oligonucleotide. In certain embodiments the block is within 3 nucleosides of the 3'-end of the oligonucleotide. In certain embodiments, the block is at the 5'-end of the oligonucleotide. In certain embodiments the block is within 3 nucleosides of the 5'-end of the oligonucleotide.

In certain embodiments, oligonucleotides having a gapmer motif comprise a nucleoside comprising a modified nucleobase. In certain such embodiments, one nucleoside comprising a modified nucleobase is in the central gap of an oligonucleotide having a gapmer motif. In certain such embodiments, the sugar moiety of said nucleoside is a 2'-deoxyribosyl moiety. In certain embodiments, the modified nucleobase is selected from: a 2-thiopyrimidine and a 5-propynepyrimidine.

3. Certain Internucleoside Linkage Motifs

In certain embodiments, compounds described herein comprise oligonucleotides. In certain embodiments, oligonucleotides comprise modified and/or unmodified internucleoside linkages arranged along the oligonucleotide or region thereof in a defined pattern or motif. In certain embodiments, essentially each internucleoside linking group is a phosphate internucleoside linkage (P=O). In certain embodiments, each internucleoside linking group of a modified oligonucleotide is a phosphorothioate (P=S). In certain embodiments, each internucleoside linking group of a modified oligonucleotide is independently selected from a phosphorothioate and phosphate internucleoside linkage. In certain embodiments, the sugar motif of a modified oligonucleotide is a gapmer and the internucleoside linkages within the gap are all modified. In certain such embodiments, some or all of the internucleoside linkages in the wings are unmodified phosphate linkages. In certain embodiments, the terminal internucleoside linkages are modified.

C. Certain Modified Oligonucleotides

In certain embodiments, compounds described herein comprise modified oligonucleotides. In certain embodiments, the above modifications (sugar, nucleobase, internucleoside linkage) are incorporated into a modified oligonucleotide. In certain embodiments, modified oligonucleotides are characterized by their modification, motifs, and overall lengths. In certain embodiments, such parameters are each independent of one another. Thus, unless otherwise indicated, each internucleoside linkage of an oligonucleotide having a gapmer sugar motif may be modified or unmodified and may or may not follow the gapmer modification pattern of the sugar modifications. For example, the internucleoside linkages within the wing regions of a sugar gapmer may be the same or different from one another and may be the same or different from the internucleoside linkages of the gap region of the sugar motif. Likewise, such gapmer oligonucleotides may comprise one or more modified nucleobase independent of the gapmer pattern of the sugar modifications. Furthermore, in certain instances, an oligonucleotide is described by an overall length or range and by lengths or length ranges of two or more regions (e.g., a regions of nucleosides having specified sugar modifications), in such circumstances it may be possible to select numbers for each range that result in an oligonucleotide having an overall length falling outside the specified range. In such circumstances, both elements must be satisfied. For example, in certain embodiments, a modified oligonucleotide consists of 15-20 linked nucleosides and has a sugar motif consisting of three regions, A, B, and C, wherein region A consists of 2-6 linked nucleosides having a specified sugar motif, region B consists of 6-10 linked nucleosides having a specified sugar motif, and region C consists of 2-6 linked nucleosides having a specified sugar motif Such embodiments do not include modified oligonucleotides where A and C each consist of 6 linked nucleosides and B consists of 10 linked nucleosides (even though those numbers of nucleosides are permitted within the requirements for A, B, and C) because the overall length of such oligonucleotide is 22, which exceeds the upper limit of the overall length of the modified oligonucleotide (20). Herein, if a description of an oligonucleotide is silent with respect to one or more parameter, such parameter is not limited. Thus, a modified oligonucleotide described only as having a gapmer sugar motif without further description may have any length, internucleoside linkage motif, and nucleobase motif. Unless otherwise indicated, all modifications are independent of nucleobase sequence.

Compositions and Methods for Formulating Pharmaceutical Compositions

Compounds described herein may be admixed with pharmaceutically acceptable active or inert substances for the preparation of pharmaceutical compositions or formulations. Compositions and methods for the formulation of pharmaceutical compositions are dependent upon a number of criteria, including, but not limited to, route of administration, extent of disease, or dose to be administered.

In certain embodiments, the present invention provides pharmaceutical compositions comprising one or more compounds or a salt thereof. In certain embodiments, the compounds are antisense compounds or oligomeric compounds. In certain embodiments, the compounds comprise or consist of a modified oligonucleotide. In certain such embodiments, the pharmaceutical composition comprises a suitable pharmaceutically acceptable diluent or carrier. In certain embodiments, a pharmaceutical composition comprises a sterile saline solution and one or more compound. In certain embodiments, such pharmaceutical composition consists of a sterile saline solution and one or more compound. In certain embodiments, the sterile saline is pharmaceutical grade saline. In certain embodiments, a pharmaceutical composition comprises one or more compound and sterile water. In certain embodiments, a pharmaceutical composition consists of one compound and sterile water. In certain embodiments, the sterile water is pharmaceutical grade water. In certain embodiments, a pharmaceutical composition comprises one or more compound and phosphate-buffered saline (PBS). In certain embodiments, a pharmaceutical composition consists of one or more compound and sterile PBS. In certain embodiments, the sterile PBS is pharmaceutical grade PBS. Compositions and methods for the formulation of pharmaceutical compositions are dependent upon a number of criteria, including, but not limited to, route of administration, extent of disease, or dose to be administered.

A compound described herein targeted to a MAT1a nucleic acid can be utilized in pharmaceutical compositions by combining the compound with a suitable pharmaceutically acceptable diluent or carrier. In certain embodiments, a pharmaceutically acceptable diluent is water, such as sterile water suitable for injection. Accordingly, in one embodiment, employed in the methods described herein is a pharmaceutical composition comprising a compound targeted to a MAT1a nucleic acid and a pharmaceutically acceptable diluent. In certain embodiments, the pharmaceutically acceptable diluent is water. In certain embodiments, the compound comprises or consists of a modified oligonucleotide provided herein.

Pharmaceutical compositions comprising compounds provided herein encompass any pharmaceutically acceptable salts, esters, or salts of such esters, or any other oligonucleotide which, upon administration to an individual, including a human, is capable of providing (directly or indirectly) the biologically active metabolite or residue thereof. In certain embodiments, the compounds are antisense compounds or oligomeric compounds. In certain embodiments, the compound comprises or consists of a modified oligonucleotide. Accordingly, for example, the disclosure is also drawn to pharmaceutically acceptable salts of compounds, prodrugs, pharmaceutically acceptable salts of such prodrugs, and other bioequivalents. Suitable pharmaceutically acceptable salts include, but are not limited to, sodium and potassium salts.

A prodrug can include the incorporation of additional nucleosides at one or both ends of a compound which are cleaved by endogenous nucleases within the body, to form the active compound.

In certain embodiments, the compounds or compositions further comprise a pharmaceutically acceptable carrier or diluent.

EXAMPLES

Non-Limiting Disclosure and Incorporation by Reference

While certain compounds, compositions and methods described herein have been described with specificity in accordance with certain embodiments, the following examples serve only to illustrate the compounds described herein and are not intended to limit the same. Each of the references recited in the present application is incorporated herein by reference in its entirety.

Example 1: Antisense Inhibition of Mouse Mat1a in Primary Mouse Hepatocytes by MOE Gapmers Modified oligonucleotides were designed to target a Mat1a nucleic acid and were tested for their effect on Mat1a RNA levels in vitro. The modified oligonucleotides were tested in a series of experiments that had similar culture conditions. The results for each experiment are presented in separate tables shown below.

The newly designed modified oligonucleotides in the Tables below were designed as 5-10-5 MOE gapmers. The gapmers are 20 nucleosides in length, wherein the central gap segment comprises of ten 2'-deoxynucleosides and is flanked by wing segments on the 5' direction and the 3' direction comprising five nucleosides each. Each nucleoside in the 5' wing segment and each nucleoside in the 3' wing segment has a MOE sugar modification. The internucleoside linkages throughout each gapmer are phosphorothioate (P=S) linkages. All cytosine residues throughout each gapmer are 5-methylcytosines.

"Start site" indicates the 5'-most nucleoside to which the gapmer is targeted in the mouse gene sequence. "Stop site" indicates the 3'-most nucleoside to which the gapmer is targeted mouse gene sequence. Most of the modified oligonucleotide listed in the Tables below are targeted to either the mouse Mat1a mRNA, designated herein as SEQ ID NO: 1 (GENBANK Accession No. NM_133653.3) or to the mouse Mat1a genomic sequence, designated herein as SEQ ID NO: 2 (GENBANK Accession No. NC_000080.6, truncated from nucleotides 41102001 to 41127000).

Primary mouse hepatocyte cells at a density of 20,000 cells per well were treated using free uptake with 6,000 nM of modified oligonucleotide. After a treatment period of approximately 16 hours, RNA was isolated from the cells and Mat1a mRNA levels were measured by quantitative real-time RTPCR. Mouse primer probe set RTS38108 (forward sequence GAGCCTTCATGTTCACATCAG, designated herein as SEQ ID NO.: 3; reverse sequence GTCTTGCACACTGTCTCACA; designated herein as SEQ ID NO.: 4; probe sequence AGATCTTATCTGGATGCCCCTCTCCTAC, designated herein as SEQ ID NO.: 5) was used to measure RNA levels. Mat1a mRNA levels were adjusted according to total RNA content, as measured by RIBOGREEN®. Results are presented as percent inhibition of Mat1a relative to untreated control cells. As used herein, a value of '0' indicates that treatment with the modified oligonucleotide did not inhibit Mat1a mRNA levels.

TABLE 1

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1017940 | 7 | 26 | 3039 | 3058 | AGTCTCCCAGAGATTTGGTA | 0 | 8 |
| 1017946 | 109 | 128 | 3141 | 3160 | TTCGGACTTCCTTCAGCTCC | 0 | 9 |
| 1017952 | 166 | 185 | 3198 | 3217 | GTCTGTGGTCTAAGTGAGAT | 0 | 10 |
| 1017958 | 281 | 300 | 3399 | 3418 | CAAAGAGGGAGATAGCGGAT | 0 | 11 |
| 1017964 | 439 | 458 | 3557 | 3576 | CGACTTCACTTCTCCAAAGT | 2 | 12 |
| 1018024 | 1563 | 1582 | 20505 | 20524 | GGGTTTTTTCAGATCCAAGT | 0 | 13 |
| 1018036 | 1810 | 1829 | 20752 | 20771 | GTCATTCATAAGATGTTTGC | 0 | 14 |
| 1018042 | 1978 | 1997 | 20920 | 20939 | GGCCTGGTAAGGTTCAGACT | 33 | 15 |
| 1018048 | 2112 | 2131 | 21054 | 21073 | TGTAGCAGATGCCTAGTCTC | 33 | 16 |
| 1018054 | 2199 | 2218 | 21141 | 21160 | GACAACACCTTATTGTGCTG | 63 | 17 |
| 1018060 | 2371 | 2390 | 21313 | 21332 | CCACTTGTCATCACTCTGGT | 49 | 18 |
| 1018066 | 2454 | 2473 | 21396 | 21415 | GGGCTCACAAAGAGCCACTA | 0 | 19 |
| 1018072 | 2560 | 2579 | 21502 | 21521 | TCCAGCCCAGCTTGATAGGC | 0 | 20 |
| 1018078 | 2702 | 2721 | 21644 | 21663 | GCTATAACAACCAGCTGCCT | 0 | 21 |
| 1018084 | 2782 | 2801 | 21724 | 21743 | AGCCTGCATAAGCATGAGCG | 0 | 22 |
| 1018090 | 2830 | 2849 | 21772 | 21791 | TGGCAACTTGTCGATTGCTT | 11 | 23 |
| 1018096 | 2948 | 2967 | 21890 | 21909 | GGTTGGGAATGTGGTACTGA | 0 | 24 |
| 1018102 | 3053 | 3072 | 21995 | 22014 | GCCCTTCTCCTAGCCAGAAC | 0 | 25 |
| 1018108 | 3209 | 3228 | 22151 | 22170 | GACTCAAGCTTCTAAGTCAC | 0 | 26 |
| 1018114 | 3335 | 3354 | 22277 | 22296 | GCAAGTATACCATTCTGGAT | 37 | 27 |
| 1018126 | N/A | N/A | 3846 | 3865 | GAGAACCATCCTCCTAGTCT | 0 | 28 |
| 1018132 | N/A | N/A | 4251 | 4270 | CCATCCCCCTTTCAAGAACC | 0 | 29 |
| 1018138 | N/A | N/A | 4503 | 4522 | TGTGGTATTCCCATACCAGC | 0 | 30 |
| 1018144 | N/A | N/A | 4711 | 4730 | GTCGAATTTCAAGGTATAAA | 0 | 31 |
| 1018150 | N/A | N/A | 5065 | 5084 | TCTCTTGGCATAGTATGTTC | 0 | 32 |
| 1018156 | N/A | N/A | 5347 | 5366 | TTACTTCATAGGCTTAAGAC | 0 | 33 |
| 1018162 | N/A | N/A | 5864 | 5883 | GCTATTCATAAGTTAACTAC | 0 | 34 |
| 1018168 | N/A | N/A | 6146 | 6165 | GGCCCATGGAGATCATCTCT | 0 | 35 |
| 1018174 | N/A | N/A | 6543 | 6562 | TGGGCTAAGATGAGACTGAC | 0 | 36 |
| 1018180 | N/A | N/A | 6835 | 6854 | CCAACCCTATTCCCTAGTGC | 0 | 37 |
| 1018186 | N/A | N/A | 7320 | 7339 | AGACACCTTATGAGTCAGCT | 0 | 38 |
| 1018192 | N/A | N/A | 7724 | 7743 | GTTCCCCCCTAGTCCTCTGC | 0 | 39 |
| 1018198 | N/A | N/A | 7933 | 7952 | GTTGCTGGTAAATGGGATGC | 0 | 40 |
| 1018204 | N/A | N/A | 8181 | 8200 | GGACATGGACCTTCCACACT | 0 | 41 |
| 1018210 | N/A | N/A | 8468 | 8487 | GCCCTAGCTAAGAATCTAGT | 0 | 42 |
| 1018216 | N/A | N/A | 8841 | 8860 | GTGCAAGTGTTGGTAGTAGA | 0 | 43 |

TABLE 1-continued

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1018228 | N/A | N/A | 9400 | 9419 | CCCCCTTCATTACGAGCTTC | 0 | 44 |
| 1018234 | N/A | N/A | 9549 | 9568 | GTGTTGTTTCACGGTAGTTA | 0 | 45 |
| 1018240 | N/A | N/A | 9782 | 9801 | TCCTCAGTTATCCTTGTGCC | 10 | 46 |
| 1018246 | N/A | N/A | 10053 | 10072 | TTCAACCTAGACTCAGAGGG | 0 | 47 |
| 1018252 | N/A | N/A | 10940 | 10959 | ATACCTCTTCCCAATGCTGA | 7 | 48 |
| 1018258 | N/A | N/A | 11221 | 11240 | ACCCAAACTTGACCAGCTCC | 0 | 49 |
| 1018264 | N/A | N/A | 11601 | 11620 | TCTTGTCATTTAGAGGCCCA | 0 | 50 |
| 1018270 | N/A | N/A | 12060 | 12079 | GTTGAAAGACCTGATATTTG | 0 | 51 |
| 1018276 | N/A | N/A | 12472 | 12491 | TGCCGGGTAGCAGTGCTCAA | 22 | 52 |
| 1018282 | N/A | N/A | 12930 | 12949 | TACTTGGGAAAAATGTGCCC | 0 | 53 |
| 1018288 | N/A | N/A | 13410 | 13429 | GCAAGAAATAGTCAGTTACC | 0 | 54 |
| 1018294 | N/A | N/A | 13703 | 13722 | GTGCCGAGGAAAAGGGATCG | 0 | 55 |
| 1018300 | N/A | N/A | 14023 | 14042 | GGATAATGCTTTGGGTACCT | 1 | 56 |
| 1018306 | N/A | N/A | 14417 | 14436 | CCACCTGTGCTAATGTTTGC | 0 | 57 |
| 1018312 | N/A | N/A | 14708 | 14727 | ATGTGTTGTGCTCCACCTAG | 9 | 58 |
| 1018318 | N/A | N/A | 15002 | 15021 | GTTATGGTGGAATAATATGC | 0 | 59 |
| 1018324 | N/A | N/A | 15464 | 15483 | CTGGTGGCCCCAACTCTACC | 0 | 60 |
| 1018330 | N/A | N/A | 15817 | 15836 | GGCCCCCTGTGACAGGCATA | 0 | 61 |
| 1018336 | N/A | N/A | 16138 | 16157 | AACTCCTGGAACGGGTTGGC | 0 | 62 |
| 1018342 | N/A | N/A | 16477 | 16496 | GTGTCCTGCTGGTCCAAAAA | 0 | 63 |
| 1018348 | N/A | N/A | 16784 | 16803 | GGGCCCATGCTACCTGAGAC | 0 | 64 |
| 1018354 | N/A | N/A | 17162 | 17181 | GACCTTGCTCAAGCTGAACC | 8 | 65 |
| 1018360 | N/A | N/A | 17470 | 17489 | GGCTCTAGTCAGGACTGTTA | 9 | 66 |
| 1018366 | N/A | N/A | 17659 | 17678 | GACAAGGGTATCTTGGTCCT | 0 | 67 |
| 1018372 | N/A | N/A | 18254 | 18273 | GCAGTCCAGGTATCAAGGCC | 0 | 68 |
| 1018378 | N/A | N/A | 18670 | 18689 | TACCCCTCTGGTCTGTGTA | 0 | 69 |
| 1018384 | N/A | N/A | 19005 | 19024 | GCCATCCACCTGTAGTAGGA | 44 | 70 |
| 1018390 | N/A | N/A | 19464 | 19483 | GGGCAACCTACCTGAACAAG | 0 | 71 |
| 1018396 | N/A | N/A | 19909 | 19928 | TGATGGCCCTTTTACCTGAC | 0 | 72 |
| 1018402 | N/A | N/A | 20244 | 20263 | GGTTTAGCCAAGGCCAGTGC | 0 | 73 |

TABLE 2

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1017942 | 35 | 54 | 3067 | 3086 | GCCTGGAGTTACTCATGGGC | 0 | 74 |
| 1017948 | 124 | 143 | 3156 | 3175 | GGACCGGAAGTGCCTTTCGG | 0 | 75 |
| 1017954 | 238 | 257 | 3356 | 3375 | GCTGGTCGCAGCTTGCTCCC | 0 | 76 |
| 1017966 | 452 | 471 | 3570 | 3589 | GTGCCACACTTTTCGACTTC | 0 | 77 |
| 1017990 | 928 | 947 | 12770 | 12789 | GAGCGAGCACGATGGTAAGG | 0 | 78 |
| 1018002 | 1183 | 1202 | 18158 | 18177 | GGTAAACAGTATCTTCATCC | 0 | 79 |
| 1018020 | 1481 | 1500 | 19834 | 19853 | TCAGTCTTATTGGAGGTCCC | 0 | 80 |
| 1018032 | 1654 | 1673 | 20596 | 20615 | TCCAGCGGCTCTAAAACACA | 0 | 81 |
| 1018038 | 1865 | 1884 | 20807 | 20826 | GTGACTACCCTCAAAAGGAG | 8 | 82 |
| 1018044 | 2070 | 2089 | 21012 | 21031 | GGCTCGGAATCTCTGGCTGC | 39 | 83 |
| 1018050 | 2138 | 2157 | 21080 | 21099 | GCTCAGGAGACATTGACCAT | 74 | 84 |
| 1018056 | 2290 | 2309 | 21232 | 21251 | GGCTCTGATACATGTGGCTA | 65 | 85 |
| 1018062 | 2389 | 2408 | 21331 | 21350 | CCATAGCCTCAAGTCGATCC | 21 | 86 |
| 1018068 | 2480 | 2499 | 21422 | 21441 | ATTTTGATTTTGTGGAACGC | 27 | 87 |
| 1018074 | 2577 | 2596 | 21519 | 21538 | TCCTCTTAGTTCGAGACTCC | 0 | 88 |
| 1018080 | 2726 | 2745 | 21668 | 21687 | CCCTTTCAGAGGCCGGTTGT | 25 | 89 |
| 1018086 | 2814 | 2833 | 21756 | 21775 | GCTTGGAGGCTGTCCCTCTA | 0 | 90 |
| 1018092 | 2837 | 2856 | 21779 | 21798 | GAGATCTTGGCAACTTGTCG | 9 | 91 |
| 1018098 | 2975 | 2994 | 21917 | 21936 | GCTGTGAGAAGGGCCCAACT | 46 | 92 |
| 1018104 | 3113 | 3132 | 22055 | 22074 | GGGATCTCTGCCCAGTCAAG | 0 | 93 |
| 1018110 | 3232 | 3251 | 22174 | 22193 | GGCAGCTCCGAACCCTATGG | 24 | 94 |
| 1018116 | 3359 | 3378 | 22301 | 22320 | AGGCTCATTACTCTCAGGGT | 0 | 95 |
| 1018122 | N/A | N/A | 3338 | 3357 | CCAGGTGACTCCTATATATG | 0 | 96 |
| 1018128 | N/A | N/A | 3939 | 3958 | TGCCATCTGCAGCTCCGACT | 0 | 97 |
| 1018134 | N/A | N/A | 4346 | 4365 | TATACAGCTTGACAACCTCT | 0 | 98 |
| 1018140 | N/A | N/A | 4528 | 4547 | GCTCTCCTAGATCAGTTGTT | 5 | 99 |
| 1018146 | N/A | N/A | 4857 | 4876 | GCCTCCAAGCCCTATGATGC | 0 | 100 |
| 1018152 | N/A | N/A | 5164 | 5183 | TGGGTTAGCAGATGTCTTCC | 0 | 101 |
| 1018158 | N/A | N/A | 5548 | 5567 | GATGTCTTAACTCCCCTGTC | 0 | 102 |
| 1018164 | N/A | N/A | 5898 | 5917 | GGTGGTCAATATTGACCTGT | 0 | 103 |
| 1018170 | N/A | N/A | 6257 | 6276 | TAACCATGGGATCTAGAAGC | 0 | 104 |
| 1018182 | N/A | N/A | 6957 | 6976 | TTGGATGGCAGGTATTGCAT | 0 | 105 |
| 1018188 | N/A | N/A | 7543 | 7562 | GTGCACCATGAACTTCTTTG | 0 | 106 |
| 1018194 | N/A | N/A | 7805 | 7824 | CTCTTCACTTTCTCGGAAGG | 8 | 107 |
| 1018200 | N/A | N/A | 8000 | 8019 | CAACACTGATGGCCCTTTGA | 0 | 108 |
| 1018206 | N/A | N/A | 8280 | 8299 | GTGCATACTGGTCTCCACAC | 0 | 109 |

TABLE 2-continued

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1018212 | N/A | N/A | 8593 | 8612 | TGTGTATCCTAACCCAAGGA | 0 | 110 |
| 1018218 | N/A | N/A | 8932 | 8951 | CGATTCATTAGTGGCTTCAG | 0 | 111 |
| 1018224 | N/A | N/A | 9246 | 9265 | CTCCAGATGGAATTTGTACT | 0 | 112 |
| 1018230 | N/A | N/A | 9449 | 9468 | GACACTAGCACCTGTGCTTG | 0 | 113 |
| 1018236 | N/A | N/A | 9650 | 9669 | ACCTGTAATTAGGCCCAGGT | 0 | 114 |
| 1018242 | N/A | N/A | 9853 | 9872 | CATCTGATATACCCCCAGGC | 0 | 115 |
| 1018248 | N/A | N/A | 10206 | 10225 | GCCACACATCTTAAGTGGGA | 0 | 116 |
| 1018254 | N/A | N/A | 11097 | 11116 | GCAGTCCCTCTACCCATGCA | 2 | 117 |
| 1018260 | N/A | N/A | 11355 | 11374 | TAACAGCCACCCCTGTCAGG | 0 | 118 |
| 1018266 | N/A | N/A | 11734 | 11753 | TCTGGACTACTTTGAACCGG | 0 | 119 |
| 1018272 | N/A | N/A | 12157 | 12176 | GGACTATAAGTTTCTTGGTG | 0 | 120 |
| 1018278 | N/A | N/A | 12508 | 12527 | GCAATCATGGGTTTCTACCA | 0 | 121 |
| 1018284 | N/A | N/A | 13229 | 13248 | GGCATATAACCAAGCATGAG | 0 | 122 |
| 1018290 | N/A | N/A | 13483 | 13502 | GTTGGGCCCATCCGTGTGTC | 6 | 123 |
| 1018296 | N/A | N/A | 13804 | 13823 | ATTTACATTTATACCGCCAA | 0 | 124 |
| 1018302 | N/A | N/A | 14079 | 14098 | GATGGGAAATGTGTGTAGCC | 0 | 125 |
| 1018308 | N/A | N/A | 14523 | 14542 | GTCAAGACCTTGGGACATCA | 0 | 126 |
| 1018314 | N/A | N/A | 14813 | 14832 | GGACCAATCCAGGAAAGGTT | 0 | 127 |
| 1018320 | N/A | N/A | 15094 | 15113 | AGGATGGTGTATAAGCCCTA | 0 | 128 |
| 1018326 | N/A | N/A | 15558 | 15577 | GGAACTCCACATTTCTAAGC | 11 | 129 |
| 1018338 | N/A | N/A | 16236 | 16255 | GGAGGTTCAGTCTTGAGGCA | 0 | 130 |
| 1018344 | N/A | N/A | 16606 | 16625 | GGTTGTGCTGAAATATGGTC | 0 | 131 |
| 1018350 | N/A | N/A | 16915 | 16934 | GGGTCACCTTTGTTGCCCAT | 0 | 132 |
| 1018356 | N/A | N/A | 17298 | 17317 | TGTCCAGTTCGGTTCCCATC | 21 | 133 |
| 1018362 | N/A | N/A | 17525 | 17544 | CCTGGAAGTACATTGGGACC | 0 | 134 |
| 1018368 | N/A | N/A | 17813 | 17832 | TTGCTCTATACTGTGATGAC | 0 | 135 |
| 1018374 | N/A | N/A | 18406 | 18425 | CTCCTCTGATCATGTACCCC | 1 | 136 |
| 1018380 | N/A | N/A | 18817 | 18836 | CACACTTTGCAGTTACCTAT | 38 | 137 |
| 1018386 | N/A | N/A | 19095 | 19114 | GGCAACCTGTCAAAGCCTTA | 0 | 138 |
| 1018392 | N/A | N/A | 19619 | 19638 | CCCTAGTTTGCCAGGGCTCC | 0 | 139 |
| 1018398 | N/A | N/A | 20000 | 20019 | GGGACCCTCCTGTTGTAAGT | 0 | 140 |
| 1018404 | N/A | N/A | 20365 | 20384 | CAGTGCTATCATGATCAGGT | 21 | 141 |

TABLE 3

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1017939 | 2 | 21 | 3034 | 3053 | CCCAGAGATTTGGTATGGGC | 0 | 142 |
| 1017945 | 94 | 113 | 3126 | 3145 | GCTCCTTAGCTAATCTCTGA | 0 | 143 |
| 1017951 | 149 | 168 | 3181 | 3200 | GATTAGGAAGGCTGTTTAGC | 0 | 144 |
| 1017957 | 274 | 293 | 3392 | 3411 | GGAGATAGCGGATGGAATAC | 0 | 145 |
| 1017963 | 385 | 404 | 3503 | 3522 | TTATCCTCCCCCTACAAACC | 0 | 146 |
| 1017993 | 957 | 976 | 12799 | 12818 | CAGATCTGCTATCCGGGTGT | 0 | 147 |
| 1018023 | 1534 | 1553 | 19887 | 19906 | TAACACCAGGCCGAAGGTCA | 0 | 148 |
| 1018035 | 1794 | 1813 | 20736 | 20755 | TTGCAGATTGCTGGATAGGG | 50 | 149 |
| 1018041 | 1970 | 1989 | 20912 | 20931 | AAGGTTCAGACTATGGGAGG | 0 | 150 |
| 1018047 | 2099 | 2118 | 21041 | 21060 | TAGTCTCAGAGGGACCCTTA | 0 | 151 |
| 1018053 | 2162 | 2181 | 21104 | 21123 | CTCAGTCCCTCACACGATGC | 30 | 152 |
| 1018059 | 2365 | 2384 | 21307 | 21326 | GTCATCACTCTGGTCAACAT | 26 | 153 |
| 1018065 | 2446 | 2465 | 21388 | 21407 | AAAGAGCCACTAGGTTCATC | 0 | 154 |
| 1018071 | 2549 | 2568 | 21491 | 21510 | TTGATAGGCCAAGATACCCA | 31 | 155 |
| 1018077 | 2654 | 2673 | 21596 | 21615 | GCTGTCTATGATTAGAACCC | 51 | 156 |
| 1018083 | 2744 | 2763 | 21686 | 21705 | CTCAAAAGGTGCAGGGTCCC | 0 | 157 |
| 1018089 | 2825 | 2844 | 21767 | 21786 | ACTTGTCGATTGCTTGGAGG | 0 | 158 |
| 1018095 | 2936 | 2955 | 21878 | 21897 | GGTACTGATTATGATGGGAC | 70 | 159 |
| 1018101 | 3020 | 3039 | 21962 | 21981 | GGTCCCCTCCTGAACCCATG | 0 | 160 |
| 1018107 | 3184 | 3203 | 22126 | 22145 | GCATCAGGATCTGTTGGCCA | 23 | 161 |
| 1018113 | 3289 | 3308 | 22231 | 22250 | AGGAACTCAACCTTCGCACG | 43 | 162 |
| 1018119 | N/A | N/A | 3011 | 3030 | GGTTGCAACACAGTGAGGCT | 0 | 163 |
| 1018125 | N/A | N/A | 3731 | 3750 | GTAAAAGTAACTCCTGGCAC | 0 | 164 |
| 1018131 | N/A | N/A | 4219 | 4238 | GAATGTTCCTCTATAGCAGT | 0 | 165 |
| 1018137 | N/A | N/A | 4476 | 4495 | GCACCTCCTAAAAGCTGTTA | 0 | 166 |
| 1018143 | N/A | N/A | 4633 | 4652 | GGTGACACAACATATCGCCC | 0 | 167 |
| 1018149 | N/A | N/A | 4984 | 5003 | CCTATGATGGACAGCTGCAC | 0 | 168 |
| 1018155 | N/A | N/A | 5310 | 5329 | AGTACGGGAGAATTTTGCCA | 0 | 169 |
| 1018161 | N/A | N/A | 5852 | 5871 | TTAACTACTGACAGATATCC | 0 | 170 |
| 1018167 | N/A | N/A | 6114 | 6133 | CCTGAGTCAAGGAGTTTAGC | 3 | 171 |
| 1018173 | N/A | N/A | 6517 | 6536 | GCAGCAAGAGCCGGAAGTA | 0 | 172 |
| 1018179 | N/A | N/A | 6799 | 6818 | TATGGCTATAGTCTAACATC | 0 | 173 |
| 1018185 | N/A | N/A | 7129 | 7148 | GTTGCTCATAACCAATCCCC | 15 | 174 |
| 1018191 | N/A | N/A | 7680 | 7699 | ACTTCTAGGTGATGAATCTG | 0 | 175 |
| 1018197 | N/A | N/A | 7900 | 7919 | ACATATGAGGCATACCACAA | 0 | 176 |
| 1018203 | N/A | N/A | 8141 | 8160 | GTGTGACAAAGCCTTCTATC | 0 | 177 |

TABLE 3-continued

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1018209 | N/A | N/A | 8399 | 8418 | GCTATCAGGGTGATATCTAC | 0 | 178 |
| 1018215 | N/A | N/A | 8835 | 8854 | GTGTTGGTAGTAGAATGAAG | 0 | 179 |
| 1018221 | N/A | N/A | 8995 | 9014 | GGTAGTAGTCATGGGCAGCT | 0 | 180 |
| 1018227 | N/A | N/A | 9313 | 9332 | CACGCTGGCCCCTCCCGCTG | 0 | 181 |
| 1018233 | N/A | N/A | 9542 | 9561 | TTCACGGTAGTTATACTCTA | 0 | 182 |
| 1018239 | N/A | N/A | 9776 | 9795 | GTTATCCTTGTGCCACTTGG | 0 | 183 |
| 1018245 | N/A | N/A | 9969 | 9988 | GCTATAGTAGAACCTTGAAG | 0 | 184 |
| 1018251 | N/A | N/A | 10904 | 10923 | GTCGGGCTGTCACTTAGCCC | 0 | 185 |
| 1018257 | N/A | N/A | 11195 | 11214 | GTGTCCTTGGACATTTACCC | 0 | 186 |
| 1018263 | N/A | N/A | 11486 | 11505 | CGAGAGAGACTCCTAGAGCT | 0 | 187 |
| 1018269 | N/A | N/A | 12053 | 12072 | GACCTGATATTTGCCTCCAT | 0 | 188 |
| 1018275 | N/A | N/A | 12391 | 12410 | TAGCTCAGCAGGATTCCCCT | 0 | 189 |
| 1018281 | N/A | N/A | 12899 | 12918 | GATTTGGTATAATTTAGTAG | 0 | 190 |
| 1018287 | N/A | N/A | 13379 | 13398 | AAGTAACCCCTTAGCTGTGT | 0 | 191 |
| 1018293 | N/A | N/A | 13549 | 13568 | CTAACATGGCACTGCATCCA | 0 | 192 |
| 1018299 | N/A | N/A | 13976 | 13995 | GCATGACTAAAGTGTAATCA | 10 | 193 |
| 1018305 | N/A | N/A | 14278 | 14297 | TACAGCCTGCTCATGGTGGG | 0 | 194 |
| 1018311 | N/A | N/A | 14698 | 14717 | CTCCACCTAGTCCTGTGCCG | 0 | 195 |
| 1018317 | N/A | N/A | 14875 | 14894 | GTTCTCAAGCAGGGAGAACC | 0 | 196 |
| 1018323 | N/A | N/A | 15368 | 15387 | GCCCCAAGTGGAGCCAGTGT | 0 | 197 |
| 1018329 | N/A | N/A | 15755 | 15774 | GGGCATCCCATTAGACTTCC | 0 | 198 |
| 1018335 | N/A | N/A | 16110 | 16129 | GGCCCGAGCTCTGCTCTTAT | 0 | 199 |
| 1018341 | N/A | N/A | 16421 | 16440 | GCTCTGGCCACCTATCATCT | 1 | 200 |
| 1018347 | N/A | N/A | 16744 | 16763 | GTATCTGCACAGCTGAGGGT | 0 | 201 |
| 1018353 | N/A | N/A | 17086 | 17105 | CTAATGACATATCACTGGGC | 0 | 202 |
| 1018359 | N/A | N/A | 17428 | 17447 | GAATCCCCATTGTCTTGGTG | 6 | 203 |
| 1018365 | N/A | N/A | 17617 | 17636 | ATCTTTAGCCACGACTGTAT | 0 | 204 |
| 1018371 | N/A | N/A | 18229 | 18248 | ACAGGGCCTTATCTAGAGAT | 0 | 205 |
| 1018377 | N/A | N/A | 18585 | 18604 | TAGCTGGAGACCCCCATAGC | 0 | 206 |
| 1018383 | N/A | N/A | 18970 | 18989 | ATACAACCCCAGGCTGTCAT | 0 | 207 |
| 1018401 | N/A | N/A | 20195 | 20214 | TGCCATGATGGCATGTAGGA | 0 | 208 |

TABLE 4

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1017943 | 72 | 91 | 3104 | 3123 | GGTTCCCGGGATACCATCCC | 0 | 209 |
| 1017949 | 130 | 149 | 3162 | 3181 | CCTCTCGGACCGGAAGTGCC | 0 | 210 |
| 1017955 | 245 | 264 | 3363 | 3382 | ACTCCAGGCTGGTCGCAGCT | 0 | 211 |
| 1017961 | 341 | 360 | 3459 | 3478 | CCCGAGGAGATGACTTCTGC | 8 | 212 |
| 1017967 | 464 | 483 | 3582 | 3601 | GGTCCATTCATTGTGCCACA | 0 | 213 |
| 1018009 | 1282 | 1301 | 19328 | 19347 | CACCCCAGCCTCCGTATGTG | 0 | 214 |
| 1018033 | 1663 | 1682 | 20605 | 20624 | GCTAAACTTTCCAGCGGCTC | 40 | 215 |
| 1018039 | 1871 | 1890 | 20813 | 20832 | GGAACAGTGACTACCCTCAA | 49 | 216 |
| 1018045 | 2078 | 2097 | 21020 | 21039 | ATAGCAATGGCTCGGAATCT | 13 | 217 |
| 1018051 | 2148 | 2167 | 21090 | 21109 | CGATGCAAATGCTCAGGAGA | 52 | 218 |
| 1018057 | 2317 | 2336 | 21259 | 21278 | GAGTCAGAACTCCTAGATCC | 49 | 219 |
| 1018063 | 2411 | 2430 | 21353 | 21372 | GACCCAGGCCTTAAATAAGT | 0 | 220 |
| 1018069 | 2500 | 2519 | 21442 | 21461 | TGAGACACTTATATGTCTCC | 0 | 221 |
| 1018075 | 2596 | 2615 | 21538 | 21557 | GGGCCAGGACCATGAAACTT | 0 | 222 |
| 1018081 | 2731 | 2750 | 21673 | 21692 | GGGTCCCCTTTCAGAGGCCG | 0 | 223 |
| 1018087 | 2819 | 2838 | 21761 | 21780 | CGATTGCTTGGAGGCTGTCC | 30 | 224 |
| 1018093 | 2915 | 2934 | 21857 | 21876 | CTTAGAAACATGTGGTTCCC | 3 | 225 |
| 1018099 | 2980 | 2999 | 21922 | 21941 | AGTATGCTGTGAGAAGGGCC | 10 | 226 |
| 1018105 | 3170 | 3189 | 22112 | 22131 | TGGCCAATGAGGCTTTTCCC | 0 | 227 |
| 1018111 | 3239 | 3258 | 22181 | 22200 | GCTCCCAGGCAGCTCCGAAC | 9 | 228 |
| 1018117 | 3432 | 3451 | 22374 | 22393 | TCACCATACTATCATCAGGT | 52 | 229 |
| 1018129 | N/A | N/A | 3979 | 3998 | GGAAGTTCATACTGTGTCAG | 0 | 230 |
| 1018135 | N/A | N/A | 4353 | 4372 | TCTGTACTATACAGCTTGAC | 0 | 231 |
| 1018141 | N/A | N/A | 4529 | 4548 | AGCTCTCCTAGATCAGTTGT | 0 | 232 |
| 1018147 | N/A | N/A | 4889 | 4908 | GGTTCCTAGCCAACAGACTC | 0 | 233 |
| 1018153 | N/A | N/A | 5198 | 5217 | TGATAGGCTATCATTAACGA | 0 | 234 |
| 1018159 | N/A | N/A | 5662 | 5681 | CCTCAATCCCTAAGAGACCT | 0 | 235 |
| 1018165 | N/A | N/A | 5936 | 5955 | TCAGTAAAGGCCGCCTGACA | 0 | 236 |
| 1018171 | N/A | N/A | 6297 | 6316 | GTGTAATCTGTATGGGAGAA | 0 | 237 |
| 1018177 | N/A | N/A | 6675 | 6694 | TGGCATCAACCATGGTTCCC | 0 | 238 |
| 1018183 | N/A | N/A | 7020 | 7039 | GTTTGACTGGAGTTGCCTGC | 0 | 239 |
| 1018189 | N/A | N/A | 7559 | 7578 | TGACTCTATGATCTATGTGC | 4 | 240 |
| 1018195 | N/A | N/A | 7830 | 7849 | TTCTAGCCAGCCTCAAGCAT | 0 | 241 |
| 1018201 | N/A | N/A | 8067 | 8086 | GGCCTATATGGACCCCAGA | 3 | 242 |
| 1018207 | N/A | N/A | 8363 | 8382 | GGACCTGACATACGGGCTGA | 0 | 243 |
| 1018213 | N/A | N/A | 8751 | 8770 | CAACCTACTTAACCTGTCTC | 0 | 244 |

TABLE 4-continued

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1018219 | N/A | N/A | 8944 | 8963 | GTGGAGATAGAACGATTCAT | 0 | 245 |
| 1018225 | N/A | N/A | 9294 | 9313 | GTAGTCCTCTATAGAAGGCA | 0 | 246 |
| 1018231 | N/A | N/A | 9489 | 9508 | CCAGGGTATTCTGGAATGAT | 0 | 247 |
| 1018237 | N/A | N/A | 9690 | 9709 | ACCTGGCATGGGTGCTAACC | 0 | 248 |
| 1018243 | N/A | N/A | 9857 | 9876 | GGGTCATCTGATATACCCCC | 0 | 249 |
| 1018249 | N/A | N/A | 10774 | 10793 | GGAGAGGCTATGCATGGTAA | 1 | 250 |
| 1018255 | N/A | N/A | 11135 | 11154 | TCGCACAGAACACCTCAGAG | 0 | 251 |
| 1018261 | N/A | N/A | 11398 | 11417 | GGTGCACCTCTGCATGCTGT | 0 | 252 |
| 1018267 | N/A | N/A | 11837 | 11856 | CCCTCCAGAACCCCACTTGA | 0 | 253 |
| 1018273 | N/A | N/A | 12199 | 12218 | GCCTGGGCAGAAGTAAGCCG | 0 | 254 |
| 1018279 | N/A | N/A | 12627 | 12646 | GTTATGCAGTATCTCTCTCA | 0 | 255 |
| 1018285 | N/A | N/A | 13231 | 13250 | AGGGCATATAACCAAGCATG | 0 | 256 |
| 1018291 | N/A | N/A | 13484 | 13503 | GGTTGGGCCCATCCGTGTGT | 0 | 257 |
| 1018297 | N/A | N/A | 13881 | 13900 | GGAGAGCATAAGCCCTAGTG | 0 | 258 |
| 1018303 | N/A | N/A | 14195 | 14214 | GGCAGGTATTAAGTTACCAC | 0 | 259 |
| 1018309 | N/A | N/A | 14605 | 14624 | CTGATGATGTGGAGGGACCA | 0 | 260 |
| 1018315 | N/A | N/A | 14842 | 14861 | GGGTACTGTTGCTGGCTTGG | 0 | 261 |
| 1018321 | N/A | N/A | 15158 | 15177 | GGGCCACAAGTAGCATTCAG | 0 | 262 |
| 1018327 | N/A | N/A | 15606 | 15625 | GTGCCCATTGTCTTCTACTC | 8 | 263 |
| 1018333 | N/A | N/A | 16016 | 16035 | TGGACTGCCAGCCCTGATTC | 0 | 264 |
| 1018339 | N/A | N/A | 16300 | 16319 | GACTCCCAAGGGAGGAGACC | 0 | 265 |
| 1018345 | N/A | N/A | 16650 | 16669 | CCTAGGGCCCAGATAGGACC | 0 | 266 |
| 1018351 | N/A | N/A | 16954 | 16973 | GGGTGAACAAGCTTTGCAGG | 0 | 267 |
| 1018357 | N/A | N/A | 17347 | 17366 | GTCCTGTCAGGGCAAGCCAT | 0 | 268 |
| 1018363 | N/A | N/A | 17591 | 17610 | GCATATAGAGCCTCTGAGAC | 0 | 269 |
| 1018369 | N/A | N/A | 17885 | 17904 | GGATCCAGAGAGTCCCTTTG | 0 | 270 |
| 1018375 | N/A | N/A | 18480 | 18499 | GACGGTGGCTATGGGCAGGC | 0 | 271 |
| 1018381 | N/A | N/A | 18884 | 18903 | CACCTTTAAATGGAGCTAGA | 0 | 272 |
| 1018387 | N/A | N/A | 19129 | 19148 | CGTCCTTCCTGGCACTGACC | 6 | 273 |
| 1018393 | N/A | N/A | 19649 | 19668 | GCCCCCTGTCTTCAGGTGTG | 0 | 274 |
| 1018399 | N/A | N/A | 20071 | 20090 | ACCAGACACCCCAAGTTGGG | 0 | 275 |
| 1018405 | N/A | N/A | 20424 | 20443 | GGTGGTCCTAGGAGAGGCTT | 0 | 276 |

TABLE 5

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1017941 | 28 | 47 | 3060 | 3079 | GTTACTCATGGGCAGCCAGA | 0 | 277 |
| 1017947 | 119 | 138 | 3151 | 3170 | GGAAGTGCCTTTCGGACTTC | 0 | 278 |
| 1017953 | 180 | 199 | 3212 | 3231 | GTCTCAAGTGGCAAGTCTGT | 0 | 279 |
| 1017965 | 451 | 470 | 3569 | 3588 | TGCCACACTTTTCGACTTCA | 25 | 280 |
| 1018019 | 1476 | 1495 | 19829 | 19848 | CTTATTGGAGGTCCCGTAGG | 0 | 281 |
| 1018037 | 1846 | 1865 | 20788 | 20807 | GACATGATAACCTAGCACCA | 23 | 282 |
| 1018043 | 2035 | 2054 | 20977 | 20996 | GCCAGAGGTCTGTGCAATAT | 22 | 283 |
| 1018049 | 2124 | 2143 | 21066 | 21085 | GACCATATTTTATGTAGCAG | 16 | 284 |
| 1018055 | 2226 | 2245 | 21168 | 21187 | CCATCAGTTACTGTGGATAA | 45 | 285 |
| 1018061 | 2383 | 2402 | 21325 | 21344 | CCTCAAGTCGATCCACTTGT | 34 | 286 |
| 1018067 | 2464 | 2483 | 21406 | 21425 | ACGCTGTCCAGGGCTCACAA | 61 | 287 |
| 1018073 | 2569 | 2588 | 21511 | 21530 | GTTCGAGACTCCAGCCCAGC | 34 | 288 |
| 1018079 | 2720 | 2739 | 21662 | 21681 | CAGAGGCCGGTTGTCTGTGC | 21 | 289 |
| 1018085 | 2798 | 2817 | 21740 | 21759 | TCTACCTGGAACACTTAGCC | 0 | 290 |
| 1018091 | 2832 | 2851 | 21774 | 21793 | CTTGGCAACTTGTCGATTGC | 44 | 291 |
| 1018097 | 2964 | 2983 | 21906 | 21925 | GGCCCAACTAGGGACAGGTT | 0 | 292 |
| 1018103 | 3085 | 3104 | 22027 | 22046 | GCAAGGTATCTGCTTCTTGA | 61 | 293 |
| 1018109 | 3224 | 3243 | 22166 | 22185 | CGAACCCTATGGAAAGACTC | 0 | 294 |
| 1018115 | 3343 | 3362 | 22285 | 22304 | GGGTTAGAGCAAGTATACCA | 0 | 295 |
| 1018127 | N/A | N/A | 3907 | 3926 | GAGTGCAGTGCTATTCCTTT | 0 | 296 |
| 1018133 | N/A | N/A | 4306 | 4325 | GACTACCTACTCAGGGTCCT | 0 | 297 |
| 1018139 | N/A | N/A | 4511 | 4530 | GTTCTCAATGTGGTATTCCC | 19 | 298 |
| 1018145 | N/A | N/A | 4744 | 4763 | GGCACACAGGTGTAGTGAAT | 12 | 299 |
| 1018151 | N/A | N/A | 5123 | 5142 | GGCTGTTAGGTACAACGGGC | 0 | 300 |
| 1018157 | N/A | N/A | 5452 | 5471 | GGACTTGCATAGGCTGGCAG | 0 | 301 |
| 1018163 | N/A | N/A | 5880 | 5899 | GTCAGAGTGTCTATAAGCTA | 17 | 302 |
| 1018169 | N/A | N/A | 6201 | 6220 | ATCAAACCCGTCTTCTGCAA | 0 | 303 |
| 1018175 | N/A | N/A | 6577 | 6596 | CAGCTCCTGCAAGTCAGACG | 7 | 304 |
| 1018181 | N/A | N/A | 6889 | 6908 | TCTAAGAGTCCAAGCAACTC | 0 | 305 |
| 1018187 | N/A | N/A | 7525 | 7544 | TGTCCAGCATACTTAGGTCT | 0 | 306 |
| 1018193 | N/A | N/A | 7765 | 7784 | AGTCCACCGACTCCCAGTGA | 0 | 307 |
| 1018199 | N/A | N/A | 7971 | 7990 | GGTTTGGGTGTGAATAGTTA | 0 | 308 |
| 1018205 | N/A | N/A | 8224 | 8243 | AGGTGCAACCAGCACTGTCT | 0 | 309 |
| 1018211 | N/A | N/A | 8525 | 8544 | TCCCATAACTATCTACTGCC | 0 | 310 |
| 1018217 | N/A | N/A | 8870 | 8889 | GAGCAACTCCAGCACTAATT | 0 | 311 |
| 1018223 | N/A | N/A | 9216 | 9235 | AGGATCAGATTTGACTCCGT | 6 | 312 |

TABLE 5-continued

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1018229 | N/A | N/A | 9417 | 9436 | TGGTCACTAAAGGGATACCC | 30 | 313 |
| 1018235 | N/A | N/A | 9552 | 9571 | CTGGTGTTGTTTCACGGTAG | 24 | 314 |
| 1018241 | N/A | N/A | 9815 | 9834 | GCCCAGATATAAGCAGTGGC | 0 | 315 |
| 1018247 | N/A | N/A | 10138 | 10157 | CCCACACTGCAAGAAGTGGT | 18 | 316 |
| 1018253 | N/A | N/A | 10993 | 11012 | TTAGAGAGGTGCCAAAGGAC | 0 | 317 |
| 1018259 | N/A | N/A | 11285 | 11304 | GCACTTTTCCACCTCCCCGA | 21 | 318 |
| 1018265 | N/A | N/A | 11731 | 11750 | GGACTACTTTGAACCGGGTC | 0 | 319 |
| 1018271 | N/A | N/A | 12102 | 12121 | GGGTGGTAGCCTCTGGTTCA | 0 | 320 |
| 1018277 | N/A | N/A | 12473 | 12492 | ATGCCGGGTAGCAGTGCTCA | 0 | 321 |
| 1018283 | N/A | N/A | 13120 | 13139 | GTGTAACAGGGCATGTAACC | 0 | 322 |
| 1018289 | N/A | N/A | 13446 | 13465 | GGCTCATAACATCCCACTCT | 0 | 323 |
| 1018295 | N/A | N/A | 13776 | 13795 | CGTGTTGACCTTGGTTGGAG | 5 | 324 |
| 1018301 | N/A | N/A | 14052 | 14071 | GTTTTCAAGTAAGTGATTCC | 0 | 325 |
| 1018307 | N/A | N/A | 14468 | 14487 | GCCATTGGCCAAAGGCCATC | 0 | 326 |
| 1018313 | N/A | N/A | 14756 | 14775 | CGAGACACTAGTACCATGGA | 0 | 327 |
| 1018319 | N/A | N/A | 15045 | 15064 | GCTGGTGAATTGGAGACTCT | 13 | 328 |
| 1018325 | N/A | N/A | 15500 | 15519 | TTCTGTCCCATAACCTCCGG | 0 | 329 |
| 1018331 | N/A | N/A | 15868 | 15887 | TCCCTGCATAGAGGCAGACC | 12 | 330 |
| 1018337 | N/A | N/A | 16182 | 16201 | ATGTCCCATCCCTACTGGGC | 12 | 331 |
| 1018343 | N/A | N/A | 16573 | 16592 | GGTGCCTTAGACAGCCATCC | 0 | 332 |
| 1018349 | N/A | N/A | 16847 | 16866 | TAGCCAAGGCTCTGTTTAGC | 0 | 333 |
| 1018355 | N/A | N/A | 17247 | 17266 | GGGAGGTGTCATGTCCACCT | 0 | 334 |
| 1018361 | N/A | N/A | 17500 | 17519 | AGTTTGACAGCTGTATGGAC | 0 | 335 |
| 1018367 | N/A | N/A | 17736 | 17755 | GTGCTAATGACCCTCTCTGG | 0 | 336 |
| 1018373 | N/A | N/A | 18345 | 18364 | GCCAAAGTTCACTGAGCACC | 39 | 337 |
| 1018379 | N/A | N/A | 18730 | 18749 | ACCATAGGACCTATTTTGGG | 44 | 338 |
| 1018385 | N/A | N/A | 19033 | 19052 | GCCTTCACTTTTGAGTCCAC | 45 | 339 |
| 1018391 | N/A | N/A | 19538 | 19557 | GGGCCAGTATCTCCTTACTC | 0 | 340 |
| 1018397 | N/A | N/A | 19974 | 19993 | AGAGCCCTTTATGTTTGGGT | 0 | 341 |
| 1018403 | N/A | N/A | 20293 | 20312 | CCAGGGTATGAACTCTTACC | 0 | 342 |

TABLE 6

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1017944 | 81 | 100 | 3113 | 3132 | TCTCTGAGTGGTTCCCGGGA | 0 | 343 |
| 1017950 | 139 | 158 | 3171 | 3190 | GCTGTTTAGCCTCTCGGACC | 0 | 344 |
| 1017956 | 267 | 286 | 3385 | 3404 | GCGGATGGAATACAGATGTG | 0 | 345 |
| 1017962 | 349 | 368 | 3467 | 3486 | GGCAGAATCCCGAGGAGATG | 0 | 346 |
| 1017968 | 469 | 488 | 3587 | 3606 | CCACAGGTCCATTCATTGTG | 19 | 347 |
| 1017986 | 826 | 845 | 12275 | 12294 | CTAGGTGGACACATTGGGCA | 0 | 348 |
| 1018010 | 1287 | 1306 | 19333 | 19352 | ATGGGCACCCCAGCCTCCGT | 0 | 349 |
| 1018022 | 1498 | 1517 | 19851 | 19870 | CCTCTAGCAGCTCCCGCTCA | 0 | 350 |
| 1018040 | 1933 | 1952 | 20875 | 20894 | CCTGTCAAACAGGAGTAACT | 0 | 351 |
| 1018046 | 2093 | 2112 | 21035 | 21054 | CAGAGGGACCCTTAGATAGC | 0 | 352 |
| 1018052 | 2153 | 2172 | 21095 | 21114 | TCACACGATGCAAATGCTCA | 16 | 353 |
| 1018058 | 2354 | 2373 | 21296 | 21315 | GGTCAACATCTTGTCTGGGA | 73 | 354 |
| 1018064 | 2441 | 2460 | 21383 | 21402 | GCCACTAGGTTCATCTCCTA | 11 | 355 |
| 1018070 | 2542 | 2561 | 21484 | 21503 | GCCAAGATACCCAGATTTCC | 2 | 356 |
| 1018076 | 2648 | 2667 | 21590 | 21609 | TATGATTAGAACCCATGCCC | 20 | 357 |
| 1018082 | 2736 | 2755 | 21678 | 21697 | GTGCAGGGTCCCCTTTCAGA | 50 | 358 |
| 1018088 | 2822 | 2841 | 21764 | 21783 | TGTCGATTGCTTGGAGGCTG | 49 | 359 |
| 1018094 | 2930 | 2949 | 21872 | 21891 | GATTATGATGGGACACTTAG | 0 | 360 |
| 1018100 | 3007 | 3026 | 21949 | 21968 | ACCCATGTTCTTGGGAGCTA | 33 | 361 |
| 1018106 | 3176 | 3195 | 22118 | 22137 | ATCTGTTGGCCAATGAGGCT | 7 | 362 |
| 1018112 | 3279 | 3298 | 22221 | 22240 | CCTTCGCACGCCCATCCTTC | 32 | 363 |
| 1018118 | 3463 | 3482 | 22405 | 22424 | AGTACAGTGTTGTTGCTCCT | 0 | 364 |
| 1018124 | N/A | N/A | 3675 | 3694 | ACCTACTTACCTGGATGCCC | 0 | 365 |
| 1018130 | N/A | N/A | 4031 | 4050 | TATTTGACTCTCAAGGAGTC | 0 | 366 |
| 1018136 | N/A | N/A | 4402 | 4421 | GGGAGTAAGTCCCAGCCCTT | 0 | 367 |
| 1018142 | N/A | N/A | 4577 | 4596 | GTGTGCCTAAATCCAGGTTT | 0 | 368 |
| 1018148 | N/A | N/A | 4929 | 4948 | GGACTCACTCAAGTATTGTG | 0 | 369 |
| 1018154 | N/A | N/A | 5259 | 5278 | GGAAACCAACCAACTTGGAC | 0 | 370 |
| 1018160 | N/A | N/A | 5748 | 5767 | TCCAGCTCACATAAGGTGCC | 0 | 371 |
| 1018166 | N/A | N/A | 6005 | 6024 | CCTTCTGCCAGTGGTAGATG | 11 | 372 |
| 1018172 | N/A | N/A | 6465 | 6484 | GTGCACAAATTCACTCAGCG | 0 | 373 |
| 1018178 | N/A | N/A | 6758 | 6777 | TGGTCACTAAGTGACCAGAC | 0 | 374 |
| 1018184 | N/A | N/A | 7063 | 7082 | GGTCCCCCTCTATTTTGCT | 0 | 375 |
| 1018190 | N/A | N/A | 7614 | 7633 | CACTTTAAGAAGACCTCTCC | 0 | 376 |
| 1018196 | N/A | N/A | 7858 | 7877 | GCTAGATATACATAGTCATC | 0 | 377 |
| 1018202 | N/A | N/A | 8107 | 8126 | TGCTGGAAAACTTATCTTGC | 7 | 378 |

TABLE 6-continued

Inhibition of Mat1a RNA by 5-10-5 MOE gapmers targeting SEQ ID NO: 1 and 2

| ION Compound Number | SEQ ID NO: 1 Start Site | SEQ ID NO: 1 Stop Site | SEQ ID NO: 2 Start Site | SEQ ID NO: 2 Stop Site | Sequence (5' to 3') | Mat1a (% Inhibition) | SEQ ID NO |
|---|---|---|---|---|---|---|---|
| 1018208 | N/A | N/A | 8395 | 8414 | TCAGGGTGATATCTACTCTC | 0 | 379 |
| 1018214 | N/A | N/A | 8806 | 8825 | GGATGAGTTGTATTTGAGTT | 0 | 380 |
| 1018220 | N/A | N/A | 8960 | 8979 | GTCTAGACCTATCAAAGTGG | 0 | 381 |
| 1018226 | N/A | N/A | 9300 | 9319 | CCCGCTGTAGTCCTCTATAG | 0 | 382 |
| 1018232 | N/A | N/A | 9537 | 9556 | GGTAGTTATACTCTAAGCCA | 18 | 383 |
| 1018238 | N/A | N/A | 9722 | 9741 | GAACCTCTTTCCCGGCCCTC | 0 | 384 |
| 1018250 | N/A | N/A | 10846 | 10865 | ACCTAATGGAAGGCATGGTA | 8 | 385 |
| 1018256 | N/A | N/A | 11180 | 11199 | TACCCATGCAATTCTACTCC | 0 | 386 |
| 1018262 | N/A | N/A | 11446 | 11465 | CAACTCTGGAACCAAGTCCC | 0 | 387 |
| 1018268 | N/A | N/A | 11931 | 11950 | TGTGACAACCCACAACAACG | 0 | 388 |
| 1018274 | N/A | N/A | 12369 | 12388 | TGGATCATAGCTCTGTCCAA | 0 | 389 |
| 1018280 | N/A | N/A | 12887 | 12906 | TTTAGTAGGGAGGTCTGCGG | 0 | 390 |
| 1018286 | N/A | N/A | 13337 | 13356 | ATGCAGCAGGTTATCCACAC | 35 | 391 |
| 1018292 | N/A | N/A | 13510 | 13529 | GCTATCTGCATACTACCTGC | 0 | 392 |
| 1018298 | N/A | N/A | 13936 | 13955 | GAGGCTCCCTCCGCAAGAGG | 0 | 393 |
| 1018304 | N/A | N/A | 14208 | 14227 | GTAGTAAAACTGTGGCAGGT | 0 | 394 |
| 1018310 | N/A | N/A | 14649 | 14668 | TAGGCTGTCGGCCTCTGAGC | 0 | 395 |
| 1018316 | N/A | N/A | 14846 | 14865 | CATAGGGTACTGTTGCTGGC | 0 | 396 |
| 1018322 | N/A | N/A | 15279 | 15298 | ACATGCACTATATTGGGCCA | 0 | 397 |
| 1018328 | N/A | N/A | 15706 | 15725 | AACCTCTTTCTTGTACAGGG | 0 | 398 |
| 1018334 | N/A | N/A | 16106 | 16125 | CGAGCTCTGCTCTTATCTCA | 0 | 399 |
| 1018340 | N/A | N/A | 16359 | 16378 | CCTCCATGGGAATTATCCTC | 0 | 400 |
| 1018346 | N/A | N/A | 16719 | 16738 | GATGCTTGCAGCAGTATGCC | 13 | 401 |
| 1018352 | N/A | N/A | 17034 | 17053 | AGCAGATAGGTCCCCTTGAG | 0 | 402 |
| 1018358 | N/A | N/A | 17394 | 17413 | GGACAAGTGGAGCATACTTG | 0 | 403 |
| 1018364 | N/A | N/A | 17595 | 17614 | GTTGGCATATAGAGCCTCTG | 2 | 404 |
| 1018376 | N/A | N/A | 18513 | 18532 | GATGAGTGAGTGCCTGACCA | 0 | 405 |
| 1018382 | N/A | N/A | 18930 | 18949 | GGCTCACTTATGAAGTGTGC | 0 | 406 |
| 1018388 | N/A | N/A | 19171 | 19190 | GGCCCCATGAACCAGGCAG | 0 | 407 |
| 1018394 | N/A | N/A | 19681 | 19700 | GCCAATAGGATCCCTACCTC | 0 | 408 |
| 1018400 | N/A | N/A | 20112 | 20131 | CTCATTATGGCTACTCTCCA | 0 | 409 |
| 1018406 | N/A | N/A | 20494 | 20513 | GATCCAAGTCCCTGCATAGT | 0 | 410 |

Example 2: Dose-Dependent Inhibition of Mouse Mat1a in Primary Mouse Hepatocytes by MOE Gapmers Modified oligonucleotides described in the studies above exhibiting significant in vitro inhibition of Mat1a mRNA were selected and tested at various doses in primary mouse hepatocytes.

Primary mouse hepatocytes plated at a density of 35,000 cells per well were treated using electroporation with modified oligonucleotides diluted to different concentrations, as specified in the Tables below. After a treatment period of approximately 24 hours, Mat1a mRNA levels were measured, as previously described using the mouse Mat1a primer-probe set RTS38018. Mat1a mRNA levels were adjusted according to total RNA content, as measured by RIBOGREEN®. Results are presented in the tables below as percent inhibition of Mat1a, relative to untreated control cells. The half maximal inhibitory concentration ($IC_{50}$) of each modified oligonucleotide is also presented.

TABLE 7

Multi-dose assay of modified oligonucleotides in primary mouse hepatocytes

| ION Compound No. | % Inhibition | | | | $IC_{50}$ (µM) |
|---|---|---|---|---|---|
| | 740.74 nM | 2222.22 nM | 6666.67 nM | 20000.00 nM | |
| 1018095 | 77 | 96 | 95 | 97 | <0.74 |
| 1018384 | 29 | 34 | 23 | 27 | >20 |
| 1018077 | 70 | 87 | 91 | 91 | <0.74 |
| 1018114 | 73 | 88 | 91 | 93 | <0.74 |
| 1018035 | 71 | 88 | 93 | 95 | <0.74 |
| 1018048 | 66 | 81 | 90 | 96 | <0.74 |
| 1018113 | 56 | 83 | 94 | 96 | <0.74 |
| 1018042 | 46 | 73 | 86 | 93 | <0.74 |
| 1018071 | 52 | 73 | 85 | 96 | <0.74 |
| 1018103 | 62 | 70 | 87 | 97 | <0.74 |
| 1018385 | 16 | 6 | 25 | 3 | >20 |
| 1018053 | 59 | 78 | 85 | 94 | <0.74 |
| 1018067 | 65 | 79 | 93 | 97 | <0.74 |
| 1018091 | 56 | 76 | 92 | 97 | <0.74 |
| 1018054 | 84 | 93 | 96 | 94 | <0.74 |
| 1017989 | 63 | 79 | 93 | 97 | <0.74 |
| 1018060 | 77 | 93 | 96 | 97 | <0.74 |
| 1018055 | 73 | 80 | 91 | 97 | <0.74 |

TABLE 8

Multi-dose assay of modified oligonucleotides in primary mouse hepatocytes

| ION Compound No. | % Inhibition | | | | $IC_{50}$ (µM) |
|---|---|---|---|---|---|
| | 740.74 nM | 2222.22 nM | 6666.67 nM | 20000.00 nM | |
| 1018050 | 80 | 90 | 96 | 98 | <0.74 |
| 1018039 | 77 | 90 | 94 | 98 | <0.74 |
| 1018056 | 69 | 88 | 95 | 95 | <0.74 |
| 1018057 | 52 | 78 | 91 | 93 | <0.74 |
| 1018098 | 57 | 83 | 93 | 94 | <0.74 |
| 1018033 | 68 | 76 | 89 | 94 | <0.74 |
| 1018044 | 79 | 89 | 92 | 96 | <0.74 |
| 1018087 | 41 | 62 | 75 | 78 | 1.1 |
| 1018380 | 62 | 69 | 71 | 68 | <0.74 |
| 1018058 | 66 | 83 | 93 | 96 | <0.74 |
| 1018100 | 75 | 82 | 86 | 96 | <0.74 |
| 1018068 | 27 | 58 | 78 | 84 | 1.9 |
| 1018082 | 42 | 55 | 75 | 85 | 1.3 |
| 1018112 | 54 | 75 | 91 | 96 | <0.74 |

TABLE 8-continued

Multi-dose assay of modified oligonucleotides in primary mouse hepatocytes

| ION Compound No. | % Inhibition | | | | $IC_{50}$ (µM) |
|---|---|---|---|---|---|
| | 740.74 nM | 2222.22 nM | 6666.67 nM | 20000.00 nM | |
| 1018051 | 70 | 84 | 89 | 96 | <0.74 |
| 1018088 | 71 | 87 | 95 | 94 | <0.74 |
| 1018117 | 56 | 69 | 72 | 62 | <0.74 |
| 1018286 | 28 | 37 | 30 | 39 | >20 |

Example 3: Tolerability of Modified Oligonucleotides Targeting Mouse Mat1a in C57BL/6 Mice C57BL/6 mice (Jackson Laboratory) are a multipurpose mouse model frequently utilized for safety and efficacy testing. The mice were treated with modified oligonucleotides selected from studies described above and evaluated for changes in the levels of various plasma chemistry markers, as well as for efficacy of modified oligonucleotide mediated knockdown of target RNA in the liver.

Treatment

Groups of 6-week-old male C57BL/6 mice were injected subcutaneously once a week for three weeks (for a total of 4 treatments) with 50 mg/kg of modified oligonucleotides. One group of male C57BL/6 mice was injected with saline. Mice were euthanized 72 hours following the final administration.

Plasma Chemistry Markers

To evaluate the effect of modified oligonucleotides on liver function, plasma levels of albumin (ALB), alanine aminotransferase (ALT), aspartate aminotransferase (AST), total bilirubin (TBIL), creatinine (CRE), and blood urea nitrogen (BUN) were measured using an automated clinical chemistry analyzer (Hitachi Olympus AU400c, Melville, NY). The results are presented in the Table below. Modified oligonucleotides that caused changes in the levels of any of the liver or kidney function markers outside the expected range for modified oligonucleotides were excluded in further studies.

TABLE 9

Plasma chemistry markers in male C57BL/6 mice

| ION Compound No. | ALB (g/dL) | ALT (IU/L) | AST (IU/L) | TBIL (mg/dL) | CRE (mg/dL) | BUN (mg/dL) |
|---|---|---|---|---|---|---|
| Saline | 3.1 | 66 | 97 | 0.24 | 0.13 | 26 |
| 1018060 | 2.9 | 26 | 61 | 0.15 | 0.13 | 23 |
| 1018054 | 3.1 | 32 | 70 | 0.24 | 0.15 | 25 |
| 1018050 | 3.0 | 31 | 60 | 0.19 | 0.17 | 28 |
| 1018095 | 3.2 | 25 | 46 | 0.20 | 0.21 | 31 |
| 1018044 | 3.1 | 22 | 45 | 0.16 | 0.16 | 30 |
| 1018039 | 3.0 | 24 | 1037 | 0.25 | 0.17 | 27 |

Body and Organ Weights

Body weights of C57BL/6 mice were measured at day 22 (3 weeks post $1^{st}$ dose), and the average body weight for each group is presented in the Table below. Kidney, spleen, and liver weights were measured at the end of the study and are presented in the Table below. Modified oligonucleotides that caused any changes in organ weights outside the expected range for modified oligonucleotides were excluded from further studies.

TABLE 10

Body and organ weights (in grams)

| ION Compound No. | Body Weight (g) | Liver (g) | Kidney (g) | Spleen (g) |
|---|---|---|---|---|
| Saline | 26 | 1.3 | 0.4 | 0.1 |
| 1018060 | 25 | 1.6 | 0.3 | 0.1 |
| 1018054 | 26 | 1.3 | 0.3 | 0.1 |
| 1018050 | 26 | 1.6 | 0.3 | 0.1 |
| 1018095 | 26 | 1.5 | 0.3 | 0.1 |
| 1018044 | 26 | 1.5 | 0.3 | 0.1 |
| 1018039 | 25 | 1.4 | 0.3 | 0.1 |

RNA Analysis

On day 25, RNA was extracted from livers for real-time RTPCR analysis of Mat1a mRNA expression. Primer probe set RTS38108 was used to measure mouse Mat1a mRNA levels. Mat1a mRNA levels were adjusted according to total RNA content, as measured by RIBOGREEN®. Results are presented as percent inhibition of Mat1a relative to untreated control cells. As used herein, a value of '0' indicates that treatment with the modified oligonucleotide did not inhibit Mat1a mRNA levels.

As presented in the Table below, treatment with Ionis modified oligonucleotides resulted in significant reduction of Mat1a mRNA in comparison to the PBS control.

TABLE 11

Modified oligonucleotide mediated inhibition of mouse Mat1a in C57BL/6 mice

| ION Compound No. | % Inhibition |
|---|---|
| 1018060 | 93 |
| 1018054 | 70 |
| 1018050 | 73 |
| 1018095 | 60 |
| 1018044 | 66 |
| 1018039 | 52 |

Example 4: Modified Oligonucleotide-Mediated Inhibition of Mat1a RNA in a DIO Model Diet-induced obesity (DIO) in mice was generated by placing ten-week old C57BL/6J mice on a high fat diet (HFD) where 60% of calories were derived from fat (Bioserv), for 9 weeks. In addition, a separate group of mice were fed a control diet (CD) (Bioserv) for 9 weeks. The effect of ION No. 1018060 on RNA and protein levels was evaluated over a period of three weeks.

Treatment

A group of 6 mice fed with control diet were treated with ION No. 141923 (5-10-5 MOE gapmer, CCTTCCCTGAAGGTTCCTCC, designated herein as SEQ ID NO.: 411), a control modified oligonucleotide that does not target Mat1a, included in the experiment as a negative control. Two groups of 7 mice on the high fat diet were treated with either ION No. 141923 or ION No. 1018060 each. All mice were treated with modified oligonucleotide intraperitoneally at a dose of 25 mg/kg once a week for 4 weeks. Mice were sacrificed 48 hours after the last dose.

RNA and Protein Analysis

At the end of the treatment period, livers were extracted from the mice and tested for both protein and RNA knockdown of Mat1a.

Protein analysis was carried out using standard procedures. Mat1a levels were detected using rabbit anti-Mat1a polyclonal antibody NBP1-55120, NOVUS as the primary antibody and anti-rabbit IgG, HRP-linked antibody, 7074, Cell Signaling as the secondary antibody. Mat1a protein levels were compared to internal control, Transferrin. Transferrin levels were measured using goat anti-transferrin polyclonal antibody (I-20), sc-22597, Santa Cruz Biotechnology as the primary antibody, and anti-goat IgG, HRP-linked antibody, 31402, Thermo Fisher Scientific as the secondary antibody. As shown below, antisense inhibition of MAT1A significantly reduced MAT1A protein levels.

TABLE 12

Quantitative Analysis of Protein Levels

| ION Compound No. | Type of Diet | Average Relative Concentration |
|---|---|---|
| 141923 | CD | 0.92 |
| 141923 | HFD | 0.99 |
| 1018060 | HFD | 0.13 |

RNA levels were measured using SYBR green quantitative RTPCR. Mouse Mat1a levels were measured using a primer set comprised of forward sequence GCACTGCATCACTGATCTGG (designated herein as SEQ ID NO: 6); and reverse sequence TGGCTTGTGTGACCACTCTC (designated herein as SEQ ID NO: 7). Mat1a RNA levels were normalized to GAPDH and ACTIN for each sample.

TABLE 13

Quantitative Analysis of MAT1A mRNA Levels

| ION Compound No. | Type of Diet | % inhibition |
|---|---|---|
| 141923 | CD | 22 |
| 141923 | HFD | 0 |
| 1018060 | HFD | 98 |

Example 5: Modified Oligonucleotide-Mediated Effect in DIO Mice

Diet-induced obesity (DIO) in male mice was generated by placing ten-week old C57BL/6J mice on a high fat diet (HFD) where 60% of calories were derived from fat (Bioserv), for 9 weeks. In addition, a separate group of mice were fed a control diet (CD) (Bioserv) for 9 weeks.

Treatment

A group of 7 mice fed with control diet were treated with ION No. 141923 as a negative control. Two groups of 7 mice each on the high fat diet were treated with either ION No. 141923 or with ION No. 1018060. All mice were treated with modified oligonucleotide intraperitoneally at a dose of 25 mg/kg once a week for 4 weeks.

Body Weight Measurements

The effect of ION No. 1018060 on body weight was evaluated over a period of three weeks.

TABLE 14

Body Weights in DIO mice

| ION Compound No. (Diet) | Week No. | Average Body Weight (g) |
|---|---|---|
| 141923 (CD) | Week 1 | 27 |
| | Week 2 | 28 |
| | Week 3 | 29 |
| | Week 4 | 30 |
| | Week 5 | 30 |
| | Week 6 | 31 |
| | Week 7 | 31 |
| | Week 8 | 31 |
| | Week 9 | 31 |
| | Week 10 | 32 |
| 141923 (HFD) | Week 1 | 27 |
| | Week 2 | 31 |
| | Week 3 | 33 |
| | Week 4 | 36 |
| | Week 5 | 38 |
| | Week 6 | 41 |
| | Week 7 | 43 |
| | Week 8 | 44 |
| | Week 9 | 43 |
| | Week 10 | 45 |
| 1018060 (HFD) | Week 1 | 28 |
| | Week 2 | 33 |
| | Week 3 | 35 |
| | Week 4 | 38 |
| | Week 5 | 39 |
| | Week 6 | 41 |
| | Week 7 | 43 |
| | Week 8 | 42 |
| | Week 9 | 35 |
| | Week 10 | 32 |

Oral Glucose Tolerance Test

The glucose tolerance test was carried out 48 hours after the second dose of modified oligonucleotide. After fasting mice for four hours, they received an oral glucose challenge (2 g/kg glucose by oral gavage). Tail blood samples (5 µL approximately) were collected at 0, 15, 30, 60, and 120 minutes post-administration. Blood glucose levels were quantified by a glucometer.

TABLE 15

Oral glucose tolerance in DIO mice

| ION Compound No. (Diet) | Time (min) | Blood glucose (mg/dL) |
|---|---|---|
| 141923 (CD) | 0 | 47 |
| | 15 | 207 |
| | 30 | 248 |
| | 60 | 154 |
| | 120 | 87 |
| 141923 (HFD) | 0 | 86 |
| | 15 | 273 |
| | 30 | 367 |
| | 60 | 327 |
| | 120 | 189 |
| 1018060 (HFD) | 0 | 48 |
| | 15 | 206 |
| | 30 | 208 |
| | 60 | 121 |
| | 120 | 65 |

Insulin Tolerance Test

The insulin tolerance test was carried out 48 hours after the third dose of modified oligonucleotide. Mice received an intraperitoneal insulin (0.75 IU/kg) injection after a 4 hour starvation period. Tail blood samples (5 µL) were collected at 0, 15, 30, and 60 minutes post-administration. Blood glucose levels were quantified by a glucometer.

TABLE 16

Insulin glucose tolerance in DIO mice

| ION Compound No. (Diet) | Time (min) | Blood glucose (mg/dL) |
|---|---|---|
| 141923 (CD) | 0 | 125 |
| | 15 | 48 |
| | 30 | 28 |
| | 60 | 21 |
| | 120 | — |
| 141923 (HFD) | 0 | 224 |
| | 15 | 126 |
| | 30 | 63 |
| | 60 | 75 |
| | 120 | 124 |
| 1018060 (HFD) | 0 | 69 |
| | 15 | 35 |
| | 30 | 14 |
| | 60 | 9 |
| | 120 | — |

Example 6: Modified Oligonucleotide-Mediated Effect on Body Weight in Ob/Ob Mice Three-month old genetically obese C57BL/6J-Lep ob ("ob/ob") male mice were put on either control diet (CD) or a high fat diet (HFD) as described above for three weeks.
Treatment A group of 5 mice fed with control diet were treated with ION No. 141923 as a negative control. Two groups of 5 mice each on the high fat diet were treated with either ION No. 141923 or with ION No. 1018060. All mice were treated with modified oligonucleotide intraperitoneally at a dose of 25 mg/kg once a week for 4 weeks. The effect of ION No. 1018060 on body weight was evaluated over a period of three weeks.

TABLE 17

Body Weights in ob/ob mice

| ION Compound No. (Diet) | Week No. | Average Body Weight (g) |
|---|---|---|
| 141923 (CD) | Week 0 | 45 |
| | Week 1 | 47 |
| | Week 2 | 49 |
| | Week 3 | 51 |
| 141923 (HFD) | Week 0 | 44 |
| | Week 1 | 49 |
| | Week 2 | 53 |
| | Week 3 | 55 |
| 1018060 (HFD) | Week 0 | 44 |
| | Week 1 | 49 |
| | Week 2 | 50 |
| | Week 3 | 49 |

Example 7: Modified Oligonucleotide-Mediated Effect in Ob/Ob Mice

Three-month old genetically obese C57BL/6J-Lep ob ("ob/ob") male mice were put on either control diet (CD) or a high fat diet (HFD) as described above for three weeks.
Treatment A group of 5 mice fed with control diet were treated with ION No. 141923 as a negative control. Two groups of 5 mice each on the high fat diet were treated with either ION No. 141923 or with ION No. 1018060. All mice were treated with modified oligonucleotide intraperitoneally at a dose of 25 mg/kg once a week for 4 weeks. Glucose and insulin tolerance tests were carried out 48 hours after the second and third dose, respectively. The effect of ION No. 1018060 on glucose and insulin tolerance was evaluated.

Oral Glucose Tolerance Test

After fasting mice for four hours, they received an oral glucose challenge (2 g/kg glucose by oral gavage). Tail blood samples (5 µL) were collected at 0, 15, 30, 60, and 120 minutes post administration. Blood glucose levels were quantified by a glucometer.

TABLE 18

Oral glucose tolerance in ob/ob mice

| ION Compound No. (Diet) | Time (min) | Blood glucose (mg/dL) |
|---|---|---|
| 141923 (CD) | 0 | 127 |
|  | 15 | 385 |
|  | 30 | 351 |
|  | 60 | 220 |
|  | 120 | 151 |
| 141923 (HFD) | 0 | 163 |
|  | 15 | 410 |
|  | 30 | 430 |
|  | 60 | 335 |
|  | 120 | 247 |
| 1018060 (HFD) | 0 | 102 |
|  | 15 | 308 |
|  | 30 | 255 |
|  | 60 | 155 |
|  | 120 | 127 |

Insulin Tolerance Test

Mice received an intraperitoneal insulin (0.75 IU/kg) injection after a 4-hour starvation period. Tail blood samples (5 µL) were collected at 0, 15, 30, 60, and 120 minutes post-administration. Blood glucose levels were quantified by a glucometer.

TABLE 19

Insulin glucose tolerance in ob/ob mice

| ION Compound No. (Diet) | Time (min) | Blood glucose (mg/dL) |
|---|---|---|
| 141923 (CD) | 0 | 124 |
|  | 15 | 126 |
|  | 30 | 91 |
|  | 60 | 111 |
|  | 120 | 110 |
| 141923 (HFD) | 0 | 193 |
|  | 15 | 234 |
|  | 30 | 194 |
|  | 60 | 169 |
|  | 120 | 203 |
| 1018060 (HFD) | 0 | 116 |
|  | 15 | 73 |
|  | 30 | 57 |
|  | 60 | 57 |
|  | 120 | 89 |

Example 8: Modified Oligonucleotide-Mediated Effect on Lipid Storage in DIO Mice Diet-induced obesity (DIO) in male mice was generated by placing ten-week old C57BL/6J mice on a high fat diet (HFD) where 60% of calories were derived from fat (Bioserv), for 9 weeks.

Treatment

Two groups of 7 mice each on the high fat diet were treated with either ION No. 141923 or with ION No. 1018060. All mice were treated with modified oligonucleotide intraperitoneally at a dose of 25 mg/kg once a week for 4 weeks. Lipid storage evaluation was carried out 48 hours after the last dose. The effect of ION No. 1018060 on lipid storage in the liver was evaluated.

Lipid Storage Test

Liver weights were gathered for control and ION 1018060 treated groups. Sudan Red staining was carried out on livers. Briefly, 8 micron liver sections were incubated with freshly-prepared Sudan III stain (Sigma-Aldrich) and contrasted with Mayers hematoxylin. Stained area percentage of each sample was calculated using FRIDA software (software (FRamework for Image Dataset Analysis).

TABLE 20

Lipid storage in DIO mice

| ION Compound No. | Type of Diet | Liver Weight (g) | Sudan III staining area (%) |
|---|---|---|---|
| 141923 | HFD | 1.6 | 21.5 |
| 1018060 | HFD | 1.1 | 11.3 |

Example 9: Modified Oligonucleotide-Mediated Effect on Lipid Storage in Ob/Ob Mice Three-month old genetically obese C57BL/6J-Lep ob ("ob/ob") male mice were put on a high fat diet (HFD) as described above for three weeks.

Treatment

Two groups of 5 mice each on the high fat diet were treated with either ION No. 141923 or with ION No. 1018060. All mice were treated with modified oligonucleotide intraperitoneally at a dose of 25 mg/kg once a week for 4 weeks. Lipid storage evaluation was carried out 48 hours after the last dose. The effect of ION No. 1018060 on lipid storage in the liver was evaluated.

Lipid Storage Test

Liver weights were gathered for control and ION 1018060 treated groups. Triglycerides (TG) and total protein levels were quantitated. Briefly, after homogenization of liver tissue, lipids were extracted using the Folch method and triglycerides were quantitated using a commercially available kit ((A. Menarini Diagnostics, Italy). Protein concentration was measured using the commercially available Bicinchoninic Acid Reagent (Thermo Fisher Scientific Inc).

TABLE 21

Lipid storage in ob/ob mice

| ION Compound No. | Type of Diet | Liver Weight (g) | TG (nmol/mg of protein) |
|---|---|---|---|
| 141923 | HFD | 3.13 | 559 |
| 1018060 | HFD | 1.61 | 201 |

Example 10: Modified Oligonucleotide-Mediated Effect on Serum Chemistry Markers in DIO Mice Diet-induced obesity (DIO) in male mice was generated by placing ten-week old C57BL/6J mice on a high fat diet (HFD) where 60% of calories were derived from fat (Bioserv), for 9 weeks.

Treatment

Two groups of 6 mice each on the high fat diet were treated with either ION No. 141923 or with ION No. 1018060. All mice were treated with modified oligonucleotide intraperitoneally at a dose of 25 mg/kg once a week for 4 weeks. Evaluation of the effect of ION No. 1018060 on serum chemistry markers was evaluated 48 hours post final dose.

Serum Chemistry Markers

To evaluate the effect of modified oligonucleotides on liver function, plasma levels of alanine aminotransferase (ALT), serum triglyceride (TG) and glucose (GLU) were measured using a Hitachi 7180 analyzer (ROCHE). The results are presented in the Table below.

TABLE 22

Serum chemistry markers in DIO mice

| ION Compound No. | Type of Diet | ALT (IU/L) | TG (mg/dL) | GLU (mg/dL) |
|---|---|---|---|---|
| 141923 | HFD | 50 | 57 | 246 |
| 1018060 | HFD | 68 | 29 | 145 |

Example 11: Modified Oligonucleotide-Mediated Effect on Serum Chemistry Markers in Ob/Ob Mice Three-month old genetically obese C57BL/6J-Lep ob ("ob/ob") male mice were put on a high fat diet (HFD) as described above for three weeks.

Treatment

Two groups of 3-4 mice each on the high fat diet were treated with either ION No. 141923 or with ION No. 1018060. All mice were treated with modified oligonucleotide intraperitoneally at a dose of 25 mg/kg once a week for 4 weeks. Evaluation of the effect of ION No. 1018060 on serum chemistry markers was evaluated 48 hours post-final dose.

Serum Chemistry Markers

To evaluate the effect of modified oligonucleotides on liver function, plasma levels of alanine aminotransferase (ALT), serum triglyceride (TG) and glucose (GLU) were measured using a Hitachi 7180 analyzer (ROCHE). The results are presented in the Table below.

TABLE 23

Serum chemistry markers in ob/ob mice

| ION Compound No. | Type of Diet | ALT (IU/L) | TG (mg/dL) | GLU (mg/dL) |
|---|---|---|---|---|
| 141923 | HFD | 205 | 65 | 284 |
| 1018060 | HFD | 191 | 60 | 145 |

Example 12: Modified Oligonucleotide-Mediated Effect on Oxygen Consumption and Energy Expenditure in DIO Mice Diet-induced obesity (DIO) in male mice was generated by placing ten-week old C57BL/6J mice on a high fat diet (HFD) where 60% of calories were derived from fat (Bioserv), for 9 weeks.

Treatment

Two groups of 6 mice each on the high fat diet were treated with either ION No. 141923 or with ION No. 1018060. All mice were treated with modified oligonucleotide intraperitoneally, six weeks post-start of diet, at a dose of 25 mg/kg once a week for 4 weeks. Evaluation of the effect of ION No. 1018060 on oxygen consumption and energy expenditure was evaluated 48 hours post-final dose.

Energy Expenditure and Oxygen Consumption Measurement

Mice were stabled in metabolic cages for three days, where energy expenditure and oxygen consumption were measured. The results are presented in the Table below. Food intake was evaluated from the first dose of ASO till the end of the experiment (three weeks).

TABLE 24

Energy Expenditure and Oxygen Consumption in DIO mice

| ION Compound No. | Type of Diet | Energy Expenditure (kcal/kg/hr) | Resting VO$_2$ (mL/kg/hr) | Locomotor Activity (bream breaks) |
|---|---|---|---|---|
| 141923 | HFD | 18 | 10770 | 539 |
| 1018060 | HFD | 28 | 12978 | 602 |

TABLE 25

Food intake levels in DIO mice

| ION Compound No. | Food intake (g HFD/mouse/week) | |
|---|---|---|
| 141923 | week 1 | 17 |
|  | week 2 | 29 |
|  | week 3 | 45 |
| 1018060 | week 1 | 16 |
|  | week 2 | 30 |
|  | week 3 | 44 |

Example 13: Modified Oligonucleotide-Mediated Effect on Lipolysis and Lipid Oxidation Rate of Adipose Tissue in DIO Mice Diet-induced obesity (DIO) in male mice was generated by placing ten-week old C57BL/6J mice on a high fat diet (HFD) where 60% of calories were derived from fat (Bioserv), for 9 weeks.

Treatment

Two groups of 7 mice each on the high fat diet were treated with either ION No. 141923 or with ION No. 1018060. All mice were treated with modified oligonucleotide intraperitoneally, six weeks post-start of diet, at a dose of 25 mg/kg once a week for 4 weeks. Evaluation of the effect of ION No. 1018060 on lipolysis and lipid oxidation rate in adipose tissue was done 48 hours post final dose.

Measurement of Lipolysis of Adipose Tissue

To evaluate the effect of modified oligonucleotides on lipolysis of adipose tissue, fresh adipose tissue sections from treated mice were incubated in basal media or isoproterenol bitartrate (lipolysis stimulator) rich medium for 4 hours. Then, the secreted fatty acid and glycerol levels were measured in the incubation media using commercially available kits (Wako Chemicals for fatty acids and Sigma Aldrich for glycerol). The results are presented in the Table below.

TABLE 26

Lipolysis of adipose tissue in DIO mice

| ION Compound No. | +/−Iso- proterenol Bitatrate | Fatty Acid (eWAT) | Glycerol (eWAT) | Fatty Acid (BAT) | Glycerol (BAT) |
|---|---|---|---|---|---|
| 141923 | basal | 4450 | 1648 | 7543 | 3799 |
|  | stimulated | 7952 | 3379 | 10217 | 5275 |
| 1018060 | basal | 5683 | 1821 | 8112 | 11011 |
|  | stimulated | 11839 | 6423 | 12836 | 13194 |

Measurement of Lipid Oxidation Rate in Adipose Tissue

To evaluate the effect of modified oligonucleotides on adipose tissue oxidation rate, fresh adipose tissue samples from treated mice were homogenized and centrifuged at 500×g. The supernatant was then incubated with $^{14}C$-palmitate for 30 minutes. The radioactive Soluble Acid Metabolites (ASM) and $CO_2$ generated were detected using a scintillation counter (Tri-Carb 2810 TR, PerkinElmer). The results are presented in the Table below.

TABLE 27

Lipid Oxidation Rate in DIO mice

| ION Compound No. | Type of Diet | eWAT Oxidation Rate (ASM) (nmol/g tissue/hr) | eWAT Oxidation Rate (CO2) (nmol/g tissue/hr) | BAT Oxidation Rate (ASM) (nmol/g tissue/hr) | BAT Oxidation Rate (CO2) (nmol/g tissue/hr) |
|---|---|---|---|---|---|
| 141923 | CD | 346 | 3.6 | 5704 | 488 |
| 141923 | HFD | 156 | 3.4 | 2668 | 101 |
| 1018060 | HFD | 340 | 3.1 | 9698 | 851 |

Example 15: Modified Oligonucleotide-Mediated Effect on FGF-21 Levels in DIO Mice Diet-induced obesity (DIO) in male mice was generated by placing ten-week old C57BL/6J mice on a high fat diet (HFD) where 60% of calories were derived from fat (Bioserv), for 9 weeks.

Treatment

Two groups of 7 mice each on the high fat diet were treated with either ION No. 141923 or with ION No. 1018060. All mice were treated with modified oligonucleotide intraperitoneally, six weeks post-start of diet, at a dose of 25 mg/kg once a week for 4 weeks. Evaluation of the effect of ION No. 1018060 on FGF-21 levels was evaluated 48 hours post-final dose.

Measurement of FGF-21 levels

To evaluate the effect of modified oligonucleotides on liver function, FGF-21 levels were measured in liver homogenates using an R&D Systems Quantikine ELISA kit (MF2100). The results are presented in the Table below.

TABLE 27

FGF-21 levels in DIO mice

| ION Compound No. | FGF-21 level (ng/mL) |
|---|---|
| 141923 | 0.8 |
| 1018060 | 6.5 |

Example 16: Modified Oligonucleotide-Mediated Effect on FGF-21 Levels in Ob/Ob Mice Three-month old genetically obese C57BL/6J-Lep ob ("ob/ob") male mice were put on a high fat diet (HFD) as described above for three weeks.

Treatment

Two groups of 3-4 mice each on the high fat diet were treated with either ION No. 141923 or with ION No. 1018060. All mice were treated with modified oligonucleotide intraperitoneally at a dose of 25 mg/kg once a week for 4 weeks. Evaluation of the effect of ION No. 1018060 on FGF-21 levels was evaluated 48 hours post final dose Measurement of FGF-21 Levels To evaluate the effect of modified oligonucleotides on liver function, FGF-21 levels were measured in liver homogenates using an R&D Systems Quantikine ELISA kit (MF2100). The results are presented in the Table below.

TABLE 28

FGF-21 levels in ob/ob mice

| ION Compound No. | FGF-21 level (ng/mL) |
|---|---|
| 141923 | 3.6 |
| 1018060 | 12.3 |

Example 16: Modified Oligonucleotide Mediated Effect on Lipid Oxidation Rate in Liver Tissue in DIO Mice Diet-induced obesity (DIO) in male mice was generated by placing ten-week old C57BL/6J mice on a high fat diet (HFD) where 60% of calories were derived from fat (Bioserv) for 9 weeks.

Treatment

Two groups of 7 mice each on the high fat diet were treated with either ION No. 141923 or with ION No. 1018060. All mice were treated with modified oligonucleotide intraperitoneally, six weeks post start of diet, at a dose of 25 mg/kg once a week for 4 weeks. Evaluation of the effect of ION No. 1018060 on lipid oxidation rate in liver tissue was evaluated 48 hours post final dose.

Measurement of Lipid Oxidation Rate in Liver Tissue

To evaluate the effect of modified oligonucleotides on liver lipid oxidation rate, fresh liver samples were homogenized and centrifugated at 500×g. The supernatant was then incubated with $^{14}C$-palmitate for 30 minutes. The radioactive Soluble Acid Metabolites (ASM) and $CO_2$ generated were detected with a scintillation counter (Tri-Carb 2810 TR, PerkinElmer). The results are presented in the Table below.

TABLE 30

Lipid Oxidation Rate in DIO mice

| ION Compound No. | Type of Diet | Liver Oxidation Rate (ASM) (nmol/g tissue/hr) | Liver Oxidation Rate (CO2) (nmol/g tissue/hr) |
|---|---|---|---|
| 141923 | CD | 2001 | 86 |
| 141923 | HFD | 2791 | 91 |
| 1018060 | HFD | 3587 | 76 |

Example 17: Modified Oligonucleotide-Mediated Effect on Liver TG Secretion Rate in DIO Mice Diet induced obesity (DIO) in male mice was generated by placing ten-week old C57BL/6J mice on a high fat diet (HFD) where 60% of the calories were derived from fat (Bioserv), for 9 weeks.

Treatment

Two groups of 7 mice each on the high fat diet were treated with either ION No. 141923 or with ION No. 1018060. All mice were treated with modified oligonucleotide intraperitoneally, six weeks post start of diet, at a dose of 25 mg/kg once a week for 4 weeks. Evaluation of the effect of ION No. 1018060 on the rate of liver triglyceride (TG) secretion was evaluated 48 hours post final dose.

Measurement of Liver TG Secretion Rate

To evaluate the effect of modified oligonucleotides on liver TG secretion rate, plasma levels of serum triglyceride (TG) were measured using a commercially available kit (A. Menarini Diagnostics, Italy) after 0, 2 and 4 hours of poloxamer P407 intraperitoneal injection in DIO mice. P407 is an inhibitor of triglyceride rich lipoprotein clearance in blood. The results are presented in the Table below show that the Liver TG secretion rate was not altered when treating the animals with ION No. 1018060.

TABLE 31

TG secretion rate in DIO mice

| ION Compound No. | Type of Diet | Time of Poloxamer P407 (hours) | TG levels (mg/dl) |
|---|---|---|---|
| 141923 | HFD | 0 | 107. |
|  |  | 2 | 527 |
|  |  | 4 | 1463 |
| 1018060 | HFD | 0 | 69 |
|  |  | 2 | 499 |
|  |  | 4 | 1243 |

Example 18: Modified Oligonucleotide-Mediated Effect on Serum KB (Ketone Bodies) Levels in DIO Mice MAT1A knockdown does not change serum ketone bodies levels. 2-month-old C57BL/6j mice were fed a high fat diet (HFD) during 10 weeks. Last 4 weeks mice were treated with a gene silencing antisenseoligonucleotide (ASO) for MAT1A (25 mg/kg) (n=5-7), ION Compound No. 1018060, or control ASO (25 mg/kg) (n=5-7), ION Compound No. 141923, once a week until sacrificed. Serum KB levels are represented as the media±standard deviation (FIG. 1).

Figure 2:
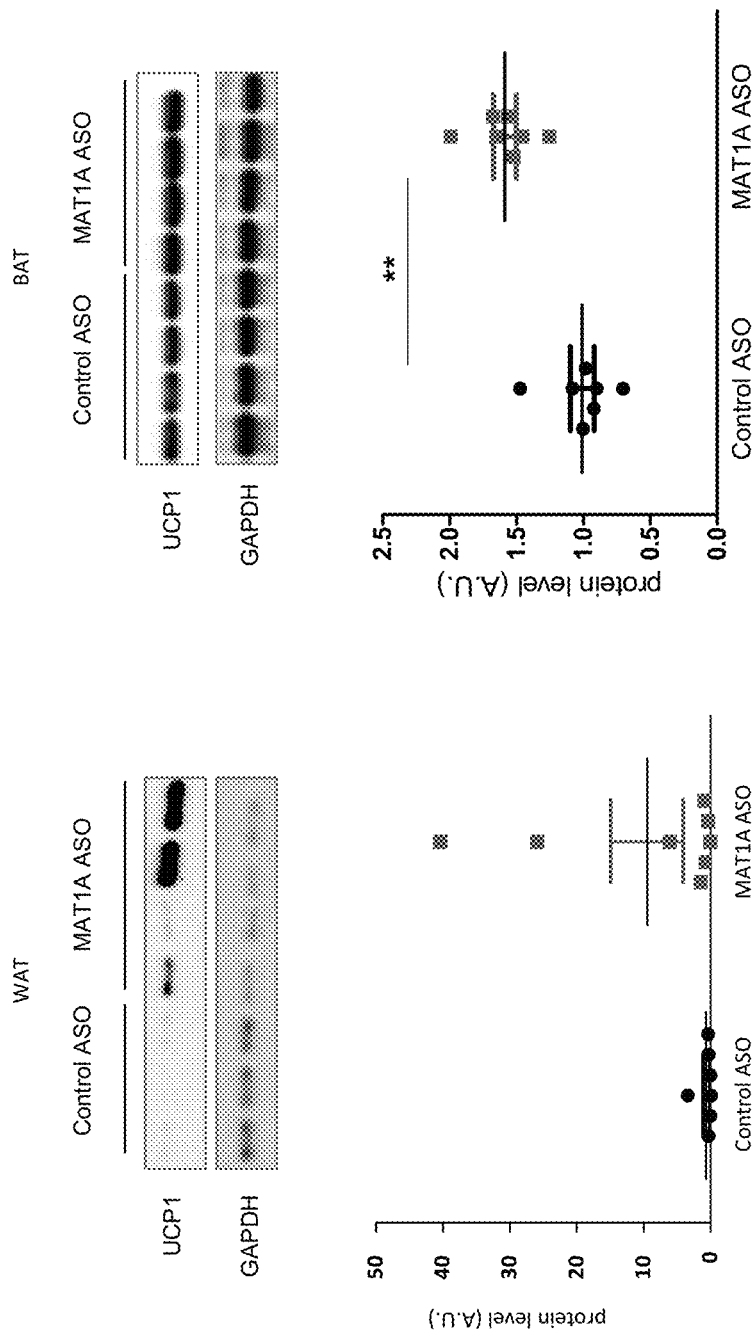
FIG. 2: MAT1A knockdown induces brown adipose tissue (BAT) thermogenesis. 2-month-old C57BL/6j mice were fed a high fat diet (HFD) during 10 weeks. Last 4 weeks mice were treated with a gene silencing antisense oligonucleotide (ASO) for MAT1A (25 mg/kg) (n=7-8), ION Compound No. 1018060, or control ASO (25 mg/kg) (n=7), ION Compound No. 141923, once a week until sacrificed. White adipose tissue (WAT; left) and brown adipose tissue (BAT; right) protein levels for uncoupling protein 1 (UCP1) were determined by Western blot analysis. UCP1 levels are given in arbitrary units (A.U.) after their normalization with glyceraldehyde-3-phosphate dehydrogenase (GAPDH) expression and represented as the media±standard deviation. Statistically significant differences between Control ASO and MAT1a ASO are indicated by **$p<0.01$ (Student's test).

Example 19: Modified Oligonucleotide-Mediated Effect on UCP1 Protein Levels in Adipose Tissue in DIO Mice MAT1A knockdown induces brown adipose tissue (BAT) thermogenesis. 2-month-old C57BL/6j mice were fed a high fat diet (HFD) during 10 weeks. Last 4 weeks mice were treated with a gene silencing antisense oligonucleotide (ASO) for MAT1A (25 mg/kg) (n=7-8), ION Compound No. 1018060, or control ASO (25 mg/kg) (n=7), ION Compound No. 141923, once a week until sacrificed. White adipose tissue (WAT; left) and brown adipose tissue (BAT; right) protein levels for uncoupling protein 1 (UCP1) were determined by Western blot analysis. UCP1 levels are given in arbitrary units (A.U.) after their normalization with glyceraldehyde-3-phosphate dehydrogenase (GAPDH) expression and represented as the media±standard deviation. Statistically significant differences between Control ASO and MAT1a ASO are indicated by **$p<0.01$ (Student's test) (FIG. 2).

Figure 3:
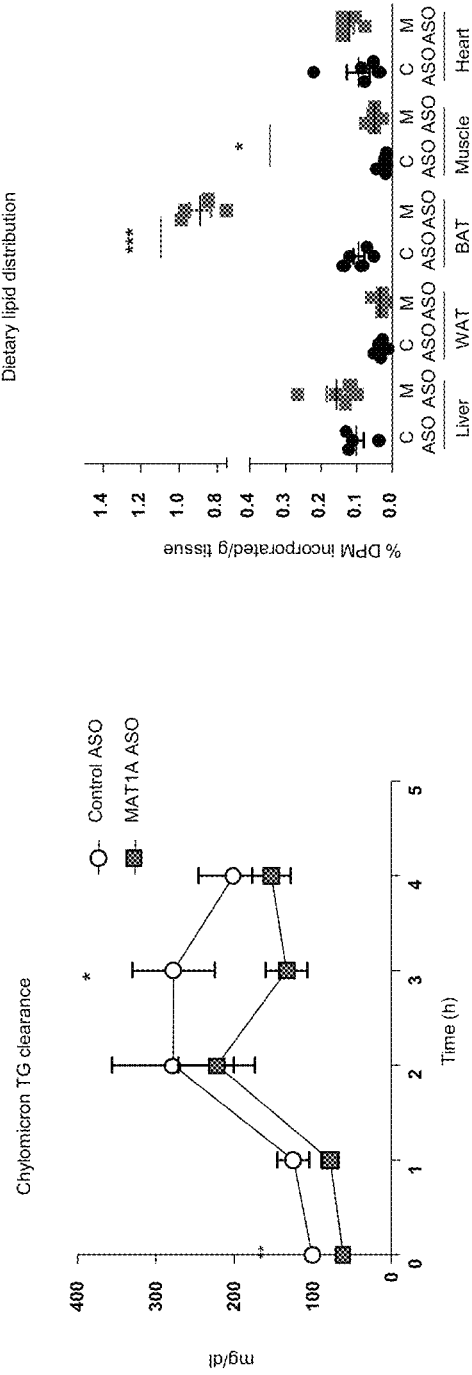
FIG. 3: MAT1A knockdown induces brown adipose tissue (BAT) driven chylomicron-associated triglyceride (TG) serum clearance. 2-month-old C57BL/6j mice were fed a high fat diet (HFD) during 10 weeks. Last 4 weeks mice were treated with a gene silencing antisense oligonucleotide (ASO) for MAT1A (25 mg/kg) (n=5-7), ION Compound No. 1018060, or control ASO (25 mg/kg) (n=5-7), ION Compound No. 141923, once a week until sacrificed. In the left panel serum TG levels during oral lipid tolerance test in overnight fasted mice. In the right panel distribution of [3H]-labeled triolein among most representative metabolic active tissues. Data are represented as the media±standard deviation. Statistically significant differences between Control ASO and MAT1a ASO are indicated by *$p<0.05$ and ***$p<0.001$ (Student's test).

Example 20: Modified Oligonucleotide-Mediated Effect on Dietary Lipid Disposal MAT1A knockdown induces brown adipose tissue (BAT) driven chylomicron-associated triglyceride (TG) serum clearance. 2-month-old C57BL/6j mice were fed a high fat diet (HFD) during 10 weeks. Last 4 weeks mice were treated with a gene silencing antisense oligonucleotide (ASO) for MAT1A (25 mg/kg) (n=5-7), ION Compound No. 1018060, or control ASO (25 mg/kg) (n=5-7), ION Compound No. 141923, once a week until sacrificed. In the left panel serum TG levels during oral lipid tolerance test in overnight fasted mice. In the right panel distribution of [3H]-labeled triolein among most representative metabolic active tissues. Data are represented as the media±standard deviation. Statistically significant differences between Control ASO and MAT1a ASO are indicated by *$p<0.05$ and ***$p<0.001$ (Student's test) (FIG. 3).

Figure 4:
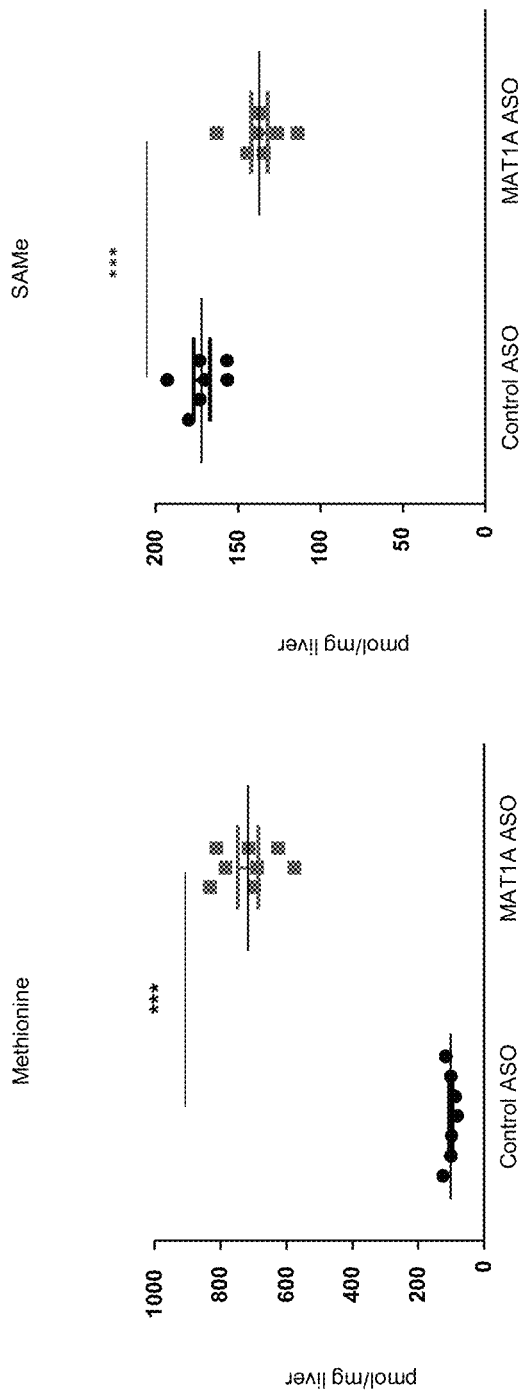
FIG. 4: MAT1A knockdown increases methionine and decreases SAMe levels in liver. 2-month-old C57BL/6j mice were fed a high fat diet (HFD) during 10 weeks. Last 4 weeks ice were treated with a gene silencing antisenseoligonucleotide (ASO) for MAT1A (25 mg/kg) (n=3), ION Compound No. 1018060, or control ASO (25 mg/kg) (n=3), ION Compound No. 141923, once a week until sacrificed. Liver methionine (left) and SAMe (right) levels are represented in pmol/mg of tissue. Data are represented as the media±standard deviation. Statistically significant differences between Control ASO and MAT1a ASO are indicated by ***$p<0.001$ (Student's test).

Example 21: Modified Oligonucleotide-Mediated Effect on Liver Methionine and S-Adenosylme-Thionine (SAMe) Levels MAT1A knockdown increases methionine and decreases SAMe levels in liver. 2-month-old C57BL/6j mice were fed a high fat diet (HFD) during 10 weeks. Last 4 weeks ice were treated with a gene silencing antisenseoligonucleotide (ASO) for MAT1A (25 mg/kg) (n=3), ION Compound No. 1018060, or control ASO (25 mg/kg) (n=3), ION Compound No. 141923, once a week until sacrificed. Liver methionine (left) and SAMe (right) levels are represented in pmol/mg of tissue. Data are represented as the media±standard deviation. Statistically significant differences between Control ASO and MAT1a ASO are indicated by ***$p<0.001$ (Student's test) (FIG. 4).

Figure 5:
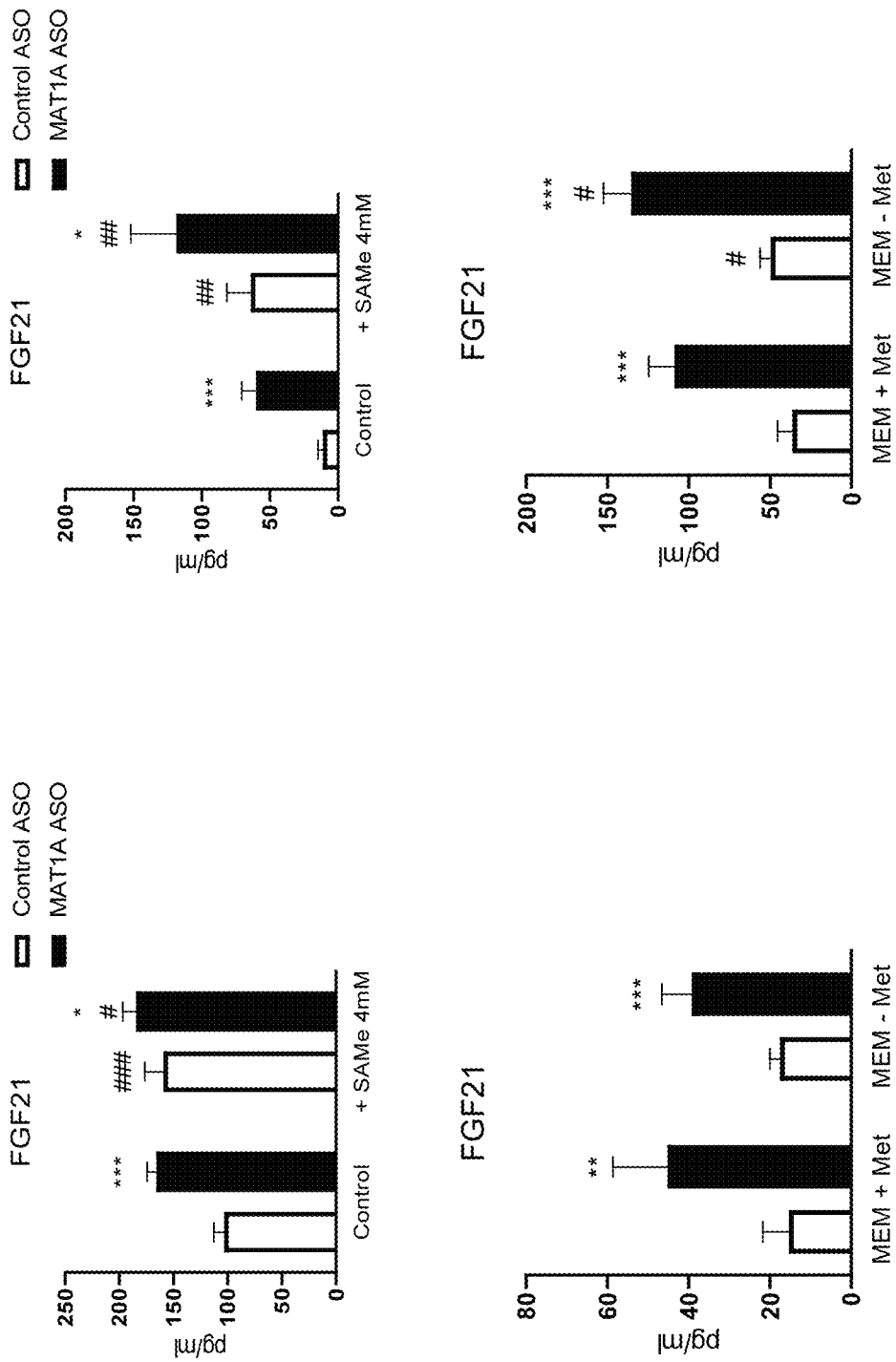
FIG. 5: Changes in SAMe or methionine levels in hepatocytes do not modulate FGF21 secretion in MAT1A-knockdown mice. 3-month-old C57BL/6j mice were fed a high fat diet (HFD) and treated with a gene silencing antisenseoligonucleotide (ASO) for MAT1A (25 mg/kg) (n=3), ION Compound No. 1018060, or control ASO (25 mg/kg) (n=3), ION Compound No. 141923, once a week during 4 weeks. Then hepatocytes were maintained in primary culture and treated with or without SAMe (up) and methionine (down) during 4 (left) or 24 (right) hours. FGF21 levels in media are represented in pg/ml as the media±standard deviation (n=5).

Example 22: Modulation of SAMe or Methionine Levels in Isolated Hepatocytes from Modified-Oligonucleotide Treated Mice Changes in SAMe or methionine levels in hepatocytes do not modulate FGF21 secretion in MAT1A-knockdown mice. 3-month-old C57BL/6j mice were fed a high fat diet (HFD) and treated with a gene silencing antisenseoligonucleotide (ASO) for MAT1A (25 mg/kg) (n=3), ION Compound No. 1018060, or control ASO (25 mg/kg) (n=3), ION Compound No. 141923, once a week during 4 weeks. Then hepatocytes were maintained in primary culture and treated with or without SAMe (up) and methionine (down) during 4 (left) or 24 (right) hours. FGF21 levels in media are represented in pg/ml as the media±standard deviation (n=5). Statistically significant differences between Control ASO and MAT1a ASO are indicated by *$p<0.05$, $p<0.01$ and *$p<0.001$; and between control and treatment by #$p<0.05$, ##$p<0.01$ and ###$p<0.001$ (Student's test) (FIG. 5).

---

The invention claimed is:

1. A method of treating or ameliorating a metabolic disease or disorder in an individual having a metabolic disease or disorder comprising administering a MAT1a specific inhibitor to the individual, thereby treating or ameliorating the metabolic disease or disorder in the individual, wherein the metabolic disease or disorder is obesity, diabetes, insulin resistance, or dyslipidemia, and wherein the MAT1a specific inhibitor is a nucleic acid comprising a modified oligonucleotide targeting MAT1a comprising:
 a gap segment consisting of linked deoxynucleosides;
 a 5' wing segment consisting of linked nucleosides;
 a 3' wing segment consisting of linked nucleosides;
wherein the gap segment is positioned immediately adjacent to and between the 5' wing segment and the 3' wing segment and wherein each nucleoside of each wing segment comprises a modified sugar; and wherein the modified oligonucleotide is selected from the group consisting of SEQ ID NO: 17, SEQ ID NO: 18, SEQ ID NO: 83, SEQ ID NO: 84, SEQ ID NO: 159 and SEQ ID NO: 216.

2. The method of claim 1, wherein the treating or ameliorating of the metabolic disease or disorder includes at least one of a lowering of MAT1a specific inhibitor reduces or improves adiposity, an increase in adiponectin levels, an increase in insulin sensitivity, a reduction of body weight, a reduction of serum triglyceride levels, or improvement in fatty liver.

3. The method of claim 1, wherein the modified oligonucleotide comprises at least one modification selected from at least one modified internucleoside linkage and at least one modified nucleobase.

4. The method of claim 3, wherein the at least one modified internucleoside linkage is a phosphorothioate internucleoside linkage and the at least one modified nucleobase is a 5-methylcytosine.

5. The method of claim 1, wherein at least one modified sugar comprises a 4'-CH(CH$_3$)-O-2' bridge or a 4'-(CH$_2$)$_n$—O-2' bridge, wherein n is 1 or 2.

6. The method of claim 1, wherein the MAT1a specific inhibitor is administered parenterally by subcutaneous or intravenous administration.

7. The method of claim 1, comprising co-administering the MAT1a specific inhibitor and at least one additional therapy.

8. The method of claim 7, wherein the MAT1a specific inhibitor and the additional therapy are administered concomitantly.

9. The method of claim 7, wherein the MAT1a specific inhibitor and the additional therapy are administered consecutively.

10. The method of claim 1, wherein the at least one modified sugar is a bicyclic sugar or 2'-O-methoxyethyl.

11. A method of inhibiting expression or activity of MAT1a in a cell comprising contacting the cell with a MAT1a specific inhibitor, thereby inhibiting expression or activity of MAT1a in the cell, wherein the cell is a hepatocyte from an individual having obesity, diabetes, insulin resistance, or dyslipidemia, and wherein the MAT1a specific inhibitor is a nucleic acid comprising a modified oligonucleotide targeting MAT1a comprising a gap segment consisting of linked deoxynucleosides;

a 5' wing segment consisting of linked nucleosides;

a 3' wing segment consisting of linked nucleosides;

wherein the gap segment is positioned immediately adjacent to and between the 5' wing segment and the 3' wing segment and wherein each nucleoside of each wing segment comprises a modified sugar; and wherein the modified oligonucleotide is selected from the group consisting of SEQ ID NO: 17, SEQ ID NO: 18, SEQ ID NO: 83, SEQ ID NO: 84, SEQ ID NO: 159 and SEQ ID NO: 216.

* * * * *

SEQUENCE LISTING

<160> NUMBER OF SEQ ID NOS: 411

<210> SEQ ID NO 1
<211> LENGTH: 3486
<212> TYPE: DNA
<213> ORGANISM: Mus musculus

<400> SEQUENCE: 1

```
agcccatacc aaatctctgg gagactttct ggctgcccat gagtaactcc aggcccccag      60
gtctccagag tgggatggta tcccgggaac cactcagaga ttagctaagg agctgaagga     120
agtccgaaag gcacttccgg tccgagaggc taaacagcct tcctaatctc acttagacca     180
cagacttgcc acttgagaca tcagagctga aggctgaaat tcctcaagga gtcacctggg     240
agcaagctgc gaccagcctg gagtgacaca tctgtattcc atccgctatc tccctctttg     300
cccatcctta ccctgtcctc atatgctcat aggcacttag gcagaagtca tctcctcggg     360
attctgccaa agatctgcct gttgggtttg taggggagg ataagaaaag aaagaaaaga     420
aaaagctctg aagttgtcac tttggagaag tgaagtcgaa aagtgtggca caatgaatgg     480
acctgtggat ggcttgtgtg accattctct aagtgaagag ggagccttca tgttcacatc     540
agaatctgta ggagaggggc atccagataa gatctgtgac cagattagtg atgcggtgct     600
ggatgctcac ctcaagcaag accccaatgc caaggtggcc tgtgagacag tgtgcaagac     660
aggtatggtg ctactgtgtg gggagatcac ctcagtggcc atggttgatt accagcgggt     720
ggtgagagac accatcaagc acattggcta tgacgactct gccaagggct ttgacttcaa     780
gacttgcaat gtgctagtgg ctctggagca acagtcccca gatattgccc aatgtgtcca     840
cctagacaga aatgaagagg atgttggtgc aggagatcag ggtctgatgt ttggctatgc     900
tactgatgag accgaggaat gcatgcccct taccatcgtg ctcgctcaca aactcaacac     960
ccggatagca gatctgaggc gctctggtgt ccttccctgg ctgagacctg attctaagac    1020
tcaggtaaca gttcagtaca tgcaggataa tggtgcagtc atccctgtgc gcatccacac    1080
catcgtcatc tctgtgcaac acaatgaaga catcacactg gaggccatgc aagaggccct    1140
gaaagagcag gtgatcaaag ctgtggtgcc agccaagtac ctggatgaag atactgttta    1200
ccacctgcag ccaagtgggc ggtttgttat tggaggcccc cagggggatg caggtgtcac    1260
gggccgcaag attattgtgg acacatacgg aggctggggg gcccatggtg gtggtgcctt    1320
ctctggaaag gactacacca aggtgaccg ctcagcagct tatgctgccc gctgggtggc    1380
```

```
caagtccctg gtaaaggctg ggctctgccg gagagtgctt gttcaggtgt cctatgccat    1440
tggtgtggca gaacctctgt ccatttccat cttcacctac gggacctcca ataagactga    1500
gcgggagctg ctagaggtgg tgaacaagaa ctttgacctt cggcctggtg ttattgtcag    1560
ggacttggat ctgaaaaaac ccatctacca gaagactgcg tgctacgcc atttcgggag     1620 aagcgagttt ccctgggagg tccccaagaa gcttgtgttt tagagccgct ggaaagttta    1680
gctctgtccc atactcacct cttcaggatc tcaactccct ggtctcctag cctctcccag    1740
agtgccctcc ttgccttcta ccctcagggc aaagccagct tcttctaatt ttcccctatc    1800
cagcaatctg caaacatctt atgaatgaca tgacaggtgg cttctggtg ctaggttatc     1860 atgtctcctt ttgagggtag tcactgttcc ctgcctgtcc ctcagatgac agcaatgcta    1920
attttgtgta aaagttactc ctgtttgaca ggaagtcctt ccctcacttc ctcccatagt    1980
ctgaacctta ccaggccatc tcttcctcca ttctagatat gtacccagat gaatatattg    2040
cacagacctc tggcttcccc tttacatctg cagccagaga ttccgagcca ttgctatcta    2100
agggtccctc tgagactagg catctgctac ataaaatatg gtcaatgtct cctgagcatt    2160
tgcatcgtgt gagggactga gctgtgtgtt cttcatctca gcacaataag gtgttgtctt    2220
tattattatc cacagtaact gatggaaaac tgaggctcag agagtctatg aagctctgac    2280
aagtttccat agccacatgt atcagagcca agaaatggat ctaggagttc tgactctaac    2340 cctcacatttt gtatcccaga caagatgttg accagagtga tgacaagtgg atcgacttga    2400
ggctatggct acttatttaa ggcctgggtc tcctgagaat taggagatga acctagtggc    2460
tctttgtgag ccctggacag cgttccacaa aatcaaaatg gagacatata agtgtctcat    2520
ttgttctgga agagggttta aggaaatctg ggtatcttgg cctatcaagc tgggctggag    2580
tctcgaacta agaggaagtt tcatggtcct ggcccccaac actgaaagat aggtgtgtga    2640
gttctctggg catgggttct aatcatagac agccacatgt gcttccctcc tcacagagga    2700
gaggcagctg gttgttatag cacagacaac cggcctctga aggggaccc tgcaccttt     2760 gaggctttct cctttcctgg acgctcatgc ttatgcaggc taagtgttcc aggtagaggg    2820
acagcctcca agcaatcgac aagttgccaa gatctcatga gaactggctt ttaccaggta    2880
gcctttgaaa gacatgtctg tccagcaggg ttctgggaac cacatgtttc taagtgtccc    2940
atcataatca gtaccacatt cccaacctgt ccctagttgg gcccttctca cagcatactg    3000
ccttcatagc tcccaagaac atgggttcag gaggggacct ggctcagaga aggttctggc    3060
taggagaagg gctgggcagc ttcatcaaga agcagatacc ttgcatctgt gccttgactg    3120
ggcagagatc ccagctttcc cctttccccc agcgtgagga aacagcagag ggaaaagcct    3180
cattggccaa cagatcctga tgctgtgtgt gacttagaag cttgagtctt tccatagggt    3240
tcggagctgc ctgggagcca agttcctcac agcagaagga aggatgggcg tgcgaaggtt    3300
gagttcctgt aacttaagct ttatcaaaat aaaaatccag aatggtatac ttgctctaac    3360
cctgagagta atgagcctct tctttccttt tcaacatttc ctaggaaaga aagccattat    3420
ttgttaatgt tacctgatga tagtatggtg aataaaatct caaggagcaa caacactgta    3480
cttgca                                                              3486
```

<210> SEQ ID NO 2
<211> LENGTH: 25000
<212> TYPE: DNA
<213> ORGANISM: Mus musculus

```
<400> SEQUENCE: 2
aaatagtttt tactgctcct cttgagttca ctgtcatcta tctatttaa catcacctt       60 agttctaaaa tgtactaacc tgagtatctt tttcctttat tttttggct gtttgtctta     120 tttaacttta caaagaatta gctattccat ctaccatgcc tatttatatt atttgcttta    180
tctcaatttc attaatttcc ttcttgatct ttattattta tttacatgtc taaatttcaa    240
ctttggcttg ttttctaaga ccctgcggta catcattagg ggatttattt gagagcagcc    300
ttatcttatt atataaagta ctcataaact tcttttgag aactgtaaac aaaaagtttc     360
ttcacagact cagcagtcaa ttggttttc cgagcagaag ttgctacatg gaaatgaggt     420
caaatatgag cctttgctat gttgaactta ggttatcagt agtattagga agggacatga    480
ggacagttca tgcgtcaggg agcccaggac agcctgtgca caagaaatat tcaatttaca    540
tttagttggc aatttagagc tatgatgtct tcatgggttt gactcttaga atcattatac    600
ctctgccaag gtctgttaga aaagactga agctactatt ttacatcttg tgaagatggg     660
tgttttacat aaccaataac atttattatg gatgctaaac ctttacctgc ttcagcactg    720
ctaaatcctg cctttgtttt tttggaaaca tcatttgct atgaatccaa aactggcctt     780
taaccccaaa tcctcttgcc tcagcctcc aaatgtttca gttacaggt gaaaacagcc      840 aatctatttc cattttatat ttcaccaaaa catgcttatg acaagtatat ttgtgacatt    900
aaaataaatg gaaaagtaaa atattcaag caccagggaa tgagcagctg aataatatac     960
agtacatttc ttctgtggga tactgtttag gtgctaaaag aaatatctat ctgtatgtca   1020
aatatgaaaa gtgagctaca tatagatatg ggaaaggagc aaactgcaaa tatgtgtatg   1080
tgaataaaca tatgcacata taccatgctc tattttgtt cagaagaata gcatgcatac    1140
atgcatagct tgtttaatta tatttgctaa tgttcataac ttcgtattgc tttctagaag   1200
tatgttaaag actcattatg cctaaatagt ctaatctcat ttttacagta attctataag   1260
gcaggtaata attttcctg ttgctgagct atgcaggttt gctctgggct gtgtagtagt    1320
ttagagaaac aactgaggct tcagccctga agcctgaact gctacctgca atagtctgtg   1380
atttcttatc atttatttta agaaaaaaac aggaggtatc cttgtatata gaagccatat   1440
tgtccagagc tcaggcagga gctagactga atcagttgcc ttcaggattt ttccctcact   1500
ttgaattgat ggcaccaatt tctgaaagcc ctatttctgt ataaagaaca tctaacaggt   1560
accctctgcc ccatgatgtt attactcatt ttgaaattca aaagagaggt gccttgtttt   1620
ctgtctcctt gctggatcta agaaccttaa agaattatta ataattagac tttaagttgc   1680
tcttgaagca tatttataat gttgctacag ttctactagc tagggtaacc taggcctatg   1740
cttcaaatta cacattagtt tgtattgtct ctaggtttga aactaatgta cccaaaagta   1800
atttacaaag agacaatgat gttgaaatat tttcagcaca aacactgagg catataaagt   1860
ttgcaagacc aaggggcctc tcttcccaat gatggctgac taggccatct tctgcagcta   1920
gagacacaag ctccgggggg tggggtaggg tactggttag ttcatattgt tgttctactt   1980
attgggttgc agacccctt agctccttgg ttactttctc tagctcctcc attggggcc     2040 ctgtgttcca tccaatagct cactgtgagc ccagtgtccc tttcgatccc atgttttagc   2100
agtcatgtac ctaagcaagt tagctcactt cttgttaagt gctttgatag ctgtgcagtt   2160
acaagcagcc tcgtagcatc ccatatcgat ttattgtagt tttaatttcc tagagtgact   2220
gttttgatta actaacctca aggtttggag cactagaatt tgtgccagaa aaaacccca    2280 aaagtgtata aagtgcctgt ataagtgcag ggcaggtttt agccactaag gttagttgtt   2340
```

```
ttggacatta cctcctccta ttttgagctt cctccagtcc actctgtagg cacaaggctt    2400
tggttggtta cttttttattg tattctagaa ggaactggtt tcttactaat ctcctgtctg    2460
gtctcaactt cccattactc aaacattgta gatctgagag taggagaaaa cctgcagaca    2520
gacgctatca tttttgacac aagctaatta aggatactat caatcctgca tagaatgaag    2580
ttataggaac ttcatgtgtt tatgagagga acaaaactga actcacggaa gtttgtcaca    2640
tgttgggggg ggggatacta aaccggaata ctaatttgca cataatgaat ctgtttctca    2700
aaattccatt ttaaaaaatt aataatcttt gtgtcctgga tcacccacca gcgccactac    2760
caaacctcta gcttgttaat gtgtttgcag gtctcttaga gatattgaca gcttaggtga    2820
tttcttgtgt caggaaaaaa aaatgcgggc ggcaaagatt ccctcgaac taaagcgaat     2880 ctgttgtgta atggtacagc tggttcaggg tacaggtgca ctctcttggc tcctgttctg    2940
cgctgaggag gtagaggggg cgagcccaat ccagagcagg tgtgggggtg gagagaagcc    3000
ttcacagcag agcctcactg tgttgcaacc ttagcccata ccaaatctct gggagacttt    3060
ctggctgccc atgagtaact ccaggccccc aggtctccag agtgggatgg tatcccggga    3120
accactcaga gattagctaa ggagctgaag gaagtccgaa aggcacttcc ggtccgagag    3180
gctaaacagc cttcctaatc tcacttagac cacagacttg ccacttgaga catcagagct    3240
gaaggctgaa attcctcaag gtaaaaagac ctcccccctt ccaggaaatg gactcctcca    3300
ctgtccttgc ttgattattc aggcactttc acttttccat atataggagt cacctgggag    3360
caagctgcga ccagcctgga gtgacacatc tgtattccat ccgctatctc cctctttgcc    3420
catccttacc ctgtcctcat atgctcatag gcacttaggc agaagtcatc tcctcgggat    3480
tctgccaaag atctgcctgt tgggtttgta gggggaggag aagaaaagaa agaaaagaaa    3540
aagctctgaa gttgtcactt tggagaagtg aagtcgaaaa gtgtggcaca atgaatggac    3600
ctgtggatgg cttgtgtgac cattctctaa gtgaagaggg agccttcatg ttcacatcag    3660
aatctgtagg agagggcat ccaggtaagt aggttgcctt gaactcaggt aatcctgcca     3720
tccccagcct gtgccaggag ttacttttac taggtacctt aaaaacaagg ttcatccatt    3780
gctgtagaga ctctttgcag gaagtgtgct ttctttgctg gttgtaaagg tgtcaccat     3840 cttgaagact aggaggatgg ttctcaaata ggaaaaagtt ttgcatgtga gccatgcaca    3900
ggttagaaag gaatagcact gcactctaat ggctgctgag tcggagctgc agatggcaag    3960
gatctcagag atgcttttct gacacagtat gaacttccta aagagcagtg cttttcaatg    4020
tgtgggtctt gactccttga gagtcaaata accccttctc aggggtcacc taagaccacc    4080
agaaaacact gttttgaatt gttcataaca gtagcaaaat gacagttatg aagtagcatc    4140
aaaaataact ttggttgggg gttactacaa catgaggaac tgtattaaaa ggtcacagta    4200
ttaggaagct tcagaaccac tgctatagag gaacattcaa acattgtttt ggttcttgaa    4260 aggggatgg attgtgatgg aaagctcag acaattgtca gtgacaggac cctgagtagg      4320
tagtcacaag ttctgactgt aggacagagg ttgtcaagct gtatagtaca gaggcatcac    4380
atcacaaggc tcaatgacgc caagggctgg gacttactcc catcgtgtcc aatttggtag    4440
gtcttgatag gtagatgctt aagaattcta atttataaca gcttttagga ggtgctgctt    4500
ctgctggtat gggaatacca cattgagaac aactgatcta ggagagctct ggggttgata    4560
accattgttc taggagaaac ctggatttag gcacactgat ttgaggattt gagaacttat    4620
tcacatcctt ctgggcgata tgttgtgtca ccaagtgact tgtcaccaag tctaatttc    4680
```

```
ctaccttcct tctctctcca agagattaac tttataccct gaaattcgac tttgtgtttt    4740
tcaattcact acacctgtgt gccttattcc atggtcccca actgaaggca atccaggccc    4800
tcttctttca gaagcatttt gttatgtcta ggaccatttt ttttttttt  attgttgcat    4860
catagggctt ggaggcaaga ttttcctgga gtctgttggc taggaaccag acatgcagct    4920
aaacattcca caatacttga gtgagtccca taaccaagaa ttatttggcc ccaaatgtca    4980
atagtgcagc tgtccatcat aggtacatct ctggtgtttg tctgggcagc tccattgttt    5040
ctgatagtca cccatatgtt agaagaacat actatgccaa gagaaagtga agtcttttca    5100
gtggttactt gtctcaagtg tagcccgttg tacctaacag ccatgtgttt ggtggacaga    5160
gcaggaagac atctgctaac ccactgacta ttttgcttcg ttaatgatag cctatcaatt    5220
tgtctcattc accattcact ttctactgta aattaagtgt ccaagttggt tggtttcctt    5280
ggaggcttgg tgacctgttt accatttcat ggcaaaattc tcccgtacta gaaagataaa    5340
atgactgtct taagcctatg aagtaataga aactttgaaa tcctgagcag acttctcaga    5400
aagaaattct tccagggatt gatgtagctc agcagtacag atagagtttg cctgccagcc    5460
tatgcaagtc cttgtattta gtggcttcac tcctggatgg gaaaaaaaa  aagatttgaa    5520
ttgtaatcac agcacttgga agctggagac aggggagtta agacatcaag attacccttg    5580
actgtagagc aagctcaagg caaacttcat tgtgtgaatc tcaaaaatcc cagatgggag    5640
ggggagcgag gagagagagc aaggtctctt agggattgag gaattatcaa gcatctatct    5700
tcatgacctt gctaattttt ccctttacct gtatttccca acatagtggc accttatgtg    5760
agctggacat agtaatagta gtaataataa taataataat aataataata ataataaata    5820
ataataattc ctttacatga atgggatttc tggatatctg tcagtagtta acttatgaat    5880
agcttataga cactctgaca ggtcaatatt gaccaccata taacttattt tagaatgtca    5940
ggcggccttt actgatatga ctggcagagg atgtggactc acaccttccc agatttaaaa    6000
tgagcatcta ccactggcag aaggatggat agaaaaactc catcatttat ttcaaattag    6060
agagttgaca tttaatggca agttaatcaa tatcttaata tctatatttg atagctaaac    6120
tccttgactc aggatctgaa tgctcagaga tgatctccat gggccataga gatgctcagt    6180
gttaagggca ctcactgctt ttgcagaaga cgggtttgat ttgagcatcc actccagctc    6240
cagaggacca acatctgctt ctagatccca tggttatctg ttcccacatg tctgcattct    6300
cccatacaga ttacacatgc acatatacac aagtaaaaag aaatcataaa aaaacactct    6360
taaagaggag actctctgga cattttaaac attaagtgaa agacaatatt tcttaaaatag   6420
gaggctcttt tatctcttaa tttgttagta gtgtttaacg gcaacgctga gtgaatttgt    6480
gcacaatgta acttggtgat ctacatgtta gaaccttact tcccggctct tgctgcatct    6540
ttgtcagtct catcttagcc cagctttcag gacacacgtc tgacttgcag gagctgaatg    6600
aacagaggga ggatctgaga gcttcttatg gtagtgttct catgaacagt ggtgtctatg    6660
ggttctcttg tggagggaac catggttgat gccatctacc tgggtttgtg ttttgtacct    6720
tttagtttgc atctatagag ccttcaatat ggcatttgtc tggtcactta gtgaccagat    6780
tttactgatt ttatgaagga tgttagacta tagccataat ttttctgaat gttagcacta    6840
gggaataggg ttgggaaatg aaagacttct ttagtataat gtgattgtga gttgcttgga    6900
ctcttagaag agctggcttt gaaatgtatt ttccttttaa gggattctat gagttcatgc    6960
aatacctgcc atccaaaatg agggaagaat tagaagaaat taagaattca aatactcatg    7020
caggcaactc cagtcaaact cagtggctca cctaaacaaa gcagcaaaat agagggggga    7080
```

```
cctaaagaaa aagctcaaaa ggaatggagg gaaataagag agggtaatgg ggattggtta    7140
tgagcaacat atattgtaca tatatacata tgtatatgca tatatatata catatatata    7200
tgaaactgtc aaagaatagg gaaaattaaa aatctataaa aggatttatt agacaaaaca    7260
attctcattt ttgatatgta agagaatatc ctttttattt ttgatagata ggtttgataa    7320
gctgactcat aaggtgtctt ttttagaatt taagtttgcc atgcttagca attatgttac    7380
ttgttacatt cagtgtttgt tcttatccag ataagatctg tgaccagatt agtgatgcgg    7440
tgctggatgc tcacctcaag caagacccca atgccaaggt ggcctgtggt aagagacaag    7500 ttccctttt ttttttttg ctggagacct aagtatgctg acaaagaag ttcatggtgc       7560 acatagatca tagagtcata ttcaagtcca aagtcaatgt cctcctgtct acaggagagg    7620
tcttcttaaa gtgactttct tatgttgtat aagggcagaa aacatttcta atgatgaaac    7680
agattcatca cctagaagtt gatgtaagat gtcaccagaa ctagcagagg actagggggg    7740
aacatggtct ccttagcaaa ggtttcactg gagtcggtg acttttctaa attcttagat     7800
gaatccttcc gagaaagtga agagctgaaa tgcttgaggc tggctagaaa ctcagttgat    7860
gactatgtat atctagctac tttgattttc tttccttgtt tgtggtatgc ctcatatgtt    7920
aaattaattt atgcatccca tttaccagca acaaagaaca gcagtttcat taactattca    7980
cacccaaacc aacagctttt caaagggcca tcagtgttga ataaagcact gaagcccttg    8040
tccacccatg ccatccacct gtggtctctg ggggtccata taggccaaat atctttactg    8100
ttgtttgcaa gataagtttt ccagcatcaa atctttgtct gatagaaggc tttgtcacac    8160
aacatagtcc ttgacttcag agtgtggaag gtccatgtcc aatctctgac cttacagatg    8220
ggaagacagt gctggttgca cctggctctt tgccatacct tatggtgcag gagaccccag    8280
tgtggagacc agtatgcact gtcactgtct gtgatgtata ctgtcctctg tgaagaccct    8340
cccttccttc tctacaagca tctcagcccg tatgtcaggt ccttgtttta ctctgagagt    8400
agatatcacc ctgatagcat tgaaacaaac agtggcattt tctgtaagat tttggcattg    8460
tatccacact agattcttag ctagggctct tgctcctgtt tttaaagatt ccatgagagc    8520
ctctggcagt agatagttat gggattccag ttcttacaga aaaattcctt ttgagaaagt    8580
ggtctgattt gatccttggg ttaggataca catgttctag catcatggtc tctgtgtatg    8640
tgtgtatgtg tgtgtgtgtg tgtgtgtgtg tgtgtgtgtg tgtgtgtgtt gagagatgtt    8700
gtgtcatatg cattcatcct gttgattaat tcatgaaagc tacatgactg gagacaggtt    8760
aagtaggttg tccaagataa cagaatcagt aagtactttg cacaaaactc aaatacaact    8820
catccttttc aaagcttcat tctactacca acacttgcac atactcagta attagtgctg    8880
gagttgctct ttttgttggc acagctattc tttcttagaa actattcttc actgaagcca    8940
ctaatgaatc gttctatctc cactttgata ggtctagaca cttgagcttc tgtcagctgc    9000
ccatgactac tacctacctt cctttttctta cagagacagt gtgcaagaca ggtatggtgc    9060
tactgtgtgg ggagatcacc tcagtggcca tggttgatta ccagcgggtg gtgagagaca    9120
ccatcaagca cattggctat gacgactctg ccaagggtga ggatgagttt gctgggtctg    9180
tgtgcatgta ggtctctgct gtgtccattt tccatacgga gtcaaatctg atccttcagt    9240
tttacagtac aaattccatc tggagagtaa acattcctag agcaaggtct ggctgccttc    9300
tatagaggac tacagcggga ggggccacg tgtatctgtt cattactgac aagtctcttt      9360
taaggtcctg cttcccctgt gctggcagaa gctttgaatg aagctcgtaa tgaagggggt    9420
```

```
atccctttag tgaccacaag ctctgtgcca agcacaggtg ctagtgtcta cttatgtcat    9480
ctgacttcat cattccagaa taccctggac tgtttcttat gcaaatgagg atatcctggc    9540
ttagagtata actaccgtga acaacacca gggtgggtgt tcctgtactt tccactgagc    9600
tgtactgcat tttactatag atacagaaaa tgaggcctca ttttcaagca cctgggccta    9660
attacaggtg aaggagactg ggaagtccag gttagcaccc atgccaggtg gttaaggagc    9720
tgagggccgg gaaagaggtt caggccaggc aaggaagtaa ggggaccagg aagcaccaag    9780
tggcacaagg ataactgagg acttccctgc agatgccact gcttatatct gggcatggca    9840
ggaagcaacc aagcctgggg gtatatcaga tgacccaggg catggcactt gctgcaaaga    9900
cattttggtg gagcttccat ttgcccatta ttcacaccag tttcctggaa agggctcaga    9960
cctgacttct tcaaggttct actatagctt ctagcaatag atattcatat aatttcagtt   10020
tttatttctc agatttattt atttaaaaaa ttccctctga gtctaggttg aactctgagc   10080
ctcagtttcc agagctcact gtgagagatg tgttgaccta gagcaatcat gagaaagacc   10140
acttcttgca gtgtgggaat gttctagagt gcctgggaaa agaaacagta tatgcaaatt   10200
aatcttccca cttaagatgt gtggccttca ataagtgctt actgacagaa gcctgttata   10260
gctatcttca gagaggctct acctgtgcct gacaaataaa gaggtgtatc ctcactgcca   10320
tccattggac tgagcacagt gtccccaata aaggagctag agaaaggacc caaggagctg   10380
aaagggtttg cagcctcata ggaggaacaa caatatgaac taaccagtaa caccagagct   10440
cccagggact aaaccaccaa tcaaagagca catgtggtgg gacttatgtc tctagctgca   10500
tatgtagcag aggatggcct agttggtcat caatgtgagg agaggccctt ggtcctgtga   10560
aggctctatg acccaatgta ggggaatgcc agggccagga agcgggagtg ggtgggttgg   10620
tgagcagggg gacggggag tagggggttt tcggagggga aactgggaaa ggggacaaca    10680
tttgaaatat taataaagta aatatctaat taaaaagat ttgtggcctt tgtagaagaa    10740
acccatcatc ctgaaaaatg gcgttttgga atgttaccat gcatagcctc tccttggtat   10800
actctgagac ttcaatttat ttatgtgcat ctatatctta ctcaataca tgccttccat    10860 taggttacaa agaaaatttc cataaggcaa tgttctttag aaagggctaa gtgacagccc   10920
gactatggca aaattgaact cagcattggg aagaggtatt atttcgactc aatgcttaat   10980
atacagagca gagtcctttg gcacctctct aaagattatt cattgatttc tacatccaaa   11040
acatttactg gggaatggtg ggggtgaggg aaaggcaaag agcaaagaaa accacgtgca   11100
tgggtagagg gactgcttgg cctcatatga ccagctctga ggtgttctgt gcgaatctct   11160
ttttatctta tgcaatatgg gagtagaatt gcatgggtaa atgtccaagg acactaactg   11220
ggagctggtc aagtttgggt gttggggag gatccagagg aggaacattc catccagaga    11280
gacctcgggg aggtggaaaa gtgcataatg cttaaggcta gacctaagtt tgttgtctaa   11340
aggagttctg gctccctgac aggggtggct gttagtgagg cttcttgag atatcacaca    11400 gcatgcagag gtgcacctca actctgtatt gcagttttgc agatgggac ttggttccag    11460 agttgtagct ttgacaaagg accccagctc taggagtctc tctcgatggt tcaaatacat   11520
gatacttatt attcaccatg tgtgtaaata taaatatat acacacatat atacacacat    11580
atatgggtaa ggtatatagt tgggcctcta aatgacaaga ttcgaaagac ccttgatttt   11640
caatcactgc agtgatattc tcttctccct ccttccctcc cctgccatcc ctccatccat   11700 ctcccttct ctttcttttc ctttctctca gacccggttc aaagtagtcc agactagcca    11760
agatggcctc ctgccttcac ttcagaagtg ctggggttac aagcaggcac catgccttgc   11820
```

```
tagtgctttg attttttcaa gtggggttct ggagggttct ctgggatacc caccatatgt   11880
tgcttacctg ctcatcagtc agaatgtcct tgatgctgtc aggtttgtaa cgttgttgtg   11940
ggttgtcaca gttctgtgta agatatactt tttttttttt aaccaaggtg taattgaata   12000
cagtaaaata tatcatggag aatcttctct tttgaaagag ttctacatga tcatggaggc   12060
aaatatcagg tctttcaaca tcacagtcct cacctcaact gtgaaccaga ggctaccacc   12120
cctaacaata aatgccacac cagtgactga gaagttcacc aagaaactta tagtcctgtc   12180
ttgacacatg tccccactcg gcttacttct gcccaggctt tgacttcaag acttgcaatg   12240
tgctagtggc tctggagcaa cagtccccag atattgccca atgtgtccac ctagacagaa   12300
atgaagagga tgttggtgca ggagatcagg tatgtcagct gtgtgagggg tggaccagtg   12360
tggtgtgttt ggacagagct atgatccata agggaatcc tgctgagcta attacactct    12420
tgggtggtct catcactcta gaaacctggg gaagatcatg cctacagtaa gttgagcact   12480 gctaccggc atcaatgtca ggatgtgtgg tagaaaccca tgattgctga tgacagatgt    12540
agacttgtct cctccttcca gagtgttggg ggtcagaggc actgtcttct ccttctaaaa   12600
tgctaaatgc agcagtgttt tgtgtatgag agagatactg cataactgtt gaagtaccaa   12660
aagaaatatg tgatttggag aatagtgctg ccctgagttc taaggcagct gtccttcctc   12720
agggtctgat gtttggctat gctactgatg agaccgagga atgcatgccc cttaccatcg   12780
tgctcgctca caaactcaac acccggatag cagatctgag gcgctctggt gtccttccct   12840
ggctgagacc tgattctaag actcaggtga gctgtttcca tcaccccgc agacctccct    12900 actaaattat accaaatcat tttggttctg ggcacatttt tcccaagtaa tacatattta   12960
ttgtcacctg ccaaaatgct tttaaaatac ctatattta attcattctt tgacaacaca    13020
cacatccacc ccacatgctt ggttatatga catgttatac acacacacac acacacaacc   13080
acacatatac atgcacacgc acacacatcc cacatgcttg gttacatgcc ctgttacaca   13140
cacacacagg cacaacccccc cacatactca gttatatgct gttatacaca cacatacaca   13200
cacacatgaa catatgcaca ttcaacccct catgcttggt tatatgccct gtgagccctc   13260 cctttctcc ctcccacttc catcaagccc tccttttctc taagcagtcc tccctccccc     13320
ttttatgtgt ttctttgtgt ggataacctg ctgcatttaa ttatagttgg ttgcatgaac   13380
acagctaagg ggttacttat ttgaataaag gtaactgact atttcttgcc tacagttcct   13440
cagggagagt gggatgttat gagcctctct cctacccaca atgacacacg gatgggccca   13500
accttgtttg caggtagtat gcagatagcc aaagcgcctg tggatttatg gatgcagtgc   13560
catgttagat ccagaagaca ccatttcaca accctctttc ctgacttctg gctctgcttg   13620
tattctttcc accctctttt ccatcttgtt ccctgaatgt tcaaggaga tgggaacatt    13680 ccatttagga atagacattc aacgatccct tttcctcggc actttgatca gctgtgagtc   13740
tctgtgttgt cagcacctac tacaaagagg atcttctcca accaaggtca acacgttagc   13800
aatttggcgg tataaatgta aatatttaga tggcagcttc atattgtgtc tgtttagtaa   13860
agcaacagga ataggttcct cactagggct tatgctctcc ccagccatgg ggttttccat   13920
gccagatatg catttcctct tgcggaggga gcctccaatc taattagaaa gtgtttgatt   13980
acactttagt catgctattt ttaagatgaa atattctac ttaggtaccc aaagcattat    14040 ccatttgaa aggaatcact tacttgaaaa ctctttcagg ctacacacat ttcccatcct    14100
gaccctcatc aaaattttatt ataaaactat tcaaaaaatc agacaggctt aaaaaattat   14160
```

```
tctatttta ttttgttagc atatgtggtc tttggtggta acttaatacc tgccacagtt    14220
ttactacctc accagttcct gacatggtgg ctcctgcctt tatgagcaca cagctttccc    14280
accatgagca ggctgtatct ctaggacccc tttccttgtc tttacccttc atgtgtccca    14340
ttccagctct gtgggccttg acctccctcc ttcccatcat gatgaaatcc ctttctcttt    14400
gaaggacagt ggtgatgcaa acattagcac aggtggaggc aggctcccta ccactcttca    14460
gtcgtctgat ggccttttggc caatggctgc ctgccctggc tcctcttctg tgttctaaag    14520
tatgatgtcc caaggtcttg acacatcatc ccctacatgt tatctctatc tcttcactca    14580
cttggctcct gaatcttcca accttggtcc ctccacatca tcagccccat ttctcactca    14640
ctttacaggc tcagaggccg acagcctacg ctatgctgct cactatcatc tcttactcgg    14700
cacaggacta ggtggagcac aacacattcc ccaggccagc tttgtgccat ctgtctccat    14760
ggtactagtg tctcgtattt ctccagaaag agtattcctc tcattgcagc ccaacctttc    14820
ctggattggt ccctacatca tccaagccag caacagtacc ctatgcccct aaaaggttct    14880
ccctgcttga gaactgcagt taattttttg tgatcttctc cacctttca gaattttctc     14940 taggatttta cttcttgtga gaggagggca gaattcactt gtcattccag aattcagaat    15000
tgcatattat tccaccataa cttttcctctg ccagcccttt tcacagagtc tccaattcac    15060
cagcattacc ccattcaatt tatccttggt tcatagggct tatacaccat cctttattgt    15120
atctgtgttt tttctttggg gacagcaatg cctatgtctg aatgctactt gtggcccctc    15180
ataccagact gttctctctc tttcccctc ctccctctt ccatccctc ccttctctcc       15240 cccaaccccc atacttgtga ttgatataga tgcttttatg gcccaatata gtgcatgtag    15300
ctatgtcttg ttattctagt ctatgtcatt ctactaagat gtatccttct ttctgggcag    15360
aagtatcaca ctggctccac ttggggcaac tgtgtgtgct tatggtccta atagaacatt    15420
ttcttagaga ttcctgtgct tgtgctattt ttatgacttt caaggtagag ttggggccac    15480
cagcatctct caggtattgc cggaggttat gggacagaag agctaacatg tagactgctg    15540
tggtaccaaa agaaagggct tagaaatgtg gagttccaca gaaaagacaa ccccagaata    15600
ggggtgagta gaagacaatg ggcacccctga agtttccttt tcctctggta agagaggaac    15660
agaaggaatg ctttgagcta cagtaagaaa gaccttgttc atttcccctg tacaagaaag    15720
aggtttccaa gtcttaggag ctctgaggga aataggaagt ctaatgggat gcccttttct    15780
gagaagatgc attgagtctc cataagatgc agtagatatg cctgtcacag ggggccagga    15840
gacactggat agttgagctg cctcctaggt ctgcctctat gcagggagta ctatccagga    15900
cagtagctgg cctcttcctc cacaggctct ttgtaaagga tttccattgt cacctgtgtt    15960
gactgtgacc aggatgagtc tttccacctg aacaaattgc tgctgctgat actgagaatc    16020
agggctggca gtccagtggc tatttttgta ccaggtcaga gctctgtttt ccatagtgtg    16080 ttttccccg tatctgctga catgatgaga taagagcaga gctcgggcct ttgctctgcc     16140
aacccgttcc aggagttctg caaagatgca gcctggtatt tgcccagtag ggatgggaca    16200
tcaggtctca gtgaaaaaca gctagattgg gaaattgcct caagactgaa cctcctccca    16260
aggctatatg agataacttt gatcctagag cctgataaag gtctcctccc ttgggagtcc    16320
ccatccctat tctacctccc ccttgtgcag tcctatgaga ggataattcc catggaggat    16380
ttaatgggta gtcctcaatg attgtgtacc ttccaatctc agatgatagg tggccagagc    16440
tctttttgtc tctccccctg gatgtctctc tgttgctttt tggaccagca ggacacagag    16500
cagaattccg atatgtaccc cattggctat acttaatctt agctgaaaga ttcaaaagtg    16560
```

```
tcaggtgact ttggatggct gtctaaggca ccttggccaa gcagagacca tatttcagca   16620
caacctcatc aagggactga ttgctgcaag gtcctatctg ggccctagga taaaaaatta   16680
ttctatgcca cccctgctta ggttttggt atattatagg catactgctg caagcatctc    16740
atgaccctca gctgtgcaga tactgctctg ataggtacat attgtctcag gtagcatggg   16800
ccctgtcatc aacagatgg ttcatggtct taagtggcaa ctttctgcta aacagagcct    16860
tggctataaa tctgtgtgtc agctcttgtg tgtgatcttg accaaaatgt ttgaatgggc   16920
aacaaaggtg acccattcat gccatggctt ctacctgcaa agcttgttca cccattgcat   16980
ttttcttgac ctcctcatct gctgacctcc caccaagcct tccactttgc aaactcaagg   17040
ggacctatct gcttttcctt gctatctgag atatcatgtg tctgtgccca gtgatatgtc   17100
attagaggac agagtctcta cagagcattt tgtctgtgct acaatgagag tgacaagctt   17160
tggttcagct tgagcaaggt ctggatcttg gactcctcac aaaatgacaa gttctgatct   17220
cttggtttat gtcatttgta aagtgtaggt ggacatgaca cctccctcac tgtgatatct   17280
tagatcttaa tctatatgat gggaaccgaa ctggacatga tggaagtgaa tgtttgaggg   17340
gtctccatgg cttgccctga caggaccta taatcaggat cctgactcct acccaagtat    17400
gctccacttg tccttctttt ggtgaaacac caagacaatg gggattcaga gctttctgcc   17460
cttttagctt aacagtcctg actagagcct ctttcacctg tccatacagc tgtcaaactc   17520
tcctggtccc aatgtacttc caggatcctt tactgaggag agagggccac ttgccaggct   17580
cttcctctct gtctcagagg ctctatatgc caacaaatac agtcgtggct aaagatcctt   17640
tttggttctt cacattctag gaccaagata cccttgtctc tgccaatgaa ttcctgtgtt   17700
cactaataga aatgggagaa gtccatggga agtgtccaga gagggtcatt agcactagca   17760
gtctcttatt atcacagttg aaagacagtg ccccatatgt gtgccttatg ctgtcatcac   17820
agtatagagc aaattactaa atataagcat gtgccatctt cagtctccaa agaaccttta   17880
gagacaaagg gactctctgg atcccttggg aactcaggct gcctcctgga gacctgtgcc   17940
tgacagccat gtgccctcag ctcaggcctg ggcctcacag gatctccttt gatggacagg   18000
taacagttca gtacatgcag gataatggtg cagtcatccc tgtgcgcatc cacaccatcg   18060
tcatctctgt gcaacacaat gaagacatca cactggaggc catgcaagag gccctgaaag   18120
agcaggtgat caaagctgtg gtgccagcca agtacctgga tgaagatact gtttaccacc   18180
tgcagccaag tgggcggttt gttattggag gccccaggt gcgtatttat ctctagataa    18240
ggccctgttt ctgggccttg atacctggac tgctcatgtc ccagagtaca cagatgcaa    18300 gatgtagttc tgaggatctc agtagtgtct gcccatgaat taaaggtgct cagtgaactt   18360
tggcctacat tgaagacact ctgtatatct gtcaatatgg aaaaaggggt acatgatcag   18420
aggagtttcc cacttaatgc tgtcaagccc tcccacctag ccattccaaa tgccaccatg   18480
cctgcccata gccaccgtca tttctcccta cttggtcagg cactcactca tctctgtagt   18540
gcttgttcat ggctactttc tcaggcatta cttgctggaa ctttgctatg ggggtctcca   18600
gctattgttg caaggacagc agaggtgagt tttatagaag atacagctct tacccccattc  18660 tcctatatgt acacagacca gagggggtag agattagcag aactgagggt attatcacaa   18720
ggttgaaccc ccaaaatagg tcctatggtc aaatagtgtt ggaataaggc agaaggttaa   18780
gttccttatt ttcctggagg atgtctcaaa gtctaaatag gtaactgcaa agtgtgactt   18840
ctaaatagaa ttgaagtaac tggattctct tcaaattgct aaatctagct ccatttaaag   18900
```

```
gtgtttctttt caaactgctg ctaaacagag cacacttcat aagtgagcca cgtggtggca   18960
ctggccagga tgacagcctg gggttgtatt tattgcagta caattcctac tacaggtgga   19020
tggcttctta tggtggactc aaaagtgaag gcatggcccc agatgacctc tgtctcatct   19080
cctgaccttt ctagtaaggc tttgacaggt tgcctgattt tcatagctgg tcagtgccag   19140
gaaggacgga gatgagagaa ctcacagttt ctgcctggtt catggggggcc tttgagagtg   19200 ctcacaggag actctctgtc ctttcttctg cccagtctgc actcagtgtc agtgcttctc   19260
atctcttgtc cgtttgtctc cctctgtagg gggatgcagg tgtcacgggc cgcaagatta   19320
ttgtggacac atacggaggc tggggtgccc atggtggtgg tgccttctct ggaaaggact   19380
acaccaaggt ggaccgctca gcagcttatg ctgcccgctg ggtggccaag tccctggtaa   19440
aggctgggct ctgccggaga gtgcttgttc aggtaggttg cccccacctg ttgtgatcct   19500
tttttcctgt gcttgccaaa ggctccagcc cagcctggag taaggagata ctggcccagt   19560
aggaaagcct ttttgtcact gttgcatctc tgcataaatt gcactggcga ctgtggctgg   19620
agccctggca aactagggaa agagagagca cacctgaaga caggggggctg ctgggcagga   19680 gaggtaggga tcctattggc agaagaagtt tggggcctgc tgcctctgct ctttaaagtc   19740
tgtgagaggc tcagtccctg agccagatct ttcttgaagg tgtcctatgc cattggtgtg   19800
gcagaacctc tgtccatttc catcttcacc tacgggacct ccaataagac tgagcgggag   19860
ctgctagagg tggtgaacaa gaactttgac cttcggcctg tgttattgt caggtaaaag    19920 ggccatcatg ttgctattgc ctggaacctt cccacttcca cactcaggtg gacacccaaa   19980
cataaagggc tcttcagaca cttacaacag gagggtccca aatgcctggc ccctcagcac   20040
agtgcctgga atcatagatc agtacatgcc cccaacttgg ggtgtctggt ttccagcaga   20100
aggaggccca gtggagagta gccataatga gtccatcttt gagcagctgg agcatctcag   20160
gccagatgtc taggaagcca gtaggcaagt ctattcctac atgccatcat ggcatcccta   20220
ttctctggtt cttggctgtg agagcactgg ccttggctaa accagtggag tagagtagag   20280
aaagttacct caggtaagag ttcatacccct ggtcttggtg tgttagtact cagctgtctc   20340
tgaccttgga gctttcactt cttaacctga tcatgatagc actgtgttgt agatagggta   20400
cagatgtatg tgtttgtggg agaaagcctc tcctaggacc accctagta ctcactacca    20460 tttcccattg aaaaatgacc tttgcctccc ctgactatgc agggacttgg atctgaaaaa   20520
acccatctac cagaagactg cgtgctacgg ccatttcggg agaagcgagt ttccctggga   20580
ggtccccaag aagcttgtgt tttagagccg ctggaaagtt tagctctgtc ccatactcac   20640
ctcttcagga tctcaactcc ctggtctcct agcctctccc agagtgccct ccttgccttc   20700
taccctcagg gcaaagccag cttcttctaa ttttcccctta tccagcaatc tgcaaacatc   20760
ttatgaatga catgacaggt ggctttctgg tgctaggtta tcatgtctcc ttttgagggt   20820
agtcactgtt ccctgcctgt ccctcagatg acagcaatgc taattttgtg taaaagttac   20880
tcctgtttga caggaagtcc ttccctcact tcctcccata gtctgaacct taccaggcca   20940
tctcttcctc cattctagat atgtacccag atgaatatat tgcacagacc tctggcttcc   21000
cctttacatc tgcagccaga gattccgagc cattgctatc taagggtccc tctgagacta   21060
ggcatctgct acataaaata tggtcaatgt ctcctgagca tttgcatcgt gtgagggact   21120
gagctgtgtg ttcttcatct cagcacaata aggtgttgtc tttattatta tccacagtaa   21180
ctgatgaaaa actgaggctc agagagtcta tgaagtctg acaagtttcc atagccacat    21240
gtatcagagc caagaaatgg atctaggagt tctgactcta acccctcacat ttgtatccca   21300
```

```
gacaagatgt tgaccagagt gatgacaagt ggatcgactt gaggctatgg ctacttattt    21360
aaggcctggg tctcctgaga attaggagat gaacctagtg gctctttgtg agccctggac    21420
agcgttccac aaaatcaaaa tggagacata taagtgtctc atttgttctg gaagagggtt    21480
taaggaaatc tgggtatctt ggcctatcaa gctgggctgg agtctcgaac taagaggaag    21540
tttcatggtc ctggccccca acactgaaag ataggtgtgt gagttctctg ggcatgggtt    21600
ctaatcatag acagccacat gtgcttccct cctcacagag gagaggcagc tggttgttat    21660
agcacagaca accggcctct gaaaggggac cctgcacctt ttgaggcttt ctcctttcct    21720
ggacgctcat gcttatgcag gctaagtgtt ccaggtagag ggacagcctc caagcaatcg    21780
acaagttgcc aagatctcat gagaactggc ttttaccagg tagcctttga aagacatgtc    21840
tgtccagcag ggtctgggga accacatgtt tctaagtgtc ccatcataat cagtaccaca    21900
ttcccaacct gtccctagtt gggcccttct cacagcatac tgccttcata gctcccaaga    21960
acatgggttc aggaggggac ctggctcaga gaaggttctg gctaggagaa gggctgggca    22020
gcttcatcaa gaagcagata ccttgcatct gtgccttgac tgggcagaga tcccagcttt    22080
cccctttccc ccagcgtgag gaaacagcag agggaaaagc ctcattggcc aacagatcct    22140
gatgctgtgt gtgacttaga agcttgagtc tttccatagg gttcggagct gcctgggagc    22200
caagttcctc acagcagaag gaaggatggg cgtgcgaagg ttgagttcct gtaacttaag    22260
ctttatcaaa ataaaaatcc agaatggtat acttgctcta accctgagag taatgagcct    22320 cttctttcc tttcaacatt tcctaggaaa gaaagccatt atttgttaat gttacctgat    22380
gatagtatgg tgaataaaat ctcaaggagc aacaacactg tacttgcagt ttatggtgtg    22440
tgtgtgtgta tgtccaaggg agggtactgg gacactgggt atcctactcc attatattct    22500
gccatactcc cttaagacag tctctcactc aactgagggc taggttggtg gccaccaagc    22560
cctagggagc ctcctgtcgt catccctgac ctccactgtg ctggagtgac aggggtgcac    22620
atgaccatac caagatcttt cagatgagtg ctaaggattt gaactcaggt tttcatgctt    22680
gtacagcagt gctcttcttc cctaagtgat cttttgcagac ctactacgct tggttttgtt    22740
tgcaaaactt gagctgtttc actgtgaagc acttctgact ctttcacctg cagaaaagct    22800
gggtgctatt ttcaggatta cccaagcct gacctgtatg ggacctcctc aacctctgtg    22860
agctaacacg cactgaccca ttcctgtact gtcagcgggt tactatatcc gcatcatggc    22920
ctgttaaggt agagattctt actaattctt cttgtcaagt cctggagctg tgtggaagca    22980 agtgtgggagc tggaactctt gaaatttcct aggaggagat attgaggcag gcatcaaatt    23040
tgggacacat gcttgaagca ggctgagggc ggggcaatat cacttcttag tcccatgact    23100
tgggtttcct ggtgtctaac taagacccag acctattgct gggaggagaa gacagagaaa    23160
acacctaatg acatctggtc tcaggtcttg ggtgtcgttg gttctatatt cagagcagcc    23220
actcgttcct aatgttccta aaggtagtaa cttcacagaa aagtgacctt caagaatatc    23280
tgtgagcagc aagaccccg tgaaacatct gggaatgctt atttgcagga tggaggttta    23340
tgaatgaaaa aagggaaaaa ccattactaa aaggaagaaa gtgaagggct caaaattcca    23400
gcatggttag gacagggget catgaacgtc caccaaccac caaagagcta ttggcaatgg    23460
tgatgctggg gacagaagag tcagtttcct tcagggatac aagccctgag aggctttagt    23520
agatggtcct atatctatgc acatacatgc atactaaatg gactctgggt tttgttttat    23580
ttttgttgtt gttagtgttt tgtattgttt cccatgtgaa gttgggaaaa aatcgtggtg    23640
```

```
gggcatagggg gcaaaaatga aagggaggaa aatgggcaga tttggtcaaa atgcgttaca    23700
ggcatgtttg acattctcag taaaagtaga ggggaaagct aggaagttgg ctttacagtt    23760
aaggtgcttg ctgtgctagt ggcaatcata aagattagaa ttcagatccc cattatccag    23820
gttagtttca ggtgggtgtg gcagctcacc tattattcca gcactcagaa tatggaggca    23880
gaaatagcca aaaccaggt ggctagttag acaataccaa caaagtctgg gctcaattga     23940
gagatcctgt cttaagaaat aaggatgaga gtgaatatgg aagattccca atgtcagttt    24000
ccatgtgtga ggatacacat gaggacaggc atattcacat gcacaccata aacagacaca    24060
cgcagaaaga aagaaagaga atatacttt gagccttgga acactcaaag gtcaagatca     24120
tagcaaaata tggatgcctt tgttttctat cagtgtgata aaacaccatg accaaaggca    24180
acatggtaag aaaagggttt atttcagctt atagttttag tccaccataa aaggaagtca    24240
gggtagaaac ctggaggaag gaactgaagt cgtggagcaa cactgcttac tggcttgttc    24300
cttatggctg gctcagcccc ctgtcttata caatccagga tagcccagag tgacaccacc    24360
cccatgagct ggtacttccc acggcaatta tttgtcaaga aaatacccaa aggcttactt    24420
ataggcaatc aagaaaatac ccataggcgt gtctataggc agtcagatag aatcattttc    24480
ccagttgagt ttccctctcc cccagatgtg tcaagttgac aaaacaaaaa caaaaataaa    24540
caagcaaaca aatacaaaac aaaaaagaca acccaaatgg agaaaataaa acacccccca    24600
aacaacaaca acaacaacca aacaagcaac accatagaag aagcaaagca agttgggagg    24660
gcacagctag catggaagaa ggagccccag taggtggttc atcattggaa gtcaaggcta    24720
tgagaactac tacttaagag ttcagcgcgg cccaagagtg tcttacgggg ccaaacatct    24780
attctatgtg aggttctgtg taactttcct gcaaatgtgt tgtgaatcat caataaatgt    24840
ttttagttaa aaatattgtg aaatgaaagt atatttctc tcaaattgca tcccaccact     24900
tttagaaact tatagtatct aatcaactgt gcccattaaa ctcatcccca ttacaatgtt    24960
ttagaacata caaatcatta gttttaacta tatgacactg                          25000
```

<210> SEQ ID NO 3
<211> LENGTH: 21
<212> TYPE: DNA
<213> ORGANISM: Artificial Sequence
<220> FEATURE:
<223> OTHER INFORMATION: Primer

<400> SEQUENCE: 3

```
gagccttcat gttcacatca g                                                21
```

<210> SEQ ID NO 4
<211> LENGTH: 20
<212> TYPE: DNA
<213> ORGANISM: Artificial Sequence
<220> FEATURE:
<223> OTHER INFORMATION: Primer

<400> SEQUENCE: 4

```
gtcttgcaca ctgtctcaca                                                  20
```

<210> SEQ ID NO 5
<211> LENGTH: 28
<212> TYPE: DNA
<213> ORGANISM: Artificial Sequence
<220> FEATURE:
<223> OTHER INFORMATION: Probe

<400> SEQUENCE: 5

```
agatcttatc tggatgcccc tctcctac                                              28

<210> SEQ ID NO 6
<211> LENGTH: 20
<212> TYPE: DNA
<213> ORGANISM: Artificial Sequence
<220> FEATURE:
<223> OTHER INFORMATION: Primer

<400> SEQUENCE: 6
gcactgcatc actgatctgg                                                       20

<210> SEQ ID NO 7
<211> LENGTH: 20
<212> TYPE: DNA
<213> ORGANISM: Artificial Sequence
<220> FEATURE:
<223> OTHER INFORMATION: Primer

<400> SEQUENCE: 7
tggcttgtgt gaccactctc                                                       20

<210> SEQ ID NO 8
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 8
agtctcccag agatttggta                                                       20

<210> SEQ ID NO 9
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 9
ttcggacttc cttcagctcc                                                       20

<210> SEQ ID NO 10
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 10
gtctgtggtc taagtgagat                                                       20

<210> SEQ ID NO 11
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 11
caaagaggga gatagcggat                                                       20

<210> SEQ ID NO 12
<211> LENGTH: 20
<212> TYPE: DNA
```

```
<213> ORGANISM: Artificial Sequence
<220> FEATURE:
<223> OTHER INFORMATION: Synthetic oligonucleotide

<400> SEQUENCE: 12
cgacttcact tctccaaagt                                               20

<210> SEQ ID NO 13
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 13
gggttttttc agatccaagt                                               20

<210> SEQ ID NO 14
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 14
gtcattcata agatgtttgc                                               20

<210> SEQ ID NO 15
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 15
ggcctggtaa ggttcagact                                               20

<210> SEQ ID NO 16
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 16
tgtagcagat gcctagtctc                                               20

<210> SEQ ID NO 17
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 17
gacaacacct tattgtgctg                                               20

<210> SEQ ID NO 18
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 18
ccacttgtca tcactctggt                                               20
```

```
<210> SEQ ID NO 19
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 19
gggctcacaa agagccacta                                                   20

<210> SEQ ID NO 20
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 20
tccagcccag cttgataggc                                                   20

<210> SEQ ID NO 21
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 21
gctataacaa ccagctgcct                                                   20

<210> SEQ ID NO 22
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 22
agcctgcata agcatgagcg                                                   20

<210> SEQ ID NO 23
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 23
tggcaacttg tcgattgctt                                                   20

<210> SEQ ID NO 24
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 24
ggttgggaat gtggtactga                                                   20

<210> SEQ ID NO 25
<211> LENGTH: 20
<212> TYPE: DNA
<213> ORGANISM: Artificial Sequence
<220> FEATURE:
```

<223> OTHER INFORMATION: Synthetic oligonucleotide

<400> SEQUENCE: 25
gcccttctcc tagccagaac                    20

<210> SEQ ID NO 26
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 26
gactcaagct tctaagtcac                    20

<210> SEQ ID NO 27
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 27
gcaagtatac cattctggat                    20

<210> SEQ ID NO 28
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 28
gagaaccatc ctcctagtct                    20

<210> SEQ ID NO 29
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 29
ccatccccct ttcaagaacc                    20

<210> SEQ ID NO 30
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 30
tgtggtattc ccataccagc                    20

<210> SEQ ID NO 31
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 31
gtcgaatttc aaggtataaa                    20

-continued

```
<210> SEQ ID NO 32
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 32
tctcttggca tagtatgttc                                               20

<210> SEQ ID NO 33
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 33
ttacttcata ggcttaagac                                               20

<210> SEQ ID NO 34
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 34
gctattcata agttaactac                                               20

<210> SEQ ID NO 35
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 35
ggcccatgga gatcatctct                                               20

<210> SEQ ID NO 36
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 36
tgggctaaga tgagactgac                                               20

<210> SEQ ID NO 37
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 37
ccaaccctat tccctagtgc                                               20

<210> SEQ ID NO 38
<211> LENGTH: 20
<212> TYPE: DNA
<213> ORGANISM: Artificial Sequence
<220> FEATURE:
<223> OTHER INFORMATION: Synthetic oligonucleotide
```

<400> SEQUENCE: 38
agacacctta tgagtcagct                                                    20

<210> SEQ ID NO 39
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 39 gttccccct agtcctctgc                                                     20

<210> SEQ ID NO 40
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 40
gttgctggta aatgggatgc                                                    20

<210> SEQ ID NO 41
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 41
ggacatggac cttccacact                                                    20

<210> SEQ ID NO 42
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 42
gccctagcta agaatctagt                                                    20

<210> SEQ ID NO 43
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 43
gtgcaagtgt tggtagtaga                                                    20

<210> SEQ ID NO 44
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 44
cccccttcat tacgagcttc                                                    20

<210> SEQ ID NO 45
<211> LENGTH: 20

```
<212> TYPE: DNA
<213> ORGANISM: Artificial Sequence
<220> FEATURE:
<223> OTHER INFORMATION: Synthetic oligonucleotide

<400> SEQUENCE: 45
gtgttgtttc acggtagtta                                              20

<210> SEQ ID NO 46
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 46
tcctcagtta tccttgtgcc                                              20

<210> SEQ ID NO 47
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 47
ttcaacctag actcagaggg                                              20

<210> SEQ ID NO 48
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 48
atacctcttc ccaatgctga                                              20

<210> SEQ ID NO 49
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 49
acccaaactt gaccagctcc                                              20

<210> SEQ ID NO 50
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 50
tcttgtcatt tagaggccca                                              20

<210> SEQ ID NO 51
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 51
```
gttgaaagac ctgatatttg                                                    20

<210> SEQ ID NO 52
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 52
tgccgggtag cagtgctcaa                                                    20

<210> SEQ ID NO 53
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 53
tacttgggaa aaatgtgccc                                                    20

<210> SEQ ID NO 54
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 54
gcaagaaata gtcagttacc                                                    20

<210> SEQ ID NO 55
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 55
gtgccgagga aaagggatcg                                                    20

<210> SEQ ID NO 56
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 56
ggataatgct ttgggtacct                                                    20

<210> SEQ ID NO 57
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 57
ccacctgtgc taatgtttgc                                                    20

<210> SEQ ID NO 58
<211> LENGTH: 20
<212> TYPE: DNA
<213> ORGANISM: Artificial Sequence

```
<220> FEATURE:
<223> OTHER INFORMATION: Synthetic oligonucleotide

<400> SEQUENCE: 58
atgtgttgtg ctccacctag                                               20

<210> SEQ ID NO 59
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 59
gttatggtgg aataatatgc                                               20

<210> SEQ ID NO 60
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 60
ctggtggccc caactctacc                                               20

<210> SEQ ID NO 61
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 61 ggcccctgt gacaggcata                                                20

<210> SEQ ID NO 62
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 62
aactcctgga acgggttggc                                               20

<210> SEQ ID NO 63
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 63
gtgtcctgct ggtccaaaaa                                               20

<210> SEQ ID NO 64
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 64
gggcccatgc tacctgagac                                               20
```

<210> SEQ ID NO 65
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 65
gaccttgctc aagctgaacc                                               20

<210> SEQ ID NO 66
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 66
ggctctagtc aggactgtta                                               20

<210> SEQ ID NO 67
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 67
gacaagggta tcttggtcct                                               20

<210> SEQ ID NO 68
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 68
gcagtccagg tatcaaggcc                                               20

<210> SEQ ID NO 69
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 69 tacccctct ggtctgtgta                                                20

<210> SEQ ID NO 70
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 70
gccatccacc tgtagtagga                                               20

<210> SEQ ID NO 71
<211> LENGTH: 20
<212> TYPE: DNA
<213> ORGANISM: Artificial Sequence
<220> FEATURE:
<223> OTHER INFORMATION: Synthetic oligonucleotide

```
<400> SEQUENCE: 71
gggcaaccta cctgaacaag                                                    20

<210> SEQ ID NO 72
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 72
tgatggccct tttacctgac                                                    20

<210> SEQ ID NO 73
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 73
ggtttagcca aggccagtgc                                                    20

<210> SEQ ID NO 74
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 74
gcctggagtt actcatgggc                                                    20

<210> SEQ ID NO 75
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 75
ggaccggaag tgcctttcgg                                                    20

<210> SEQ ID NO 76
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 76
gctggtcgca gcttgctccc                                                    20

<210> SEQ ID NO 77
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 77
gtgccacact tttcgacttc                                                    20

<210> SEQ ID NO 78
```

```
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 78
gagcgagcac gatggtaagg                                         20

<210> SEQ ID NO 79
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 79
ggtaaacagt atcttcatcc                                         20

<210> SEQ ID NO 80
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 80
tcagtcttat tggaggtccc                                         20

<210> SEQ ID NO 81
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 81
tccagcggct ctaaaacaca                                         20

<210> SEQ ID NO 82
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 82
gtgactaccc tcaaaaggag                                         20

<210> SEQ ID NO 83
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 83
ggctcggaat ctctggctgc                                         20

<210> SEQ ID NO 84
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 84
```

```
gctcaggaga cattgaccat                                             20

<210> SEQ ID NO 85
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 85
ggctctgata catgtggcta                                             20

<210> SEQ ID NO 86
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 86
ccatagcctc aagtcgatcc                                             20

<210> SEQ ID NO 87
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 87
attttgattt tgtggaacgc                                             20

<210> SEQ ID NO 88
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 88
tcctcttagt tcgagactcc                                             20

<210> SEQ ID NO 89
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 89
ccctttcaga ggccggttgt                                             20

<210> SEQ ID NO 90
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 90
gcttggaggc tgtccctcta                                             20

<210> SEQ ID NO 91
<211> LENGTH: 20
<212> TYPE: DNA
```

<213> ORGANISM: Artificial Sequence
<220> FEATURE:
<223> OTHER INFORMATION: Synthetic oligonucleotide

<400> SEQUENCE: 91
gagatcttgg caacttgtcg        20

<210> SEQ ID NO 92
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 92
gctgtgagaa gggcccaact        20

<210> SEQ ID NO 93
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 93
gggatctctg cccagtcaag        20

<210> SEQ ID NO 94
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 94
ggcagctccg aaccctatgg        20

<210> SEQ ID NO 95
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 95
aggctcatta ctctcagggt        20

<210> SEQ ID NO 96
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 96
ccaggtgact cctatatatg        20

<210> SEQ ID NO 97
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 97
tgccatctgc agctccgact        20

<210> SEQ ID NO 98
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 98
tatacagctt gacaacctct                                                     20

<210> SEQ ID NO 99
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 99
gctctcctag atcagttgtt                                                     20

<210> SEQ ID NO 100
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 100
gcctccaagc cctatgatgc                                                     20

<210> SEQ ID NO 101
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 101
tgggttagca gatgtcttcc                                                     20

<210> SEQ ID NO 102
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 102
gatgtcttaa ctccectgtc                                                     20

<210> SEQ ID NO 103
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 103
ggtggtcaat attgacctgt                                                     20

<210> SEQ ID NO 104
<211> LENGTH: 20
<212> TYPE: DNA
<213> ORGANISM: Artificial Sequence
<220> FEATURE:

<223> OTHER INFORMATION: Synthetic oligonucleotide

<400> SEQUENCE: 104
taaccatggg atctagaagc                                               20

<210> SEQ ID NO 105
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 105
ttggatggca ggtattgcat                                               20

<210> SEQ ID NO 106
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 106
gtgcaccatg aacttctttg                                               20

<210> SEQ ID NO 107
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 107
ctcttcactt tctcggaagg                                               20

<210> SEQ ID NO 108
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 108
caacactgat ggcccttttga                                              20

<210> SEQ ID NO 109
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 109
gtgcatactg gtctccacac                                               20

<210> SEQ ID NO 110
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 110
tgtgtatcct aacccaagga                                               20

```
<210> SEQ ID NO 111
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 111
cgattcatta gtggcttcag                                              20

<210> SEQ ID NO 112
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 112
ctccagatgg aatttgtact                                              20

<210> SEQ ID NO 113
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 113
gacactagca cctgtgcttg                                              20

<210> SEQ ID NO 114
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 114
acctgtaatt aggcccaggt                                              20

<210> SEQ ID NO 115
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 115
catctgatat accccccaggc                                             20

<210> SEQ ID NO 116
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 116
gccacacatc ttaagtggga                                              20

<210> SEQ ID NO 117
<211> LENGTH: 20
<212> TYPE: DNA
<213> ORGANISM: Artificial Sequence
<220> FEATURE:
<223> OTHER INFORMATION: Synthetic oligonucleotide
```

```
<400> SEQUENCE: 117
gcagtccctc tacccatgca                                               20

<210> SEQ ID NO 118
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 118
taacagccac ccctgtcagg                                               20

<210> SEQ ID NO 119
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 119
tctggactac tttgaaccgg                                               20

<210> SEQ ID NO 120
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 120
ggactataag tttcttggtg                                               20

<210> SEQ ID NO 121
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 121
gcaatcatgg gtttctacca                                               20

<210> SEQ ID NO 122
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 122
ggcatataac caagcatgag                                               20

<210> SEQ ID NO 123
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 123
gttgggccca tccgtgtgtc                                               20

<210> SEQ ID NO 124
<211> LENGTH: 20
```

```
<212> TYPE: DNA
<213> ORGANISM: Artificial Sequence
<220> FEATURE:
<223> OTHER INFORMATION: Synthetic oligonucleotide

<400> SEQUENCE: 124
atttacattt ataccgccaa                                               20

<210> SEQ ID NO 125
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 125
gatgggaaat gtgtgtagcc                                               20

<210> SEQ ID NO 126
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 126
gtcaagacct tgggacatca                                               20

<210> SEQ ID NO 127
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 127
ggaccaatcc aggaaaggtt                                               20

<210> SEQ ID NO 128
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 128
aggatggtgt ataagcccta                                               20

<210> SEQ ID NO 129
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 129
ggaactccac atttctaagc                                               20

<210> SEQ ID NO 130
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 130
```
ggaggttcag tcttgaggca                                              20

<210> SEQ ID NO 131
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 131
ggttgtgctg aaatatggtc                                              20

<210> SEQ ID NO 132
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 132
gggtcacctt tgttgcccat                                              20

<210> SEQ ID NO 133
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 133
tgtccagttc ggttcccatc                                              20

<210> SEQ ID NO 134
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 134
cctggaagta cattgggacc                                              20

<210> SEQ ID NO 135
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 135
ttgctctata ctgtgatgac                                              20

<210> SEQ ID NO 136
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 136
ctcctctgat catgtacccc                                              20

<210> SEQ ID NO 137
<211> LENGTH: 20
<212> TYPE: DNA
<213> ORGANISM: Artificial Sequence -continued

```
<220> FEATURE:
<223> OTHER INFORMATION: Synthetic oligonucleotide

<400> SEQUENCE: 137
cacactttgc agttacctat                                              20

<210> SEQ ID NO 138
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 138
ggcaacctgt caaagcctta                                              20

<210> SEQ ID NO 139
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 139
ccctagtttg ccagggctcc                                              20

<210> SEQ ID NO 140
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 140
gggaccctcc tgttgtaagt                                              20

<210> SEQ ID NO 141
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 141
cagtgctatc atgatcaggt                                              20

<210> SEQ ID NO 142
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 142
cccagagatt tggtatgggc                                              20

<210> SEQ ID NO 143
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 143
gctccttagc taatctctga                                              20
```

<210> SEQ ID NO 144
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 144
gattaggaag gctgtttagc                                              20

<210> SEQ ID NO 145
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 145
ggagatagcg gatggaatac                                              20

<210> SEQ ID NO 146
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 146
ttatcctccc cctacaaacc                                              20

<210> SEQ ID NO 147
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 147
cagatctgct atccgggtgt                                              20

<210> SEQ ID NO 148
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 148
taacaccagg ccgaaggtca                                              20

<210> SEQ ID NO 149
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 149
ttgcagattg ctggataggg                                              20

<210> SEQ ID NO 150
<211> LENGTH: 20
<212> TYPE: DNA
<213> ORGANISM: Artificial Sequence
<220> FEATURE:
<223> OTHER INFORMATION: Synthetic oligonucleotide

```
<400> SEQUENCE: 150
aaggttcaga ctatgggagg                                                  20

<210> SEQ ID NO 151
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 151
tagtctcaga gggacccttta                                                 20

<210> SEQ ID NO 152
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 152
ctcagtccct cacacgatgc                                                  20

<210> SEQ ID NO 153
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 153
gtcatcactc tggtcaacat                                                  20

<210> SEQ ID NO 154
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 154
aaagagccac taggttcatc                                                  20

<210> SEQ ID NO 155
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 155
ttgataggcc aagatacccca                                                 20

<210> SEQ ID NO 156
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 156
gctgtctatg attagaaccc                                                  20

<210> SEQ ID NO 157
```

```
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 157
ctcaaaaggt gcagggtccc                                               20

<210> SEQ ID NO 158
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 158
acttgtcgat tgcttggagg                                               20

<210> SEQ ID NO 159
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 159
ggtactgatt atgatgggac                                               20

<210> SEQ ID NO 160
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 160
ggtcccctcc tgaacccatg                                               20

<210> SEQ ID NO 161
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 161
gcatcaggat ctgttggcca                                               20

<210> SEQ ID NO 162
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 162
aggaactcaa ccttcgcacg                                               20

<210> SEQ ID NO 163
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 163
```

```
ggttgcaaca cagtgaggct                                              20

<210> SEQ ID NO 164
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 164
gtaaaagtaa ctcctggcac                                              20

<210> SEQ ID NO 165
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 165
gaatgttcct ctatagcagt                                              20

<210> SEQ ID NO 166
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 166
gcacctccta aaagctgtta                                              20

<210> SEQ ID NO 167
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 167
ggtgacacaa catatcgccc                                              20

<210> SEQ ID NO 168
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 168
cctatgatgg acagctgcac                                              20

<210> SEQ ID NO 169
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 169
agtacgggag aattttgcca                                              20

<210> SEQ ID NO 170
<211> LENGTH: 20
<212> TYPE: DNA
```

```
<213> ORGANISM: Artificial Sequence
<220> FEATURE:
<223> OTHER INFORMATION: Synthetic oligonucleotide

<400> SEQUENCE: 170
ttaactactg acagatatcc                                               20

<210> SEQ ID NO 171
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 171
cctgagtcaa ggagtttagc                                               20

<210> SEQ ID NO 172
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 172
gcagcaagag ccgggaagta                                               20

<210> SEQ ID NO 173
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 173
tatggctata gtctaacatc                                               20

<210> SEQ ID NO 174
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 174
gttgctcata accaatcccc                                               20

<210> SEQ ID NO 175
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 175
acttctaggt gatgaatctg                                               20

<210> SEQ ID NO 176
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 176
acatatgagg cataccacaa                                               20
```

<210> SEQ ID NO 177
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 177
gtgtgacaaa gccttctatc                                          20

<210> SEQ ID NO 178
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 178
gctatcaggg tgatatctac                                          20

<210> SEQ ID NO 179
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 179
gtgttggtag tagaatgaag                                          20

<210> SEQ ID NO 180
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 180
ggtagtagtc atgggcagct                                          20

<210> SEQ ID NO 181
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 181
cacgctggcc cctcccgctg                                          20

<210> SEQ ID NO 182
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 182
ttcacggtag ttatactcta                                          20

<210> SEQ ID NO 183
<211> LENGTH: 20
<212> TYPE: DNA
<213> ORGANISM: Artificial Sequence
<220> FEATURE:

<223> OTHER INFORMATION: Synthetic oligonucleotide

<400> SEQUENCE: 183
gttatccttg tgccacttgg                                         20

<210> SEQ ID NO 184
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 184
gctatagtag aaccttgaag                                         20

<210> SEQ ID NO 185
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 185
gtcgggctgt cacttagccc                                         20

<210> SEQ ID NO 186
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 186
gtgtccttgg acatttaccc                                         20

<210> SEQ ID NO 187
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 187
cgagagagac tcctagagct                                         20

<210> SEQ ID NO 188
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 188
gacctgatat ttgcctccat                                         20

<210> SEQ ID NO 189
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 189
tagctcagca ggattcccct                                         20

```
<210> SEQ ID NO 190
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 190
gatttggtat aatttagtag                                             20

<210> SEQ ID NO 191
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 191
aagtaacccc ttagctgtgt                                             20

<210> SEQ ID NO 192
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 192
ctaacatggc actgcatcca                                             20

<210> SEQ ID NO 193
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 193
gcatgactaa agtgtaatca                                             20

<210> SEQ ID NO 194
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 194
tacagcctgc tcatggtggg                                             20

<210> SEQ ID NO 195
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 195
ctccacctag tcctgtgccg                                             20

<210> SEQ ID NO 196
<211> LENGTH: 20
<212> TYPE: DNA
<213> ORGANISM: Artificial Sequence
<220> FEATURE:
<223> OTHER INFORMATION: Synthetic oligonucleotide
```

<400> SEQUENCE: 196
gttctcaagc agggagaacc                                              20

<210> SEQ ID NO 197
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 197
gccccaagtg gagccagtgt                                              20

<210> SEQ ID NO 198
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 198
gggcatccca ttagacttcc                                              20

<210> SEQ ID NO 199
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 199
ggcccgagct ctgctcttat                                              20

<210> SEQ ID NO 200
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 200
gctctggcca cctatcatct                                              20

<210> SEQ ID NO 201
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 201
gtatctgcac agctgagggt                                              20

<210> SEQ ID NO 202
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 202
ctaatgacat atcactgggc                                              20

<210> SEQ ID NO 203
<211> LENGTH: 20

```
<212> TYPE: DNA
<213> ORGANISM: Artificial Sequence
<220> FEATURE:
<223> OTHER INFORMATION: Synthetic oligonucleotide

<400> SEQUENCE: 203
gaatccccat tgtcttggtg                                                  20

<210> SEQ ID NO 204
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 204
atctttagcc acgactgtat                                                  20

<210> SEQ ID NO 205
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 205
acagggcctt atctagagat                                                  20

<210> SEQ ID NO 206
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 206
tagctggaga cccccatagc                                                  20

<210> SEQ ID NO 207
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 207
atacaacccc aggctgtcat                                                  20

<210> SEQ ID NO 208
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 208
tgccatgatg gcatgtagga                                                  20

<210> SEQ ID NO 209
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 209
```
ggttcccggg ataccatccc                                              20

<210> SEQ ID NO 210
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 210
cctctcggac cggaagtgcc                                              20

<210> SEQ ID NO 211
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 211
actccaggct ggtcgcagct                                              20

<210> SEQ ID NO 212
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 212
cccgaggaga tgacttctgc                                              20

<210> SEQ ID NO 213
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 213
ggtccattca ttgtgccaca                                              20

<210> SEQ ID NO 214
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 214
caccccagcc tccgtatgtg                                              20

<210> SEQ ID NO 215
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 215
gctaaacttt ccagcggctc                                              20

<210> SEQ ID NO 216
<211> LENGTH: 20
<212> TYPE: DNA
<213> ORGANISM: Artificial Sequence

```
<220> FEATURE:
<223> OTHER INFORMATION: Synthetic oligonucleotide

<400> SEQUENCE: 216
ggaacagtga ctaccctcaa                                              20

<210> SEQ ID NO 217
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 217
atagcaatgg ctcggaatct                                              20

<210> SEQ ID NO 218
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 218
cgatgcaaat gctcaggaga                                              20

<210> SEQ ID NO 219
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 219
gagtcagaac tcctagatcc                                              20

<210> SEQ ID NO 220
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 220
gacccaggcc ttaaataagt                                              20

<210> SEQ ID NO 221
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 221
tgagacactt atatgtctcc                                              20

<210> SEQ ID NO 222
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 222
gggccaggac catgaaactt                                              20
```

```
<210> SEQ ID NO 223
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 223 gggtccccttt tcagaggccg                                              20

<210> SEQ ID NO 224
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 224
cgattgcttg gaggctgtcc                                               20

<210> SEQ ID NO 225
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 225
cttagaaaca tgtggttccc                                               20

<210> SEQ ID NO 226
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 226
agtatgctgt gagaagggcc                                               20

<210> SEQ ID NO 227
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 227
tggccaatga ggcttttccc                                               20

<210> SEQ ID NO 228
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 228
gctcccaggc agctccgaac                                               20

<210> SEQ ID NO 229
<211> LENGTH: 20
<212> TYPE: DNA
<213> ORGANISM: Artificial Sequence
<220> FEATURE:
<223> OTHER INFORMATION: Synthetic oligonucleotide
```

```
<400> SEQUENCE: 229
tcaccatact atcatcaggt                                               20

<210> SEQ ID NO 230
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 230
ggaagttcat actgtgtcag                                               20

<210> SEQ ID NO 231
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 231
tctgtactat acagcttgac                                               20

<210> SEQ ID NO 232
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 232
agctctccta gatcagttgt                                               20

<210> SEQ ID NO 233
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 233
ggttcctagc caacagactc                                               20

<210> SEQ ID NO 234
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 234
tgataggcta tcattaacga                                               20

<210> SEQ ID NO 235
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 235
cctcaatccc taagagacct                                               20

<210> SEQ ID NO 236
```

```
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 236
tcagtaaagg ccgcctgaca                                          20

<210> SEQ ID NO 237
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 237
gtgtaatctg tatgggagaa                                          20

<210> SEQ ID NO 238
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 238
tggcatcaac catggttccc                                          20

<210> SEQ ID NO 239
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 239
gtttgactgg agttgcctgc                                          20

<210> SEQ ID NO 240
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 240
tgactctatg atctatgtgc                                          20

<210> SEQ ID NO 241
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 241
ttctagccag cctcaagcat                                          20

<210> SEQ ID NO 242
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 242
```
ggcctatatg gacccccaga                                        20

<210> SEQ ID NO 243
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 243
ggacctgaca tacgggctga                                        20

<210> SEQ ID NO 244
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 244
caacctactt aacctgtctc                                        20

<210> SEQ ID NO 245
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 245
gtggagatag aacgattcat                                        20

<210> SEQ ID NO 246
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 246
gtagtcctct atagaaggca                                        20

<210> SEQ ID NO 247
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 247
ccagggtatt ctggaatgat                                        20

<210> SEQ ID NO 248
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 248
acctggcatg ggtgctaacc                                        20

<210> SEQ ID NO 249
<211> LENGTH: 20
<212> TYPE: DNA

```
<213> ORGANISM: Artificial Sequence
<220> FEATURE:
<223> OTHER INFORMATION: Synthetic oligonucleotide

<400> SEQUENCE: 249
gggtcatctg atataccccc                                              20

<210> SEQ ID NO 250
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 250
ggagaggcta tgcatggtaa                                              20

<210> SEQ ID NO 251
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 251
tcgcacagaa cacctcagag                                              20

<210> SEQ ID NO 252
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 252
ggtgcacctc tgcatgctgt                                              20

<210> SEQ ID NO 253
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 253
ccctccagaa ccccacttga                                              20

<210> SEQ ID NO 254
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 254
gcctgggcag aagtaagccg                                              20

<210> SEQ ID NO 255
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 255
gttatgcagt atctctctca                                              20
```

```
<210> SEQ ID NO 256
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 256
agggcatata accaagcatg                                                   20

<210> SEQ ID NO 257
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 257
ggttgggccc atccgtgtgt                                                   20

<210> SEQ ID NO 258
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 258
ggagagcata agccctagtg                                                   20

<210> SEQ ID NO 259
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 259
ggcaggtatt aagttaccac                                                   20

<210> SEQ ID NO 260
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 260
ctgatgatgt ggagggacca                                                   20

<210> SEQ ID NO 261
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 261
gggtactgtt gctggcttgg                                                   20

<210> SEQ ID NO 262
<211> LENGTH: 20
<212> TYPE: DNA
<213> ORGANISM: Artificial Sequence
<220> FEATURE:
```

<223> OTHER INFORMATION: Synthetic oligonucleotide

<400> SEQUENCE: 262
gggccacaag tagcattcag                                              20

<210> SEQ ID NO 263
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 263
gtgcccattg tcttctactc                                              20

<210> SEQ ID NO 264
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 264
tggactgcca gccctgattc                                              20

<210> SEQ ID NO 265
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 265
gactcccaag ggaggagacc                                              20

<210> SEQ ID NO 266
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 266
cctagggccc agataggacc                                              20

<210> SEQ ID NO 267
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 267
gggtgaacaa gctttgcagg                                              20

<210> SEQ ID NO 268
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 268
gtcctgtcag ggcaagccat                                              20

<210> SEQ ID NO 269
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 269
gcatatagag cctctgagac                                                  20

<210> SEQ ID NO 270
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 270
ggatccagag agtcccttttg                                                 20

<210> SEQ ID NO 271
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 271
gacggtggct atgggcaggc                                                  20

<210> SEQ ID NO 272
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 272
cacctttaaa tggagctaga                                                  20

<210> SEQ ID NO 273
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 273
cgtccttcct ggcactgacc                                                  20

<210> SEQ ID NO 274
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 274 gcccctgtc ttcaggtgtg                                                   20

<210> SEQ ID NO 275
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 275
accagacacc ccaagttggg                                                     20

<210> SEQ ID NO 276
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 276
ggtggtccta ggagaggctt                                                     20

<210> SEQ ID NO 277
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 277
gttactcatg ggcagccaga                                                     20

<210> SEQ ID NO 278
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 278
ggaagtgcct ttcggacttc                                                     20

<210> SEQ ID NO 279
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 279
gtctcaagtg gcaagtctgt                                                     20

<210> SEQ ID NO 280
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 280
tgccacactt ttcgacttca                                                     20

<210> SEQ ID NO 281
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 281
cttattggag gtcccgtagg                                                     20

<210> SEQ ID NO 282
<211> LENGTH: 20

```
<212> TYPE: DNA
<213> ORGANISM: Artificial Sequence
<220> FEATURE:
<223> OTHER INFORMATION: Synthetic oligonucleotide

<400> SEQUENCE: 282
gacatgataa cctagcacca                                               20

<210> SEQ ID NO 283
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 283
gccagaggtc tgtgcaatat                                               20

<210> SEQ ID NO 284
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 284
gaccatattt tatgtagcag                                               20

<210> SEQ ID NO 285
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 285
ccatcagtta ctgtggataa                                               20

<210> SEQ ID NO 286
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 286
cctcaagtcg atccacttgt                                               20

<210> SEQ ID NO 287
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 287
acgctgtcca gggctcacaa                                               20

<210> SEQ ID NO 288
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 288
```
gttcgagact ccagcccagc                                              20

<210> SEQ ID NO 289
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 289
cagaggccgg ttgtctgtgc                                              20

<210> SEQ ID NO 290
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 290
tctacctgga acacttagcc                                              20

<210> SEQ ID NO 291
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 291
cttggcaact tgtcgattgc                                              20

<210> SEQ ID NO 292
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 292
ggcccaacta gggacaggtt                                              20

<210> SEQ ID NO 293
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 293
gcaaggtatc tgcttcttga                                              20

<210> SEQ ID NO 294
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 294
cgaaccctat ggaaagactc                                              20

<210> SEQ ID NO 295
<211> LENGTH: 20
<212> TYPE: DNA
<213> ORGANISM: Artificial Sequence

```
<220> FEATURE:
<223> OTHER INFORMATION: Synthetic oligonucleotide

<400> SEQUENCE: 295
gggttagagc aagtatacca                                                  20

<210> SEQ ID NO 296
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 296
gagtgcagtg ctattccttt                                                  20

<210> SEQ ID NO 297
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 297
gactacctac tcagggtcct                                                  20

<210> SEQ ID NO 298
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 298
gttctcaatg tggtattccc                                                  20

<210> SEQ ID NO 299
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 299
ggcacacagg tgtagtgaat                                                  20

<210> SEQ ID NO 300
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 300
ggctgttagg tacaacgggc                                                  20

<210> SEQ ID NO 301
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 301
ggacttgcat aggctggcag                                                  20
```

```
<210> SEQ ID NO 302
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 302
gtcagagtgt ctataagcta                                            20

<210> SEQ ID NO 303
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 303
atcaaacccg tcttctgcaa                                            20

<210> SEQ ID NO 304
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 304
cagctcctgc aagtcagacg                                            20

<210> SEQ ID NO 305
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 305
tctaagagtc caagcaactc                                            20

<210> SEQ ID NO 306
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 306
tgtccagcat acttaggtct                                            20

<210> SEQ ID NO 307
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 307
agtccaccga ctcccagtga                                            20

<210> SEQ ID NO 308
<211> LENGTH: 20
<212> TYPE: DNA
<213> ORGANISM: Artificial Sequence
<220> FEATURE:
<223> OTHER INFORMATION: Synthetic oligonucleotide
```

```
<400> SEQUENCE: 308
ggtttgggtg tgaatagtta                                              20

<210> SEQ ID NO 309
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 309
aggtgcaacc agcactgtct                                              20

<210> SEQ ID NO 310
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 310
tcccataact atctactgcc                                              20

<210> SEQ ID NO 311
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 311
gagcaactcc agcactaatt                                              20

<210> SEQ ID NO 312
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 312
aggatcagat ttgactccgt                                              20

<210> SEQ ID NO 313
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 313
tggtcactaa agggataccc                                              20

<210> SEQ ID NO 314
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 314
ctggtgttgt ttcacggtag                                              20

<210> SEQ ID NO 315
```

```
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 315
gcccagatat aagcagtggc                                               20

<210> SEQ ID NO 316
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 316
cccacactgc aagaagtggt                                               20

<210> SEQ ID NO 317
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 317
ttagagaggt gccaaaggac                                               20

<210> SEQ ID NO 318
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 318 gcactttcc acctccccga                                                20

<210> SEQ ID NO 319
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 319
ggactacttt gaaccgggtc                                               20

<210> SEQ ID NO 320
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 320
gggtggtagc ctctggttca                                               20

<210> SEQ ID NO 321
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 321
```
atgccgggta gcagtgctca                                           20

<210> SEQ ID NO 322
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 322
gtgtaacagg gcatgtaacc                                           20

<210> SEQ ID NO 323
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 323
ggctcataac atcccactct                                           20

<210> SEQ ID NO 324
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 324
cgtgttgacc ttggttggag                                           20

<210> SEQ ID NO 325
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 325
gttttcaagt aagtgattcc                                           20

<210> SEQ ID NO 326
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 326
gccattggcc aaaggccatc                                           20

<210> SEQ ID NO 327
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 327
cgagacacta gtaccatgga                                           20

<210> SEQ ID NO 328
<211> LENGTH: 20
<212> TYPE: DNA

```
<213> ORGANISM: Artificial Sequence
<220> FEATURE:
<223> OTHER INFORMATION: Synthetic oligonucleotide

<400> SEQUENCE: 328
gctggtgaat tggagactct                                                  20

<210> SEQ ID NO 329
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 329
ttctgtccca taacctccgg                                                  20

<210> SEQ ID NO 330
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 330
tccctgcata gaggcagacc                                                  20

<210> SEQ ID NO 331
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 331
atgtcccatc cctactgggc                                                  20

<210> SEQ ID NO 332
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 332
ggtgccttag acagccatcc                                                  20

<210> SEQ ID NO 333
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 333
tagccaaggc tctgtttagc                                                  20

<210> SEQ ID NO 334
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 334
gggaggtgtc atgtccacct                                                  20
```

<210> SEQ ID NO 335
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 335
agtttgacag ctgtatggac                                               20

<210> SEQ ID NO 336
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 336
gtgctaatga ccctctctgg                                               20

<210> SEQ ID NO 337
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 337
gccaaagttc actgagcacc                                               20

<210> SEQ ID NO 338
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 338
accataggac ctattttggg                                               20

<210> SEQ ID NO 339
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 339
gccttcactt ttgagtccac                                               20

<210> SEQ ID NO 340
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 340
gggccagtat ctccttactc                                               20

<210> SEQ ID NO 341
<211> LENGTH: 20
<212> TYPE: DNA
<213> ORGANISM: Artificial Sequence
<220> FEATURE:

<223> OTHER INFORMATION: Synthetic oligonucleotide

<400> SEQUENCE: 341
agagcccttt atgtttgggt                                            20

<210> SEQ ID NO 342
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 342
ccagggtatg aactcttacc                                            20

<210> SEQ ID NO 343
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 343
tctctgagtg gttcccggga                                            20

<210> SEQ ID NO 344
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 344
gctgtttagc ctctcggacc                                            20

<210> SEQ ID NO 345
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 345
gcggatggaa tacagatgtg                                            20

<210> SEQ ID NO 346
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 346
ggcagaatcc cgaggagatg                                            20

<210> SEQ ID NO 347
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 347
ccacaggtcc attcattgtg                                            20

```
<210> SEQ ID NO 348
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 348
ctaggtggac acattgggca                                                   20

<210> SEQ ID NO 349
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 349
atgggcaccc cagcctccgt                                                   20

<210> SEQ ID NO 350
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 350
cctctagcag ctcccgctca                                                   20

<210> SEQ ID NO 351
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 351
cctgtcaaac aggagtaact                                                   20

<210> SEQ ID NO 352
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 352
cagagggacc cttagatagc                                                   20

<210> SEQ ID NO 353
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 353
tcacacgatg caaatgctca                                                   20

<210> SEQ ID NO 354
<211> LENGTH: 20
<212> TYPE: DNA
<213> ORGANISM: Artificial Sequence
<220> FEATURE:
<223> OTHER INFORMATION: Synthetic oligonucleotide
```

<400> SEQUENCE: 354
ggtcaacatc ttgtctggga                                               20

<210> SEQ ID NO 355
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 355
gccactaggt tcatctccta                                               20

<210> SEQ ID NO 356
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 356
gccaagatac ccagatttcc                                               20

<210> SEQ ID NO 357
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 357
tatgattaga acccatgccc                                               20

<210> SEQ ID NO 358
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 358
gtgcagggtc ccctttcaga                                               20

<210> SEQ ID NO 359
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 359
tgtcgattgc ttggaggctg                                               20

<210> SEQ ID NO 360
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 360
gattatgatg ggacacttag                                               20

<210> SEQ ID NO 361
<211> LENGTH: 20

```
<212> TYPE: DNA
<213> ORGANISM: Artificial Sequence
<220> FEATURE:
<223> OTHER INFORMATION: Synthetic oligonucleotide

<400> SEQUENCE: 361
acccatgttc ttgggagcta                                               20

<210> SEQ ID NO 362
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 362
atctgttggc caatgaggct                                               20

<210> SEQ ID NO 363
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 363
ccttcgcacg cccatccttc                                               20

<210> SEQ ID NO 364
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 364
agtacagtgt tgttgctcct                                               20

<210> SEQ ID NO 365
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 365
acctacttac ctggatgccc                                               20

<210> SEQ ID NO 366
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 366
tatttgactc tcaaggagtc                                               20

<210> SEQ ID NO 367
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 367
```
gggagtaagt cccagcccttt                                                    20

<210> SEQ ID NO 368
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 368
gtgtgcctaa atccaggttt                                                     20

<210> SEQ ID NO 369
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 369
ggactcactc aagtattgtg                                                     20

<210> SEQ ID NO 370
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 370
ggaaaccaac caacttggac                                                     20

<210> SEQ ID NO 371
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 371
tccagctcac ataaggtgcc                                                     20

<210> SEQ ID NO 372
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 372
ccttctgcca gtggtagatg                                                     20

<210> SEQ ID NO 373
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 373
gtgcacaaat tcactcagcg                                                     20

<210> SEQ ID NO 374
<211> LENGTH: 20
<212> TYPE: DNA
<213> ORGANISM: Artificial Sequence -continued

```
<220> FEATURE:
<223> OTHER INFORMATION: Synthetic oligonucleotide

<400> SEQUENCE: 374
tggtcactaa gtgaccagac                                              20

<210> SEQ ID NO 375
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 375 ggtccccct ctattttgct                                               20

<210> SEQ ID NO 376
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 376
cactttaaga agacctctcc                                              20

<210> SEQ ID NO 377
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 377
gctagatata catagtcatc                                              20

<210> SEQ ID NO 378
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 378
tgctggaaaa cttatcttgc                                              20

<210> SEQ ID NO 379
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 379
tcagggtgat atctactctc                                              20

<210> SEQ ID NO 380
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 380
ggatgagttg tatttgagtt                                              20
```

```
<210> SEQ ID NO 381
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 381
gtctagacct atcaaagtgg                                                   20

<210> SEQ ID NO 382
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 382
cccgctgtag tcctctatag                                                   20

<210> SEQ ID NO 383
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 383
ggtagttata ctctaagcca                                                   20

<210> SEQ ID NO 384
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 384
gaacctcttt cccggccctc                                                   20

<210> SEQ ID NO 385
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 385
acctaatgga aggcatggta                                                   20

<210> SEQ ID NO 386
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 386
tacccatgca attctactcc                                                   20

<210> SEQ ID NO 387
<211> LENGTH: 20
<212> TYPE: DNA
<213> ORGANISM: Artificial Sequence
<220> FEATURE:
<223> OTHER INFORMATION: Synthetic oligonucleotide
```

-continued

<400> SEQUENCE: 387
caactctgga accaagtccc                                          20

<210> SEQ ID NO 388
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 388
tgtgacaacc cacaacaacg                                          20

<210> SEQ ID NO 389
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 389
tggatcatag ctctgtccaa                                          20

<210> SEQ ID NO 390
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 390
tttagtaggg aggtctgcgg                                          20

<210> SEQ ID NO 391
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 391
atgcagcagg ttatccacac                                          20

<210> SEQ ID NO 392
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 392
gctatctgca tactacctgc                                          20

<210> SEQ ID NO 393
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 393
gaggctccct ccgcaagagg                                          20

<210> SEQ ID NO 394

```
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 394
gtagtaaaac tgtggcaggt                                               20

<210> SEQ ID NO 395
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 395
taggctgtcg gcctctgagc                                               20

<210> SEQ ID NO 396
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 396
catagggtac tgttgctggc                                               20

<210> SEQ ID NO 397
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 397
acatgcacta tattgggcca                                               20

<210> SEQ ID NO 398
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 398
aacctctttc ttgtacaggg                                               20

<210> SEQ ID NO 399
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 399
cgagctctgc tcttatctca                                               20

<210> SEQ ID NO 400
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 400
```
cctccatggg aattatcctc                                               20

<210> SEQ ID NO 401
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 401
gatgcttgca gcagtatgcc                                               20

<210> SEQ ID NO 402
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 402
agcagatagg tccccttgag                                               20

<210> SEQ ID NO 403
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 403
ggacaagtgg agcatacttg                                               20

<210> SEQ ID NO 404
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 404
gttggcatat agagcctctg                                               20

<210> SEQ ID NO 405
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 405
gatgagtgag tgcctgacca                                               20

<210> SEQ ID NO 406
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 406
ggctcactta tgaagtgtgc                                               20

<210> SEQ ID NO 407
<211> LENGTH: 20
<212> TYPE: DNA

```
<213> ORGANISM: Artificial Sequence
<220> FEATURE:
<223> OTHER INFORMATION: Synthetic oligonucleotide

<400> SEQUENCE: 407
ggcccccatg aaccaggcag                                            20

<210> SEQ ID NO 408
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 408
gccaatagga tccctacctc                                            20

<210> SEQ ID NO 409
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 409
ctcattatgg ctactctcca                                            20

<210> SEQ ID NO 410
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 410
gatccaagtc cctgcatagt                                            20

<210> SEQ ID NO 411
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 411
ccttccctga aggttcctcc                                            20
```